US008036244B2

(12) United States Patent
Naoe et al.

(10) Patent No.: US 8,036,244 B2
(45) Date of Patent: Oct. 11, 2011

(54) TRANSMITTER, RECEIVER, COMMUNICATION SYSTEM, COMMUNICATION METHOD, NON-TRANSITORY COMPUTER READABLE MEDIUM

(75) Inventors: Hitoshi Naoe, Kitakatsuragi-gun (JP); Fumihiro Fukae, Sakurai (JP); Koji Sakai, Osaka (JP); Shohei Ohsawa, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 1270 days.

(21) Appl. No.: 10/577,337

(22) PCT Filed: Aug. 5, 2005

(86) PCT No.: PCT/JP2005/014446
§ 371 (c)(1),
(2), (4) Date: Apr. 28, 2006

(87) PCT Pub. No.: WO2006/013979
PCT Pub. Date: Feb. 9, 2006

(65) Prior Publication Data
US 2008/0279562 A1 Nov. 13, 2008

(30) Foreign Application Priority Data

| Aug. 6, 2004 | (JP) | 2004-231653 |
| Aug. 6, 2004 | (JP) | 2004-231658 |
| Aug. 6, 2004 | (JP) | 2004-231663 |
| Aug. 6, 2004 | (JP) | 2004-231665 |
| Aug. 6, 2004 | (JP) | 2004-231733 |
| Sep. 13, 2004 | (JP) | 2004-265748 |
| Jan. 28, 2005 | (JP) | 2005-022209 |
| Jan. 31, 2005 | (JP) | 2005-023901 |
| Jan. 31, 2005 | (JP) | 2005-023929 |
| Apr. 13, 2005 | (JP) | 2005-116096 |
| May 25, 2005 | (JP) | 2005-152910 |
| Jun. 30, 2005 | (JP) | 2005-192903 |

(51) Int. Cl.
H04J 3/16 (2006.01)
H04J 3/22 (2006.01)
H04B 10/00 (2006.01)

(52) U.S. Cl. .................... 370/469; 396/140
(58) Field of Classification Search .............. 370/464, 370/465, 466, 467, 469; 398/140, 182, 202; 348/207.2; 714/748
See application file for complete search history.

(56) References Cited

U.S. PATENT DOCUMENTS 4,957,348 A 9/1990 May
(Continued)

FOREIGN PATENT DOCUMENTS

CN 1167380 A 12/1997
(Continued)

OTHER PUBLICATIONS

Matsumoto et al., Technical Report of IEICE, The Institute of Electronics, Information and Communication Engineers, pp. 1-7, (Jan. 28, 2000).
(Continued)

*Primary Examiner* — Xavier Szewai Wong
(74) *Attorney, Agent, or Firm* — Birch, Stewart, Kolasch & Birch, LLP

(57) ABSTRACT

Provided is a communication system including a transmitter and a receiver which carry out communication by establishing connection of their plurality of communication layers. The transmitter generates a connection request containing a command and data required for connecting a number of contiguously adjacent layers among the plurality of communication layers and transmits the connection request to the receiver. The receiver receives a connection request containing a command and data required for connecting a number of contiguously adjacent layers among the plurality of communication layers, extracts the command and data from the connection request, and establishes connection for the plurality of communication layers based on the command and data. In this way, the time taken to establish connection is reduced. Therefore, even when the connection is cut off during the data exchange, the connection can be established again without taking much time, allowing quick recovery of data exchange.

27 Claims, 54 Drawing Sheets

U.S. PATENT DOCUMENTS

| | | | |
|---|---|---|---|
| 5,448,561 A | 9/1995 | Kaiser et al. | |
| 5,450,412 A | 9/1995 | Takebayashi et al. | |
| 5,509,121 A * | 4/1996 | Nakata et al. | 709/230 |
| 5,515,508 A * | 5/1996 | Pettus et al. | 709/203 |
| 5,557,634 A | 9/1996 | Balasubramanian et al. | |
| 5,563,943 A | 10/1996 | Takebayashi et al. | |
| 5,585,952 A | 12/1996 | Imai et al. | |
| 5,638,373 A | 6/1997 | Takebayashi et al. | |
| 5,706,110 A * | 1/1998 | Nykanen | 398/35 |
| 5,764,643 A | 6/1998 | Takebayashi et al. | |
| 6,006,294 A * | 12/1999 | Kurihara | 710/52 |
| 6,034,962 A | 3/2000 | Ohno et al. | |
| 6,154,298 A | 11/2000 | Tamagawa | |
| 6,178,181 B1 | 1/2001 | Glitho | |
| 6,188,431 B1 | 2/2001 | Oie | |
| 6,211,797 B1 | 4/2001 | Kimura | |
| 6,256,296 B1 | 7/2001 | Ruziak et al. | |
| 6,297,802 B1 | 10/2001 | Fujioka | |
| 6,336,142 B1 | 1/2002 | Kato et al. | |
| 6,347,339 B1 | 2/2002 | Morris et al. | |
| 6,411,813 B1 | 6/2002 | Sano | |
| 6,629,373 B1 | 10/2003 | Donaldson | |
| 6,728,774 B1 | 4/2004 | Nykanen | |
| 6,735,245 B1 | 5/2004 | Palm | |
| 6,754,451 B1 | 6/2004 | Nakamura | |
| 6,812,881 B1 | 11/2004 | Mullaly et al. | |
| 6,839,564 B2 | 1/2005 | Sutinen et al. | |
| 6,842,433 B2 | 1/2005 | West et al. | |
| 6,865,687 B1 * | 3/2005 | Ichimi | 714/2 |
| 6,907,013 B1 | 6/2005 | Ruziak | |
| 6,944,483 B1 | 9/2005 | Motohashi | |
| 7,069,059 B2 | 6/2006 | Osawa | |
| 7,363,534 B1 * | 4/2008 | Krishnamurthy et al. | 714/13 |
| 7,366,532 B2 | 4/2008 | Khawand et al. | |
| 7,403,543 B2 | 7/2008 | Lee et al. | |
| 7,411,974 B2 | 8/2008 | Attar et al. | |
| 7,729,290 B2 | 6/2010 | Salch et al. | |
| 2001/0007137 A1 | 7/2001 | Suumaki et al. | |
| 2001/0032326 A1 | 10/2001 | Haneda | |
| 2001/0044914 A1 | 11/2001 | Nakano et al. | |
| 2002/0065065 A1 | 5/2002 | Lunsford et al. | |
| 2002/0196782 A1 | 12/2002 | Furukawa et al. | |
| 2002/0196812 A1 | 12/2002 | Yamaguchi et al. | |
| 2003/0107651 A1 * | 6/2003 | Chen et al. | 348/207.2 |
| 2003/0114107 A1 | 6/2003 | Aoyagi | |
| 2003/0169744 A1 * | 9/2003 | Elzur | 370/395.5 |
| 2004/0042487 A1 | 3/2004 | Ossman | |
| 2004/0054796 A1 | 3/2004 | Kikuchi et al. | |
| 2004/0080537 A1 | 4/2004 | Adler | |
| 2004/0111535 A1 | 6/2004 | Boucher et al. | |
| 2004/0170134 A1 | 9/2004 | Furuyama et al. | |
| 2004/0186928 A1 | 9/2004 | Fukunaga et al. | |
| 2004/0218209 A1 | 11/2004 | Hamaguchi et al. | |
| 2004/0228332 A1 | 11/2004 | Seguin et al. | |
| 2005/0014468 A1 * | 1/2005 | Salokannel et al. | 455/41.2 |
| 2005/0025188 A1 | 2/2005 | Numakura et al. | |
| 2005/0071733 A1 | 3/2005 | Fukae et al. | |
| 2005/0083885 A1 * | 4/2005 | Ikeda et al. | 370/331 |
| 2005/0091412 A1 * | 4/2005 | Pinkerton et al. | 709/250 |
| 2005/0097191 A1 | 5/2005 | Yamaki et al. | |
| 2005/0138226 A1 | 6/2005 | Tateyama et al. | |
| 2005/0254456 A1 | 11/2005 | Sakai et al. | |
| 2005/0271022 A1 | 12/2005 | Osawa et al. | |
| 2006/0250973 A1 | 11/2006 | Trott | |
| 2006/0291502 A1 * | 12/2006 | Kalofonos | 370/466 |
| 2007/0057762 A1 | 3/2007 | Han et al. | |
| 2007/0064733 A1 | 3/2007 | Osawa et al. | |
| 2008/0008165 A1 | 1/2008 | Ikeda et al. | |
| 2008/0126554 A1 | 5/2008 | Sakai et al. | |
| 2008/0145058 A1 | 6/2008 | Fukae et al. | |
| 2008/0189422 A1 | 8/2008 | Naoe et al. | |
| 2008/0279560 A1 | 11/2008 | Osawa et al. | |
| 2008/0279562 A1 | 11/2008 | Naoe et al. | |
| 2008/0291941 A1 | 11/2008 | Sakai et al. | |
| 2008/0313518 A1 | 12/2008 | Naoe et al. | |
| 2009/0190502 A1 | 7/2009 | Mameda et al. | |
| 2009/0262661 A1 | 10/2009 | Ueda et al. | |

FOREIGN PATENT DOCUMENTS

| | | | |
|---|---|---|---|
| CN | 1167380 A | | 12/1997 |
| CN | 1394029 A | | 1/2003 |
| EP | 0 584 464 A1 | | 3/1994 |
| EP | 0 886 410 A2 | | 12/1998 |
| EP | 0886410 A2 | | 12/1998 |
| EP | 1 780 984 A1 | | 5/2007 |
| JP | 58-56200 A | | 4/1983 |
| JP | 62-029238 A | | 2/1987 |
| JP | 10-98435 A | | 4/1989 |
| JP | 1-164140 A | | 6/1989 |
| JP | 2-16847 A | | 1/1990 |
| JP | 02-041050 A | | 2/1990 |
| JP | 2-281830 A | | 11/1990 |
| JP | 03-070059 A | | 3/1991 |
| JP | 03-098338 A | | 4/1991 |
| JP | 3-139935 A | | 6/1991 |
| JP | 4-839 A | | 1/1992 |
| JP | 4-269031 A | | 9/1992 |
| JP | 4-271567 A | | 9/1992 |
| JP | 4-291556 A | | 10/1992 |
| JP | 05-030150 A | | 2/1993 |
| JP | 5-175985 A | | 7/1993 |
| JP | 05-260124 A | | 8/1993 |
| JP | 05-260124 A | | 10/1993 |
| JP | 6-70383 A | | 3/1994 |
| JP | 6-152687 A | | 5/1994 |
| JP | 07-15485 A | | 1/1995 |
| JP | 07-046292 A | | 2/1995 |
| JP | 7-46292 A | | 2/1995 |
| JP | 8-191271 A | | 7/1996 |
| JP | 8-195785 A | | 7/1996 |
| JP | 8314831 A | | 11/1996 |
| JP | 9-135210 A | | 5/1997 |
| JP | 9-154176 A | | 6/1997 |
| JP | 9-224069 A | | 8/1997 |
| JP | 09224069 A * | | 8/1997 |
| JP | 9-284696 A | | 10/1997 |
| JP | 9-312674 A | | 12/1997 |
| JP | 10-98435 A | | 4/1998 |
| JP | 10-107737 A | | 4/1998 |
| JP | 10107737 A * | | 4/1998 |
| JP | 10-126758 A | | 5/1998 |
| JP | 10-145452 A | | 5/1998 |
| JP | 10-290348 A | | 10/1998 |
| JP | 10-308791 A | | 11/1998 |
| JP | 11-4306 A | | 1/1999 |
| JP | 11-154908 A | | 6/1999 |
| JP | 11317724 A | | 11/1999 |
| JP | 2000-010745 | | 1/2000 |
| JP | 2000-31993 | | 1/2000 |
| JP | 2000-32000 A | | 1/2000 |
| JP | 2000-069403 | | 3/2000 |
| JP | 2000069403 A | | 3/2000 |
| JP | 2000-101605 A | | 4/2000 |
| JP | 2000-196622 A | | 7/2000 |
| JP | 2000-196654 A | | 7/2000 |
| JP | 2000-332688 A | | 11/2000 |
| JP | 2000-349782 A | | 12/2000 |
| JP | 2001-60912 A | | 3/2001 |
| JP | 2001-69297 A | | 3/2001 |
| JP | 2001-083948 | | 3/2001 |
| JP | 2001-083948 A | | 3/2001 |
| JP | 2001-145164 A | | 5/2001 |
| JP | 2001-202281 A | | 7/2001 |
| JP | 2001-308955 A | | 11/2001 |
| JP | 2002-509378 A | | 3/2002 |
| JP | 2002-135260 A | | 5/2002 |
| JP | 2002-158730 A | | 5/2002 |
| JP | 2002-223466 A | | 8/2002 |
| JP | 2002-232507 A | | 8/2002 |
| JP | 2003-69610 A | | 3/2003 |
| JP | 2003-508728 A | | 3/2003 |
| JP | 2003-101554 A | | 4/2003 |
| JP | 2003-110579 A | | 4/2003 |
| JP | 2003-218936 A | | 7/2003 |
| JP | 2003-258880 A | | 9/2003 |
| JP | 2003-263403 A | | 9/2003 |
| JP | 2004-41375 A | | 2/2004 |

| | | |
|---|---|---|
| JP | 2004-64533 A | 2/2004 |
| JP | 2004-94555 A | 3/2004 |
| JP | 2004-104441 A | 4/2004 |
| JP | 2004177586 A | 6/2004 |
| JP | 2004-236108 A | 8/2004 |
| JP | 2004-343246 A | 12/2004 |
| JP | 2004-64533 A | 9/2005 |
| JP | 2005-354652 A | 12/2005 |
| JP | 2006-211425 | 8/2006 |
| WO | WO 99/31814 | 6/1999 |
| WO | WO02/23885 A1 | 3/2002 |
| WO | WO-0223885 A1 | 3/2002 |
| WO | WO-2006080357 | 8/2006 |

OTHER PUBLICATIONS

Kitazumi et al., A proposal of next generation proximity infrared communication—Optimization of IrDA protocol by IrSimple, IIEEJ Technical Report.

Naoe et al., Standardization Proposal of High Efficiency Protocols by Using Infrared Data Association, General Conference 2005 of IEICE.

Naoe, et al., High Efficiency Protocols (IrSimple) Using Infrared Communication—IrSimple Profile and Protocols at Infrared Data Association, IEICE Communications Society Conference 2005.

Hewlett-Packard et al., Infrared Data Association Serial Infrared Physical Layer Specification, Version 1.4, May 30, 2001.

Williams, et al., Infrared Data Association—Serial Infrared Link Access Protocol (IrLAP), Version 1.1, Jun. 16, 1996.

Seaborne et al., Infrared Data Association—Link Management Protocol, Version 1.1, Jan. 23, 1996.

Williams, et al., Infrared Data Association—Tiny TP: A Flow-Control Mechanism for use with IrLMP, Version 1.1, Oct. 20, 1996.

Megowan, et al., Infrared Data Association—(IrDA®) Object Exchange Protocol OBEX™, Version 1.3, Jan. 3, 2003.

Naoe, et al., Infrared Data Association—IrDA Serial Infrared Sequence Management Protocol for IrSimple, Version 1.00, Oct. 14, 2005.

Naoe, et al., Infrared Data Association, IrDA Serial Infrared Link Management Protocol Specification for IrSimple Addition, Errata to IrLMP Version 1.1, Ver. 1.00, Oct. 14, 2005.

Naoe, et al., Infrared Data Association, IrSimple (Infrared Simple) Profile, Version 1.00, Oct. 14, 2005.

Naoe, et al., Infrared Data Association, IrDA Serial Infrared Link Access Protocol Specification for IrSimple Addition, Errata to IrLAP Version 1.1, Version 1.00, Oct. 14. 2005.

H. Naoe et al., "Standardization of IrSimple, a High-Speed Infrared Communications Protocol", Sharp Technical Journal, Feb. 2007, vol. 95, pp. 63-68 URL; http://www.sharp.co.jp/corporate/rd/30/pdf/95_13.pdf.

H. Naoe et al., "IrDA Next Generation High-Speed Infrared Communications Standards 'IrSimple'", The Institute of Image Electronics Engineers of Japan, vol. 35, pp. 598-602 (2006).

Hitoshi Naoe et al., "Standardization of IrSimple, a High-Speed Infrared Communications Protocol", Sharp Technical Journal, vol. 95, pp. 63-68 Feb. 2007 URL: <http//www.sharp.co.jp/corporate/rd/03/pdf/95_13.pdf>.

Hitoshi Naoe et al., "IrDA Next Generation High-Speed Infrared Communications Standards "IrSimple"", Technical Report of IEICE, The Institute of Image Electronics Engineers of Japan, vol. 35, pp. 598-602, 2006.

Mitsuji Matsumoto et al., "An Evaluation of the Optical Wireless System in the Mobile Environment in the Room", Technical Report of IEICE, The Institute of Electronics, Information and Communication Engineers, pp. 1-7, Jan. 28, 2000.

Gontaro Kitazumi et al., "A Proposal of next generation proximity infrared communication-Optimization of IrDA protocol by IrSimple-" Institute of Image Electronics Engineers of Japan, IIEEJ Technical Report, 2 pages, year 2005.

Hitoshi Naoe et al., "Standardization Proposal of High Efficiency Protocols by using Infrared Data Association", B-10-54, Conference Presentation, Institute of Electronics Information and Communication Engineers (IEICE), p. 344, Technical Reports published Sep. 7, 2005; with PowerPoint Presentation, Mar. 2005.

Hitoshi Naoe et al., "High Efficiency Protocols (IrSimple) Using Infrared Communication—IrSimple Profile and Protocols at Infrared Data Association", B-15-14, Conference Presentation, Institute of Electronics, Information and Communication Engineers (IEICE), 1 page. Technical Reports published Sep. 7, 2005; with PowerPoint Presentation, Mar. 2005.

"Infrared Data Association Serial Infrared Physical Layer Specification", Version 1.4, pp. i-iv & 1-60, May 30, 2001.

Timothy Willliams et al., "Infrared Data Association Serial Infrared Link Access Protocol (IrLAP)", Version 1.1, pp. 1-116, Jun. 16, 1996.

Andy Seaborne et al., "Infrared Data Association Link Management Protocol (IrLAP)", Version 1.1, pp. 1-98, Jan. 23, 1996.

Stuart Williams et al., " Infrared Data Association 'Tiny TP': A Flow-Control Mechanism for use with IrLMP" Version 1.1, pp. 1-17, Oct. 20, 1996.

Pat Megowan et al., "Infrared Data Association® (IrDA®) Object Exchange Protocol OBEX™", Version 1.3, pp. 1-95, Jan. 3, 2003.

Hitoshi Naoe et al., "Infrared Data Association IrDA Serial Infrared Sequence Management Protocol for IrSimple", Version 1.00, pp. 1-64, Oct. 14, 2005.

Hitoshi Naoe et al., "Infrared Data Association IrDA Serial Infrared Link Management Protocol Specification for IrSimple Addition-Errata to IrLMP Version 1.1", Version 1.00, pp. 1-27, Oct. 14, 2005.

Hitoshi Naoe et al., Infrared Data Association IrSimple (Infrared Simple) Profile, Version 1.00, pp. 1-30, Oct. 14, 2005.

Hitoshi Naoe et al., "Infrared Data Association IrDA Serial Infrared Link Access Protocol Specification for IrSimple Addition-Errata to IrLAP Version 1.1", Version 1.00, pp. 1-65, Oct. 14, 2005.

Kuniko Yamaguchi et al., "Implementation of IrSimple for Mobile Phones", B-15-15, Paper for Institute of Electronics, Information and Communication Engineers (IEICE), Communication Society Conference, 2005 p. 618.

Hitoshi Naoe et al., "IrSimple Profile and Protocols At Infrared Data Association", B-15-14, IECE Society Conference Abstracts, p. 617, 2005.

Glade Diviney et al., "Infrared Data Association IrLAP Fast Connect (Application Note)" Version 1.0, Nov. 27, 2002, pp. 1-17.

U.S. Office Action for Co-pending U.S. Appl. No. 11/883,253, dated Jan. 7, 2011.

U.S. Office Action for Co-pending U.S. Appl. No. 11/883,253, dated Jul. 11, 2011.

* cited by examiner

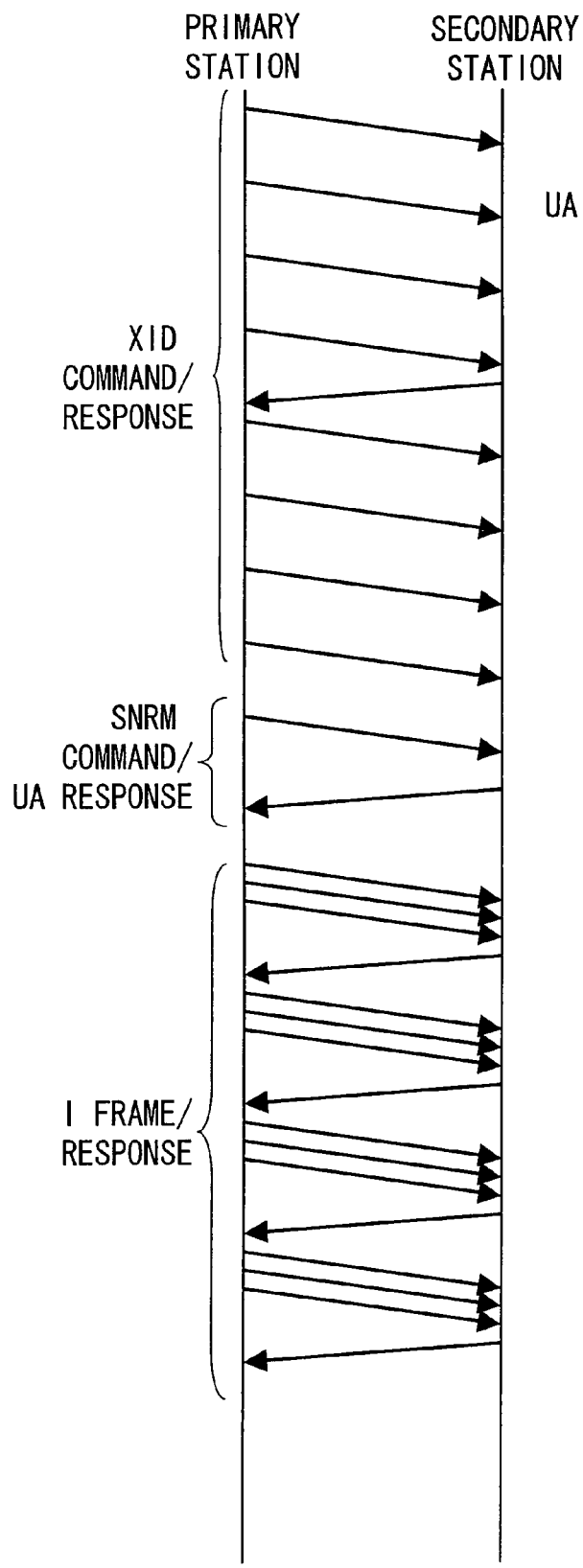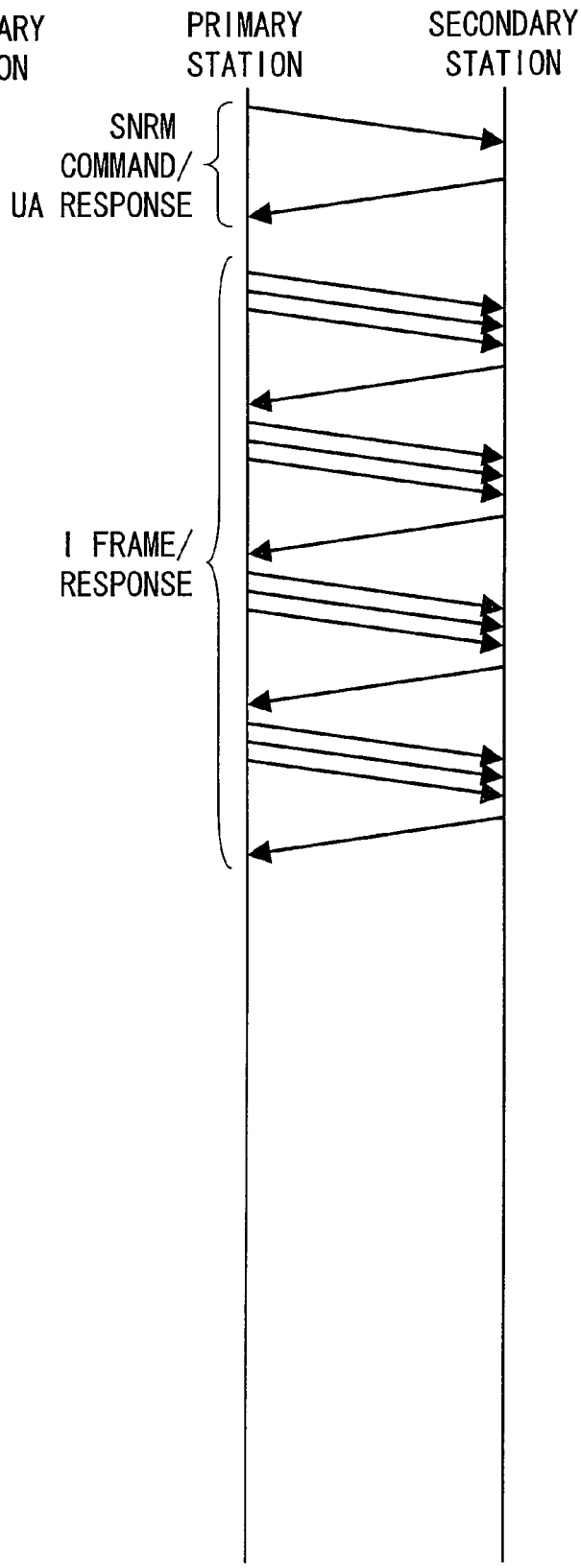

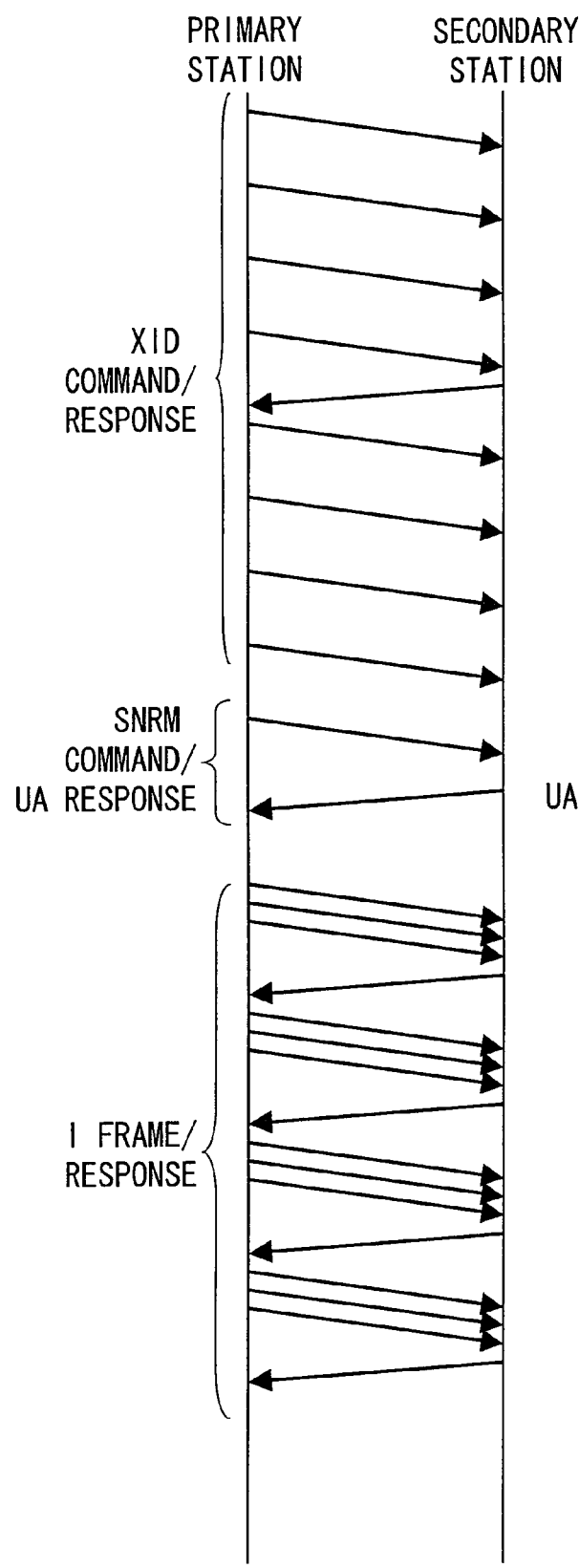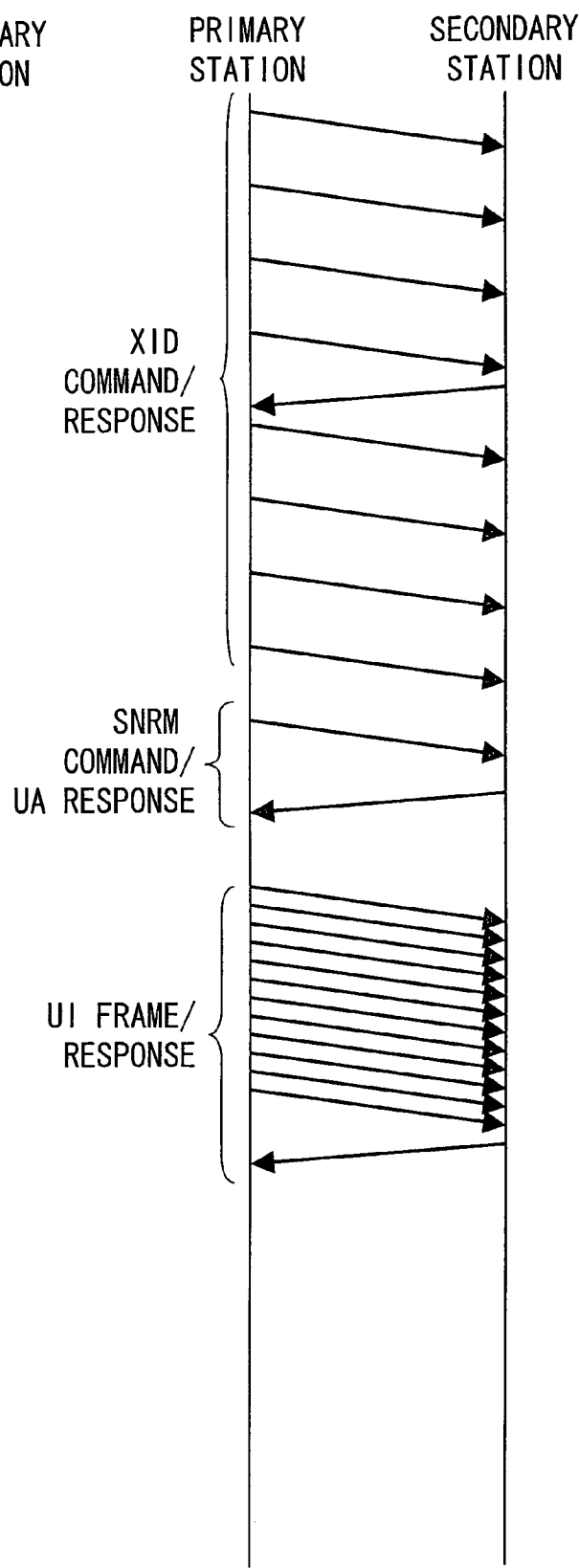
FIG. 9 (a)
FIG. 9 (b)

ADDITION OF IMAGE

40: MOBILE PHONE

ADD NEW INFORMATION TO AN ARBITRARY POSITION
IN THE HIERARCHY STRUCTURE

FIG. 28

XID command

| C/R=1 Addr=0xFE | XID | Format Identifier | Source device address | Destination device address (Global) | Discovery Flag | Slot No. | Version No. | Discovery Info Exists |
|---|---|---|---|---|---|---|---|---|

XID response

| C/R=1 Addr=0xFE | XID | Format Identifier | Source device address | Destination device address | Discovery Flag | Slot No. | Version No. |
|---|---|---|---|---|---|---|---|

SNRM command

| C/R=1 Addr=0xFE | SNRM | Source device address | Destination device address | Connection Address | Negotiation Parameters |
|---|---|---|---|---|---|

UA response for SNRM

| C/R=0 Connection Address | SNRM | Source device address | Destination device address | Connection Address | Negotiation Parameters |
|---|---|---|---|---|---|

I frame + LMP connect request

| Addr | Nr/Ns | LMP connect request |
|---|---|---|

I frame + LMP response

| Addr | Nr/Ns | LMP response |
|---|---|---|

I frame + TTP connect request

| Addr | Nr/Ns | LSAP | TTP connect request |
|---|---|---|---|

I frame + TTP response

| Addr | Nr/Ns | LSAP | TTP response |
|---|---|---|---|

I frame + OBEX connect request

| Addr | Nr/Ns | LSAP | TTP Header | OBEX connect request |
|---|---|---|---|---|

I frame + OBEX response

| Addr | Nr/Ns | LSAP | TTP Header | OBEX response |
|---|---|---|---|---|

| PREAMBLE FIELD | START FLAG | ADDRESS FIELD | CONTROL FIELD | DATA FIELD | FCS | STOP FLAG |

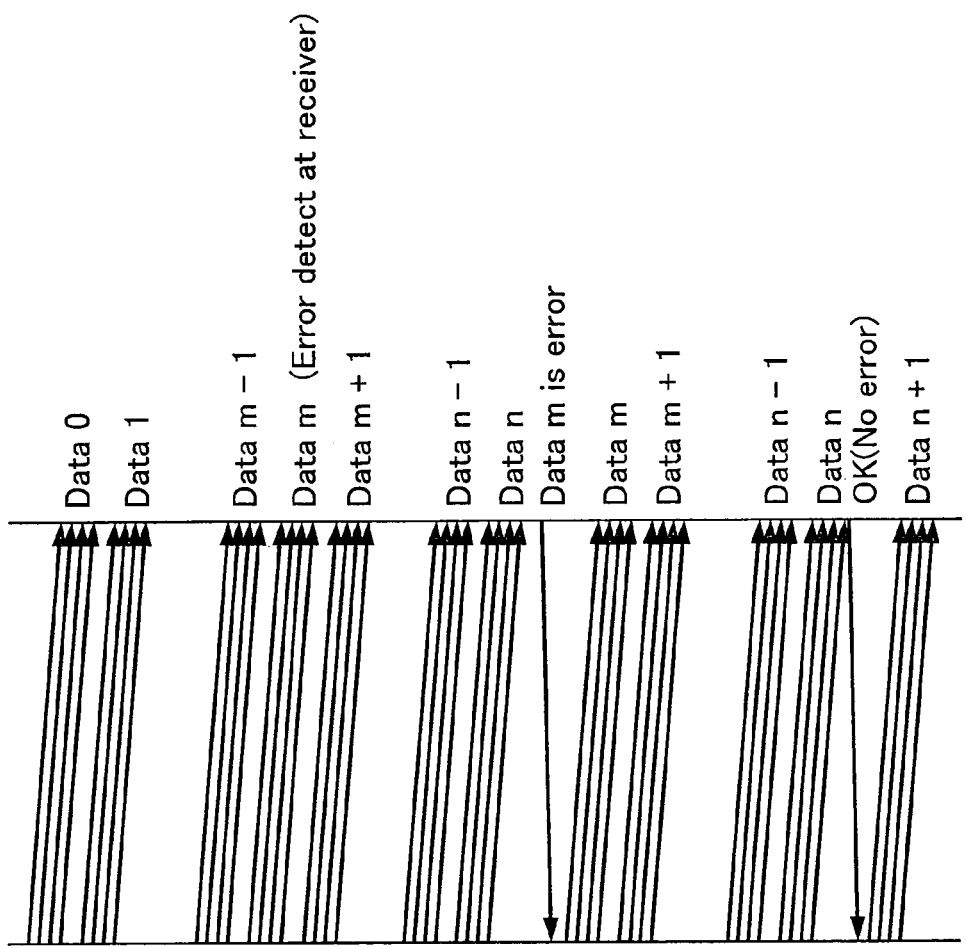
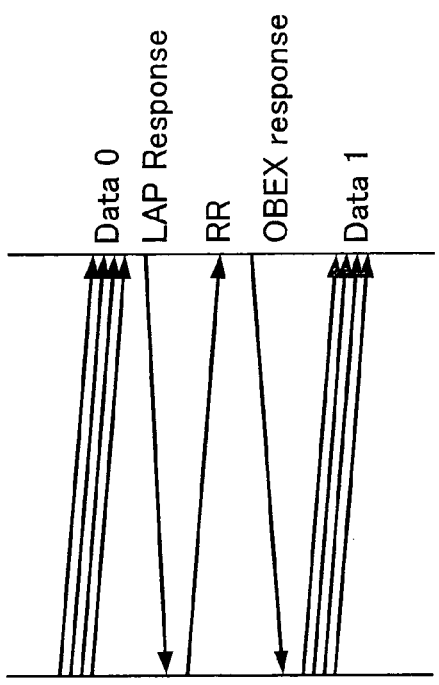
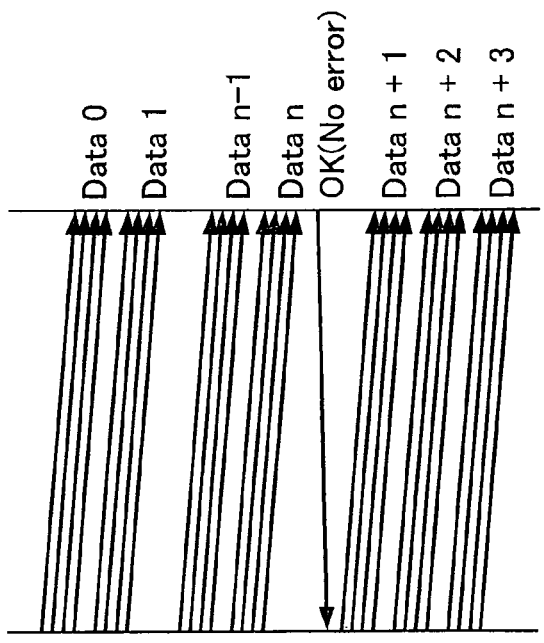

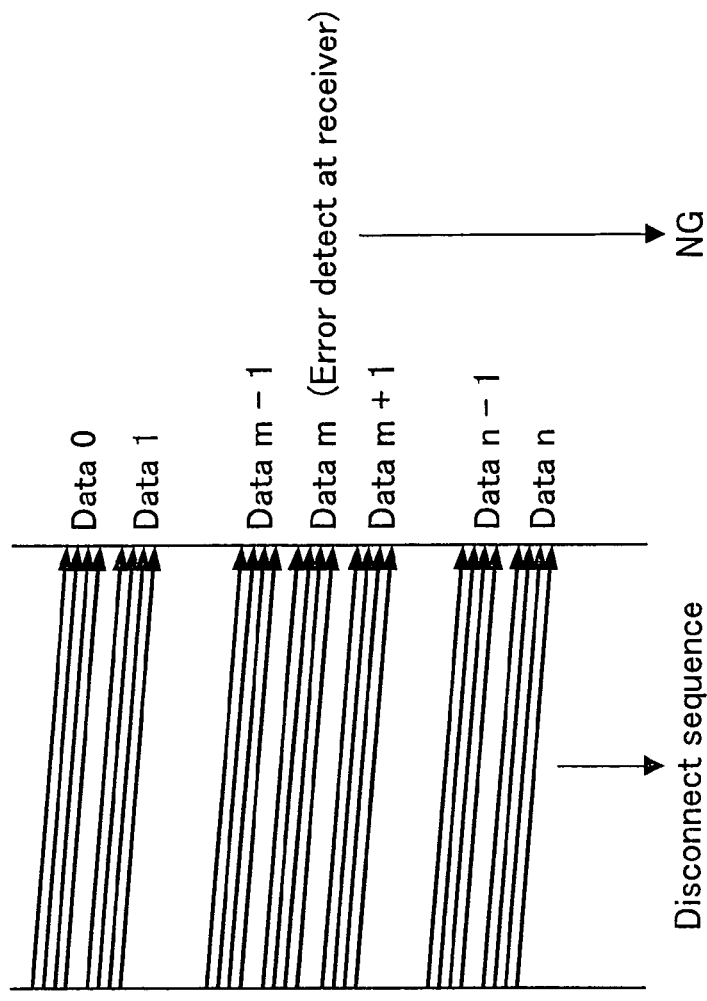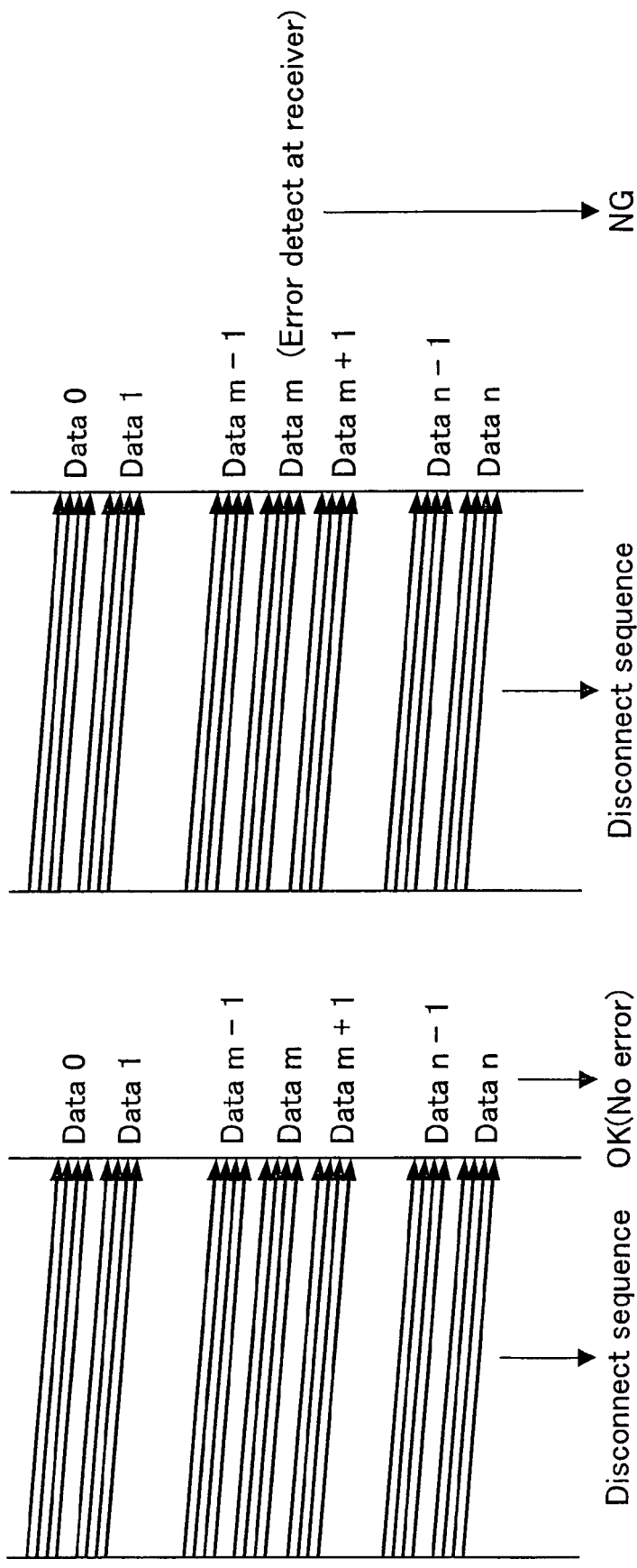

FIG. 35 (a)

IrDA DATA FRAME (I FRAME)

| Addr | Nr/Ns | LSAP | TTP Header | OBEX Data |
|------|-------|------|------------|-----------|

FIG. 35 (b)

DATA FRAME OF PRESENT INVENTION (UI FRAME)

| Addr | UI | LSAP | sending right Sequential Number | OBEX Data |
|------|----|------|-------------------------------|-----------|

FIG. 36 (a)

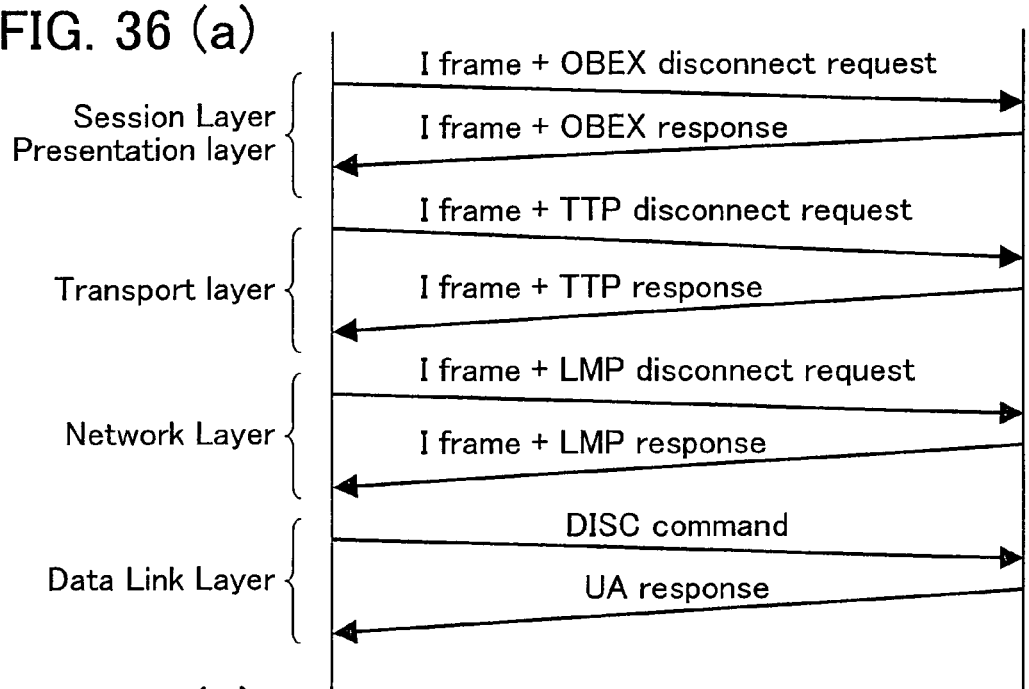

FIG. 36 (b)

I frame + OBEX disconnect request

| Addr | Nr/Ns | LSAP | TTP Header | OBEX disconnect request |

I frame + OBEX response

| Addr | Nr/Ns | LSAP | TTP Header | OBEX response |

I frame + TTP disconnect request

| Addr | Nr/Ns | LSAP | TTP disconnect request |

I frame + TTP response

| Addr | Nr/Ns | LSAP | TTP response |

I frame + LMP disconnect request

| Addr | Nr/Ns | LMP disconnect request |

I frame + LMP response

| Addr | Nr/Ns | LMP response |

DISC command

| Addr | DISC |

UA response

| Addr | UA |

TRANSMITTER, RECEIVER, COMMUNICATION SYSTEM, COMMUNICATION METHOD, NON-TRANSITORY COMPUTER READABLE MEDIUM

TECHNICAL FIELD

The present invention relates to a transmitter and a receiver which establish connection to carry out wired/wireless communication. The present invention also relates to a communication system, a communication method, and a communication program.

BACKGROUND ART

In recent years, picture quality of CCD (Charge Coupled Device), which is used in various mobile devices including a mobile phone, a digital camera, a digital video camera, and a PDA (Personal Digital Assistant), has increased, allowing easy image pick-up of digital image with high quality.

The image taken by a CCD is often stored in a storage medium, so as to be sent as an attachment file of an e-mail, transmitted as an image file via wired/wireless communication to be displayed in a different device, or printed on a paper to be handed from one to another. In this way, the image is used as shared data.

Wireless communication, particularly one using infrared light, is often used for data transfer in such various ways for sharing digital images. This communication method enables easy transfer of image files without physical connection or medium exchange from the mobile device to other display devices, a printing device, a recording device, other mobile devices, or to a personal computer.

Examples of the typical infrared communications using IrDA (Infrared Data Association) are described in the following Documents 1 through 5.

Document 1: Infrared Data Association Serial Infrared Link Access Protocol (IrLAP) Version 1.1 (Jun. 16, 1996)
Document 2: Infrared Data Association Serial Infrared Physical Layer Specification Version 1.4 (May 30, 2003)
Document 3: Infrared Data Association Link Management Protocol (IrLMP) Version 1.1 (Jun. 23, 1996)
Document 4: Infrared Data Association 'Tiny TP': A Flow-Control Mechanism for use with IrLMP Version 1.1 (Oct. 20, 1996)
Document 5: Infrared Data Association Object Exchange Protocol (OBEX) Version 1.3 (Jan. 3, 2003)

To make the communication more flexible, a conventional communication method using IrDA or wireless LAN strictly defines a data link layer (or link layer), a transport layer, an application layer etc., and carries out negotiations, retransmission etc. in each layer. Further, in the negotiation for establishing connection, the IrDA-D1.1, which generally performs communication with a large number of terminals, focuses on secure connection for all terminals, thereby requiring many sequences. In addition to this, confirmation of transmission in the link layer or in the MAC layer, which is a part of the link layer, is carried out on the packet basis in the IrDA-D1.1. Note that, a personal computer (PC) carries out plural-transmission, while the all other devices mostly carry out single-transmission.

In spite of the flexibility for realizing various applications, those rigorous communication layers are defined through a complicated procedure, thereby increasing the overhead required for communication. The complicated procedure, which results from rigorous separation of layers, particularly causes an increase of communication overhead. Moreover, though the confirmation of retransmission for each packet helps to increase communication reliability, it also decreases communication speed.

The connection overhead can be ignored in a long time communication, but it becomes a serious problem if the data is transferred in a short time. The rigorous retransmission also decreases communication efficiency. Particularly, when a person carries out operation for instantly transmitting data, it is sometimes preferable that the operation (communication) is completed in a short time, and the person can carry out retransmission if the transmission fails. For example, when an infrared remote controller of TV or the like failed to receive a command for changing the channel, and therefore the TV did not carry out the command, the user may operate to reissue the command for channel change.

There are many advantages in the conventional method of using strictly-separated layers, establishing connection for each layer, and carrying out retransmission on the packet basis. Therefore, by adding a function of changing communication procedure according to communication condition, application, and/or user's instruction, more flexible communication is realized.

The following will explain an existing IrDA protocol as a prior art of the present invention.

Since the infrared light used for infrared communication such as IrDA has directivity, a shield between the devices will completely disable data transfer. However, if there is no shield between the devices, high-speed data transfer is possible.

IrDA is broken into Very Fast IR (VFIR) with a maximum speed of 16 Mbps, Fast IR (FIR) with a maximum speed of 4 Mbps, and SIR (Serial Infra Red) with a maximum speed of 115.2 kbps. However, in commercially available products, the maximum speed is up to 4 Mbps.

FIG. 27 shows a schematic procedure of establishment of data transfer state through the IrDA standard, which is one of standards of infrared communication. In this example, "establishment of data transfer" means establishment of a state in which the system becomes capable of data transfer of target images, documents etc.

A first station serves to look for the other party at the beginning of transmission. That is, the first station requires establishment of data transfer state and outputs a "station search command (XID command)". On the other hand, a second station serves to accept the request and outputs a "station search response (XID response). A request (order) from the first station to the second station is called a command, and a reply from the second station to the first station is called a response.

The XID command serves to look for a potential second station within a certain distance in which the first station is capable of transmission. The slot numbers denote ascending numbers sequentially put on the commands.

After receiving the XID command, the second station outputs the XID response, that is a "station search response, so as to notify the first station of its existence. The first station outputs a predetermined number of XID commands, and then outputs the final XID command labeled with the slot number 255. That is, the command with the slot number 255 is the final command.

Next, the first station notifies the second station of the setting values required for communication, such as data size, using a SNRM command. The second station receives the command and carries out comparison between the received setting value and its own setting value, and then transmits a UA response to the second station so as to notify an allowable value.

The following more specifically describes establishment of data transmission state.

In IrDA standard, the number of packets of XID command transmitted from the first station is often selected from 1, 6, 8, or 15. As shown in FIG. 27, when 8 packets of XID command is transmitted each time, the 1st to 8th packets are given slot numbers from 0 to 7. Then after outputting the 8 commands, the final XID command with the slot number of 255 so that the receiving end will notify that it is the final packet. That is, if the predetermined number is 8, 9 XID commands are required. Then, after 500 m seconds since the final packet is sent, the 1st through 8th packets are transmitted again. These packets are transmitted with a time interval of 25-85 m seconds.

The second station does not always output the XID response immediately after receiving the XID command, but outputs the response after receiving a packet with an arbitrary (a random value) slot number. For example, when 8 packets of XID command is transmitted each time, the second station arbitrarily determines whether it outputs the XID response after receiving the 1st packet or after receiving the 8th packet. For example, in FIG. 27, the second station outputs the XID response after receiving the fourth packet (slot number=3).

According to SIR, IrDA standard specifies that the XID command and the XID response are transferred at 9600 bps. This is much slower than the transfer speed of data frame (described later), which is sent at 4 Mbps. Also, because of the transmission of plural XID commands, unreliability for immediate response, and the 500 ms blank period after 2 to 16 XID commands are sent, transmission/reception of the XID command and the XID response takes a longer time.

Through these processes, the search for the receiving end is completed, and the first and the second stations become ready to establish connection in data link layer.

After the search, the first and second stations exchange a SNRM command and an UA response in the data link layer. The SNRM command contains data required to set parameters for data communication, such as communication speed, upper limit of packet size, maximum time to hold the transmission right, allowable number of packets for continuous transmission, number of dummy pulse given to stabilize optical characteristic in 115 kbps or 9600 bps communication, minimum waiting time for transmission after the packets arrive from the other end, duration of disconnection state which occurs when the volume of the received packets is less than the default value, and plural different connection addresses given to the respective devices etc. With this process, the connection in the link layer is completed, and data transfer condition is satisfied.

After the data transfer condition is thus satisfied, the connection is also established in the upper layers. FIG. 27 shows a sequence of connection establishment in the network layer, transport layer, and session layer. This figure shows a state after the establishment is completed, and all processes are performed in the way of data exchange (by exchanging I flames (described later)).

Conventionally, the transmission through IrDA standard can be performed at 4 Mbps when a high-speed communication mode is applied, however, the waveform in transmission/reception is specified as 4 PPM mode. FIG. 29 shows a relation between data and data pulse in the 4 PPM mode. As shown in the figure, (1), (2), (3) and (4) express 00, 01, 10 and 11, respectively, that is, a data pulse of each of four 125 ns periods making up a 500 ns period expresses different 2-bit information depending on where in the time period it is placed.

Further, in IrDA standard, transmission is performed on a frame basis. FIG. 30 shows a frame of IrDA standard, which is constituted of a preamble field, a start flag, an address field, a control field, a data field, a FCS, and a stop flag. Among these, the preamble field is used for generation of reception clock which is used in a reception circuit of the device in the receiving end. Further, the FCS includes a code for error detection, for example, an error detection code or an error correction code.

Further, there are various kinds of frames, such as an I (Information) frame for information transfer, an S (Supervisory) frame for supervision/control of communication, or a U (Unnumbered) frame for connection or shutdown of communication. The information for identifying those I, S U frames is contained in the control field.

Since data transmission cannot be completed within 1 frame in most cases, the data is divided into plural I frames. Each of I frames contains the main data (data to be transmitted) in the data field, and is given a sequence number by which any omission of data can be found. With this arrangement, highly-reliable communication is realized. The S frame has no data field for containing data, and is used for transmission of notification of condition, such as establishment of communication, or a busy state, or used for a request for retransmission or the like. The U flame is called a non-numerical frame as it has no sequence number like those of the I frames. The U frame is used for setting of communication mode, report of response and irregular condition, or establishment of data link.

FIG. 31 is a sequence diagram showing general procedure of the foregoing communication mode. The A station transmits SNRM frame to the B station so as to request establishment of data transfer state. After receiving the SNRM frame, the B station outputs the DM frame when communication is not possible, and outputs a UA flame indicating acceptance of the request when communication is possible. The SNRM frame, DM frame, UA frame are all U frames. When the station B transmits the UA frame, data transmission state is established in both A and B stations, and data transfer becomes ready to be performed.

In this example, the A station transmits data having been divided into I frames to the B station. First, the A station transmits the first data frame, a 0th I frame to the B station. The B station transmits a response frame (data transfer request frame) given a number "1" (next to "0") as a command indicating "transmit the first data". This response frame is a RR frame, one of the S frames. After confirming the response frame from the B station, the A station transmits the first I frame containing divided frames. This procedure is repeated for a required times, thereby improving communication accuracy in communication of a plurality of I frames.

Alternatively, it is also possible to use a data transfer method in which a plurality of 1 frames are serially transmitted from the A station. In this case, when all I frames are transmitted, the station A transmits a DISC frame (U frame), indicating a command of shutdown, to the B station, so as to terminate the connection. Then, when the B station transmits a UA frame (U frame) indicating acceptance for shutdown, the communication is shut off. Further, in the case of communication error or the like in either of the A or B station, the station transmits a request for shutdown, thus the communication is shut off.

In IrDA, wireless communication is performed in the manner above. However, due to the characteristics of light, when the infrared interface between the communication devices exceeds a certain angle (±15 in IrDA standard) or exceeds a certain distance (20 cm or 1 m in IrDA), the communication fails in process of transmission even when a highly reliable communication method is employed.

This is because search for station and information exchange takes some time in the IrDA transmission, requiring frequent confirmation of data transmission/reception between the transmitter and the reception device, thereby decreasing transfer efficiency. As a result, the communication is more likely to fail in process of transmission.

For example, Japanese Laid-Open Patent Application Tokukai 2004-509527 (published on Mar. 25, 2004) discloses a method of transferring a file from one device to another via wireless communication so as to displaying the file in a device in the receiving end, but the same problem occurs when infrared light is used.

DISCLOSURE OF INVENTION

An object of the present invention is to provide a transmitter, receiver, communication system, communication method, communication program, which allow quick establishment of connection.

In order to solve the foregoing problems, the transmitter according to the present invention is a transmitter which carries out communication with a receiver by establishing connection of their plurality of communication layers, the transmitter comprising: connection request generating means for generating a connection request containing a command and data required for connecting a number of contiguously adjacent layers among the plurality of communication layers; and connection request transmitting means for transmitting the connection request to the receiver.

The receiver according to the present invention is a receiver which carries out communication with a transmitter by establishing connection of their plurality of communication layers, the receiver comprising: connection request receiving means for receiving a connection request containing a command and data required for connecting a number of contiguously adjacent layers among the plurality of communication layers; and connection establishing means for extracting the command and data from the connection request, and establishing connection for the plurality of communication layers based on the command and data.

Further, a communication system according to the present invention is a communication system includes a transmitter and a receiver which carry out communication by establishing connection of their plurality of communication layers, the transmitter comprising: connection request generating means for generating a connection request containing a command and data required for connecting a number of contiguously adjacent layers among the plurality of communication layers; and connection request transmitting means for transmitting the connection request to the receiver, the receiver comprising: connection request receiving means for receiving a connection request containing a command and data required for connecting a number of contiguously adjacent layers among the plurality of communication layers; and connection establishing means for extracting the command and data from the connection request, and establishing connection for the plurality of communication layers based on the command and data.

With this arrangement, the plural communication layers may be connected by a single connection request. Therefore, all commands and data required for connecting plural layers can be joined in a single connection request.

In this way, the time taken to establish connection is reduced compared with a protocol in which a connection request is sent for each communication layer, such as the IrDA-D1.1. Therefore, even when the connection is cut off during the data exchange, the connection can be established again without taking much time, allowing quick recovery of data exchange.

Further, the structure of the communication system of the present invention may generate other requests in the similar way, for example, it is capable of generating a disconnection request for cutting off the connection.

Additional objects, features, and strengths of the present invention will be made clear by the description below. Further, the advantages of the present invention will be evident from the following explanation in reference to the drawings.

BRIEF DESCRIPTION OF DRAWINGS

FIG. 1(a) is a sequence view illustrating a data transfer method according to the IrDA-D1.1 protocol.

FIG. 1(b) is a sequence view showing one embodiment of data transfer system and data transfer method of the present invention according to the communication function 1.

FIG. 9(a) is a sequence view showing a data transfer method according to the IrDA-D1.1 protocol.

FIG. 9(b) is a sequence view illustrating a data transfer method according to the communication function 4.

FIG. 28 is a view illustrating a correlation between data and data pulse in a 4 PPM mode.

FIG. 32(a) illustrates a sequence for data exchange in IrDA.

FIG. 32(b) illustrates a sequence of data exchange in the communication functions 4 and 7.

FIG. 32(c) illustrates a sequence of data exchange in the communication functions 4 and 7.

FIG. 33(a) illustrates a sequence of data exchange in the communication functions 5 and 8.

FIG. 33(b) illustrates a sequence of data exchange in the communication functions 5 and 8.

FIG. 35(a) illustrates a packet format used in data exchange according to IrDA.

FIG. 35(b) illustrates a packet format used in data exchange according to the preset invention.

FIG. 36(a) illustrates a disconnection sequence in IrDA.

FIG. 36(b) illustrates a packet format used in the disconnection sequence according to IrDA.

BEST MODE FOR CARRYING OUT THE INVENTION

Figure 2:
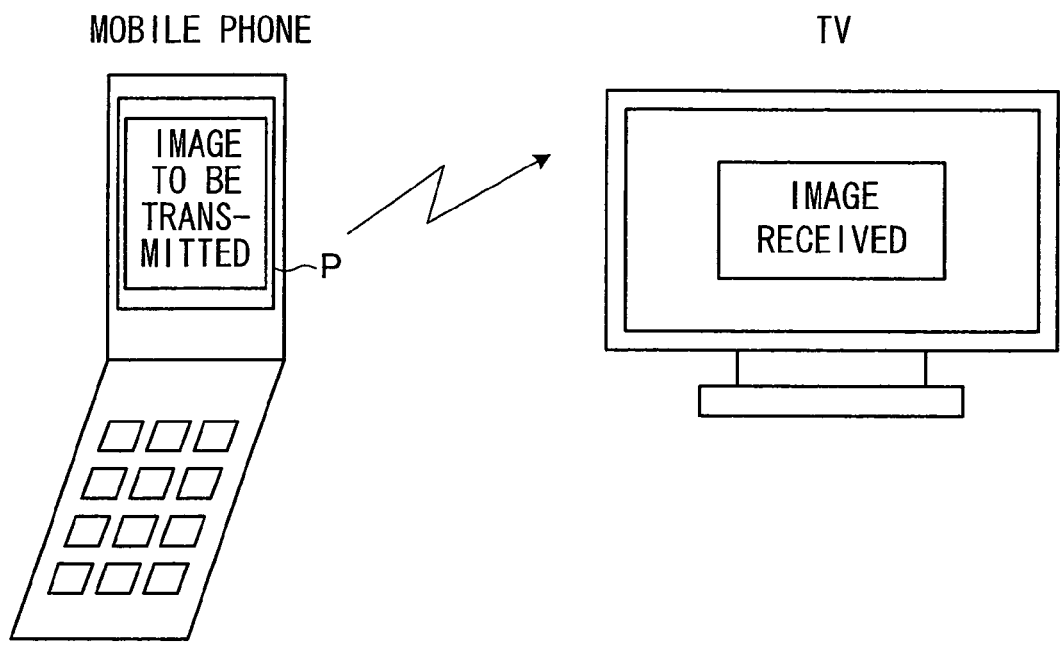
FIG. 2 is a structure view illustrating the data transfer system constituted of a mobile device and a display device serving as an electronic device.
Figure 3:
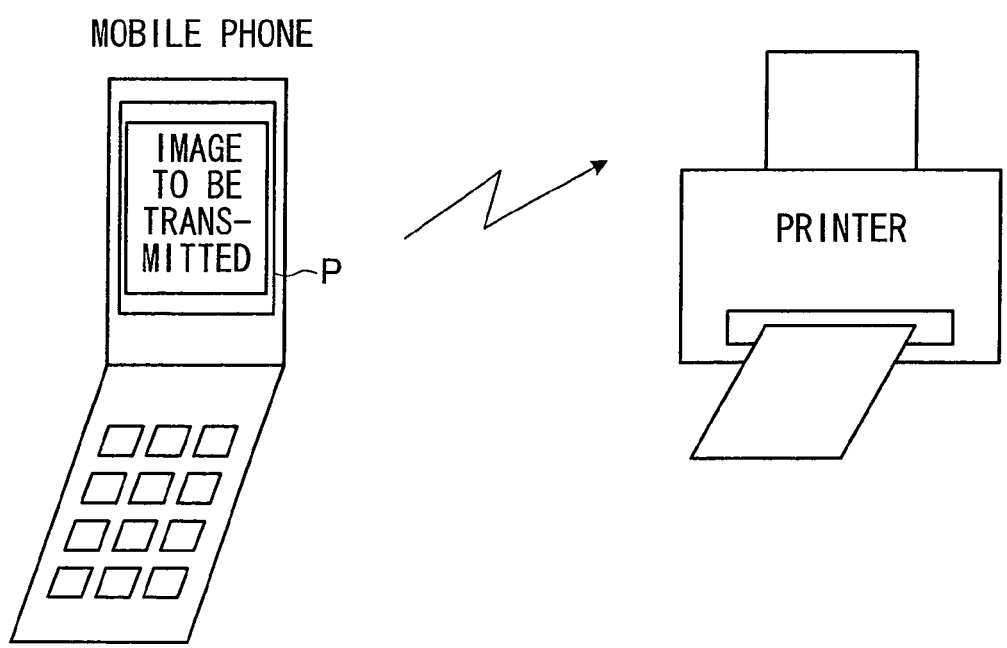
FIG. 3 is a structure view illustrating the data transfer system constituted of a mobile device and a printing device serving as an electronic device.
Figure 4:
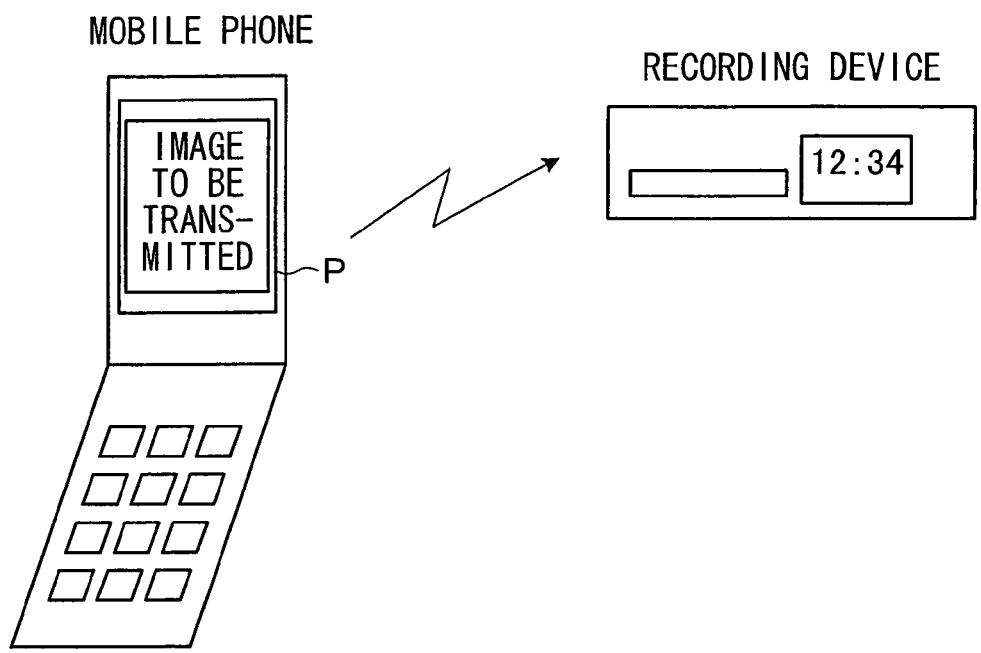
FIG. 4 is a structure view illustrating the data transfer system constituted of a mobile device and a recording device serving as an electronic device.
Figure 5:
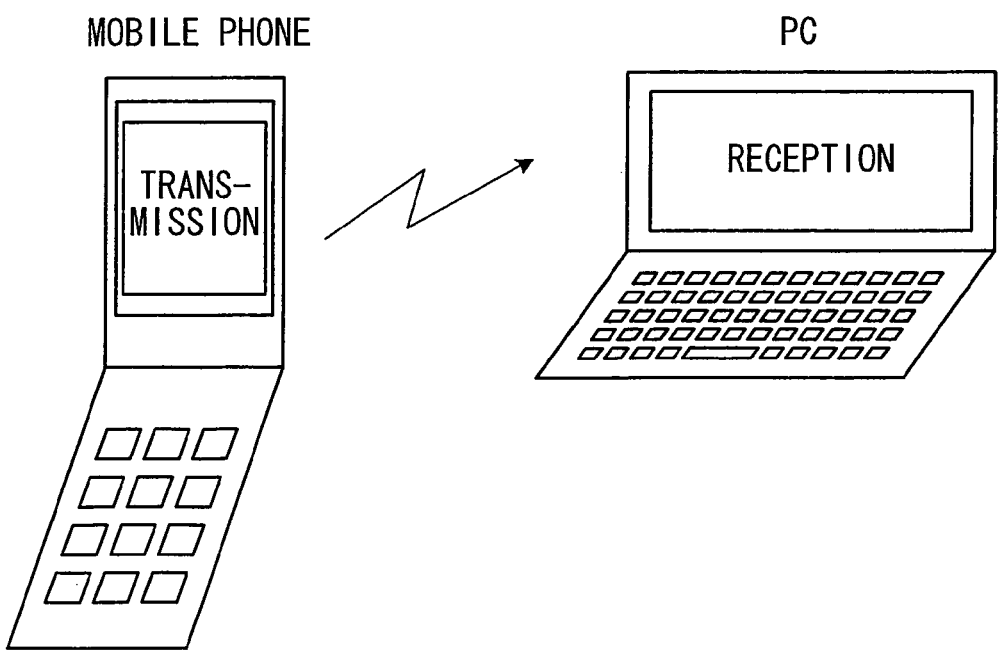
FIG. 5 is a structure view illustrating the data transfer system constituted of a mobile device and another mobile device serving as an electronic device.
Figure 6:
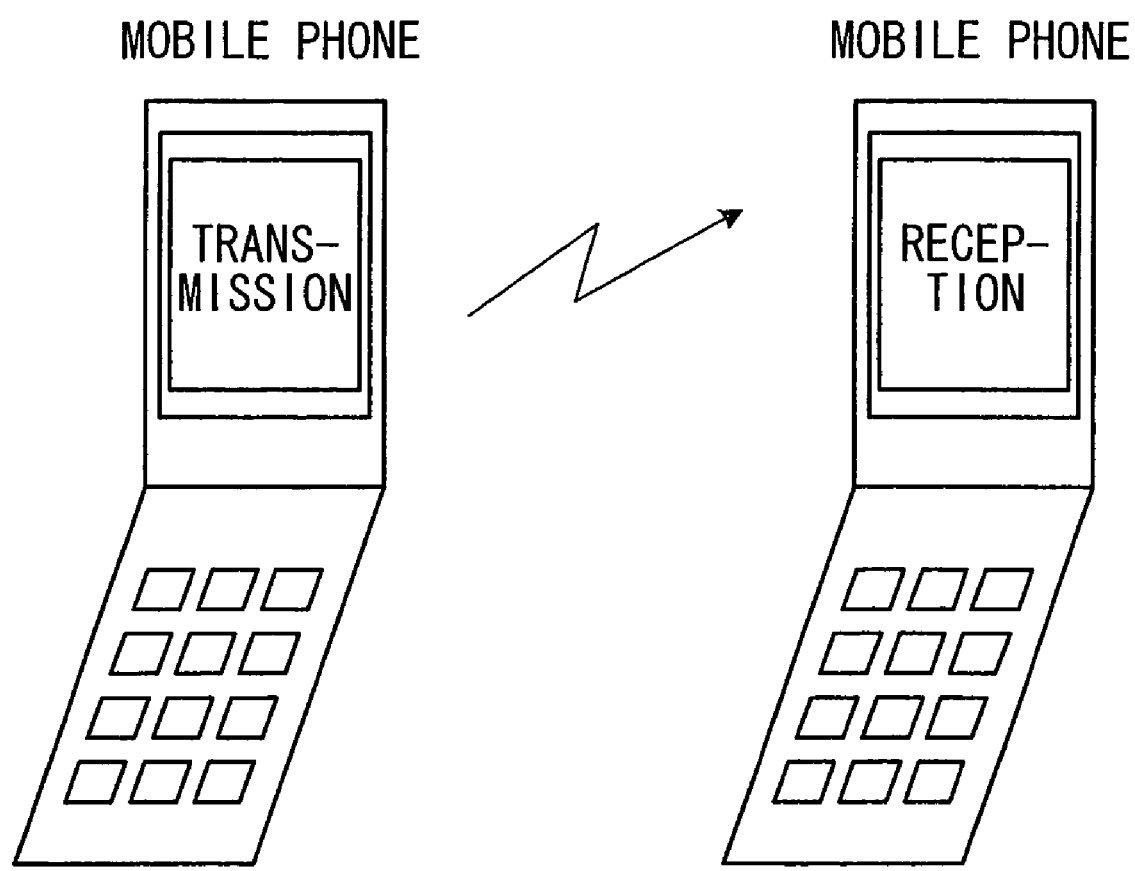
FIG. 6 is a structure view illustrating the data transfer system constituted of a mobile device and a personal computer serving as an electronic device.

An embodiment of the present invention is described below. Note that, though the embodiment below employs a data transfer method (transmission method) using infrared light, the present invention is not limited to this method. For example, optical transmission using other light than infrared light or other wireless communication mode may be employed.

Note that, the communication functions 1 through 9 are used in this specification with the following characteristics. The communication function 1 uses a shorter connection sequence (response is sent from the other end). The communication function 2 uses a shorter connection sequence (response is not sent). The communication function 3 uses a conventional connection sequence (e.g. IrDA). The communication function 4 carries out packet retransmission less frequently (response is sent from the other end). The communication function 5 carries out packet retransmission less frequently (response is not sent). The communication function 6 uses a conventional packet transmission method (e.g. IrDA). The communication function 7 has both functions of communication function 1 and communication function 4. The communication function 8 has both functions of communication function 2 and communication function 5. The communication function 9 has both functions of communication function 3 and communication function 6.

First Embodiment

One embodiment of the present invention will be described below with reference to FIGS. 1 through 9.

As shown in FIG. 2, a data transfer system according to the present invention is constituted of a mobile device, such as a mobile phone; and an electronic device, such as a display device. In this system, an arbitrary file stored in a storage medium of the mobile device is selected, and is transmitted to an infrared interface of the electronic device, allowing the electronic device to fetch the data. The arbitrary file may be an image file, image data, broadcast information, or document data (hereinafter simply referred to as "data"). Note that, the electronic device is not limited to a display device, but may be an printing device shown in FIG. 3; a recording device shown in FIG. 4 such as a DVD (Digital Video Disk) recorder, a CD (Compact Disk) recorder, a HDD (Hard Disk Drive: Hard Disk) recorder, or a VCR; other mobile devices shown in FIG. 5; or a personal computer shown in FIG. 6. Though a mobile phone is used as the first device of the present embodiment, the present invention also includes the case of realizing the first device by a device having a recording medium, such as a display device, printing device, recording device, or a personal computer.

Figure 7:
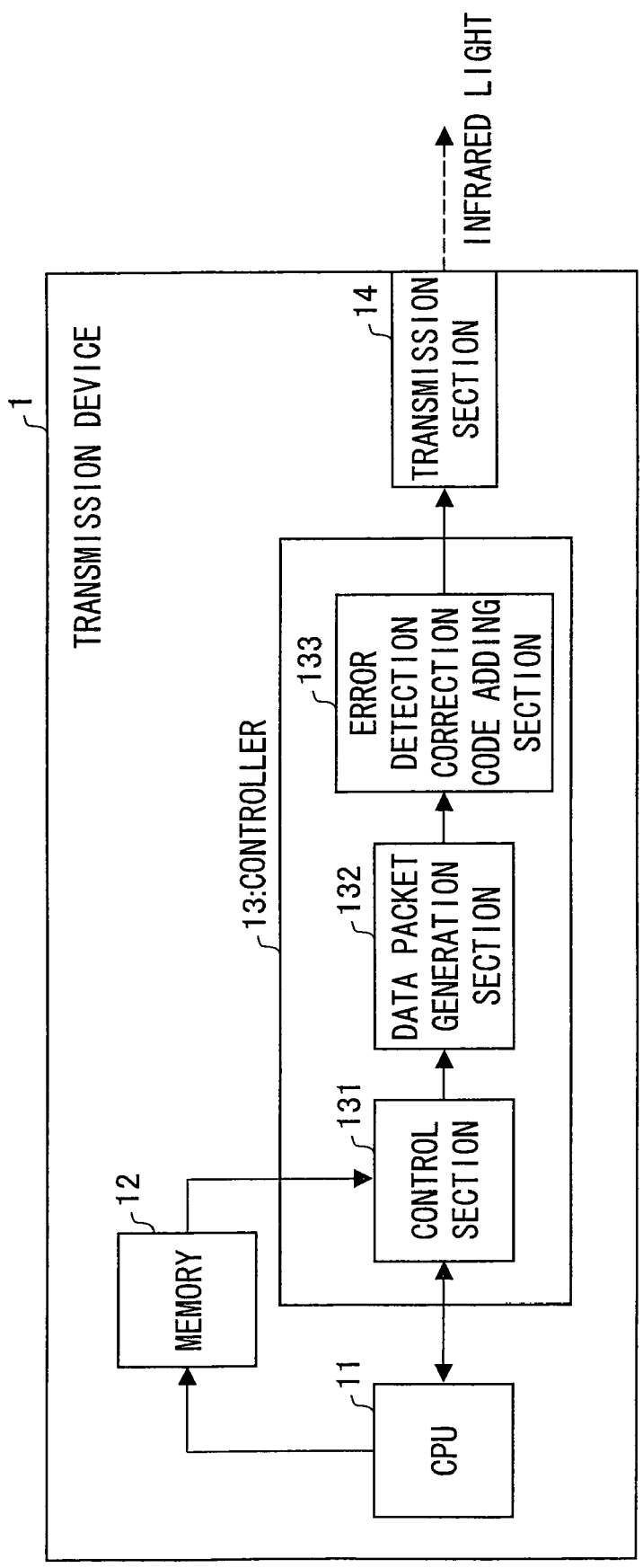
FIG. 7 is a block diagram illustrating a transmitter of the mobile device.

The mobile device and the electronic device each contain a transmitter 1 for performing data transmission. As shown in FIG. 7, the transmitter 1 includes a CPU 11, a memory 12, a controller 13, and a transmission section 14 as a wireless communication interface.

The CPU 11 carries out a predetermined operation, such as transfer of data, in response to instruction by the user supplied to an operation section (not shown). After receiving an instruction of data transfer from the operation section, the CPU 11 stores a target transfer data into a memory 12 and makes request for data transfer to the controller 13. Then, after receiving from the controller 13 a transmission-completed notification, which indicates end of transmission of the target data, the CPU 11 terminates data transfer operation.

The memory 12 temporarily stores target transfer data. This is performed through writing of the transfer data into the memory 12 by the CPU 11. In the present embodiment, the memory 12 also functions as storing means for storing a program and data for realizing the various communication functions. The various communication functions denote the following first to eighth communication functions.

(1) First and second communication functions in which search, connection in data link layer, and connection in upper layer are carried out at the same time (2) Fourth and fifth communication functions in which only one response is sent to the plural divided packets of upper layer data, which are sequentially transmitted (3) Seventh and eighth communication function having functions of the first and fourth communication functions, or the functions of the second and fifth communication functions The controller 13 controls transfer of target data according to a transfer request from the CPU 11. The controller 13 includes a control section 131, a data packet generation section 132, and an error detection correction code adding section 133.

After receiving the request for data transfer, the control section 131 reads out a target transfer data from the memory 12, and transmits the data to the data packet generation section 132, and causes the data packet generation section 132 to produce a plurality of data packets. At this point, the control section 131 controls the length and interval of packets generated by the data packet generation section 132. Here, the control section 131 sets the packet length to a value not more than the maximum packet length, which depends on the data amount. This maximum value is detectable from the error detection correction code adding section 133 (described later).

Further, the control section 131 detects completion of transmission of all data packets for the transfer data having been read out from the memory 12, and outputs a transmission completion notification indicating the completion of transmission of target data to the CPU 11.

The data packet generation section 132 produces a plurality of data packets by dividing the transfer data received from the control section 131. At this point, the data packet generation section 132 divides the transfer data so that each data packet has the predetermined length specified by the control section 131. Consequently, the divided data items (1) through (N) are produced. Then, the data packet generation section 132 produces a set of data packets respectively containing the divided data items. More specifically, the data packet generation section 132 generates a data packet (1) containing a divided data item (1) to a data packet (N) containing a divided data item (N). Note that, transmission speed in sending these data packets thus produced by the data packet generation section 132 is controlled by the control section 131.

The data packet generation section 132 transmits the plurality of packets to the error detection correction code adding section 133 at a predetermined time interval, which is specified by the control section 131.

Figures 29, 30:
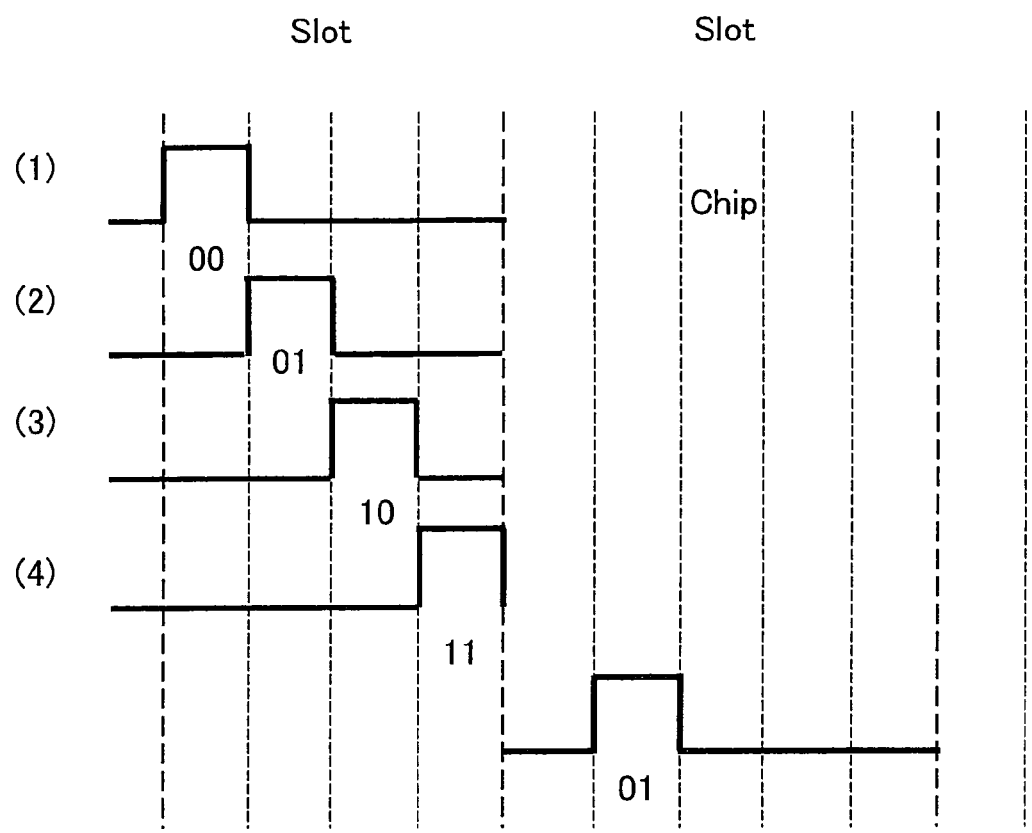
FIG. 29 is a drawing illustrating a frame of IrDA standard.
FIG. 30 illustrates a frame of IrDA protocol.
Figure 31:
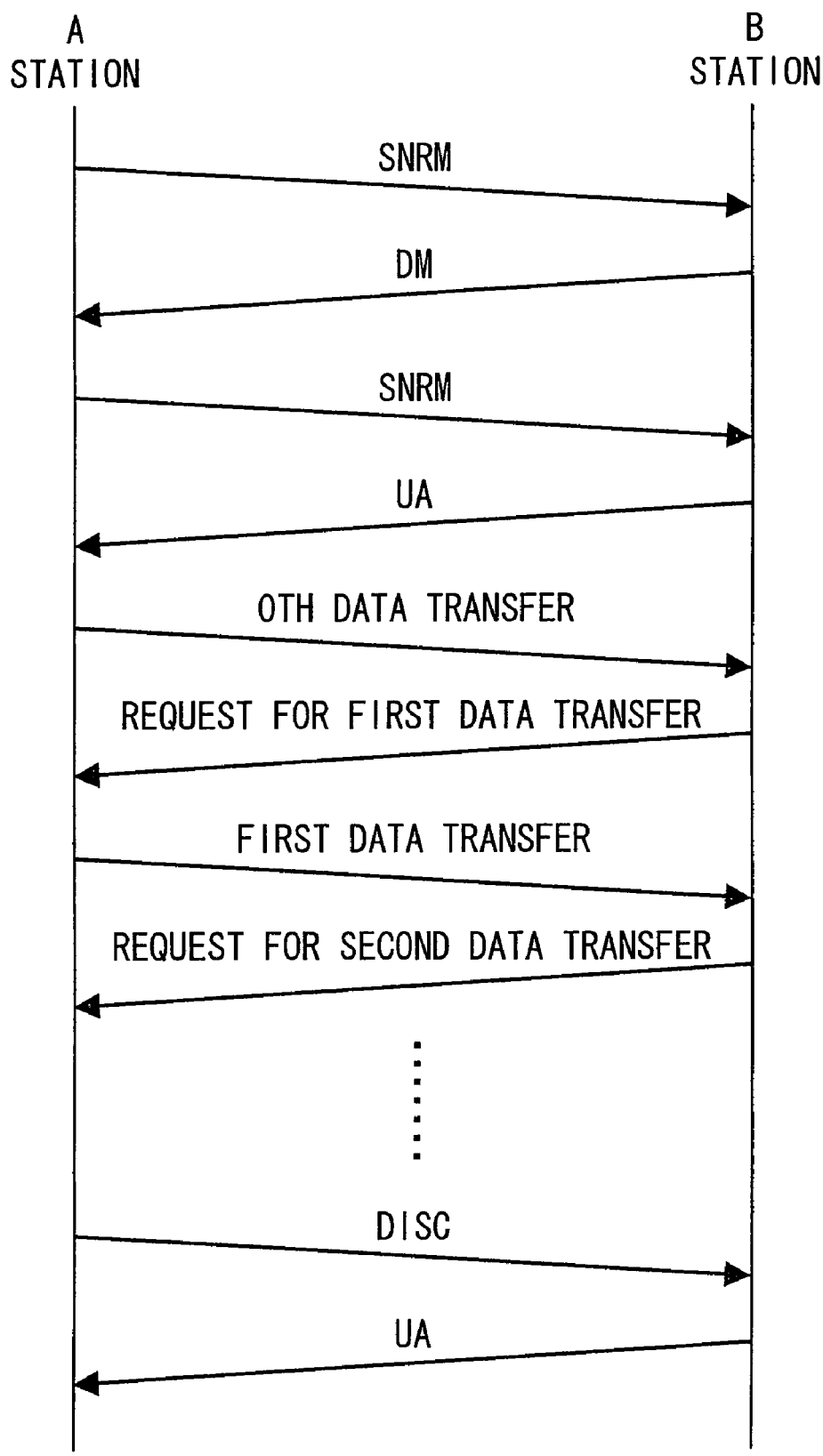
FIG. 31 is a sequence view for showing a general procedure of data transfer in the IrDA protocol.

Here, as shown in FIG. 30, each data packet includes a preamble field, a start flag, an address field, a control field, a data field, a FCS and a stop flag.

The error detection correction code adding section 133 adds an error detection code or a correction code to the data packet produced in the data packet generation section 132 before transmitting the data packet to the transmission section 14 at a later stage. The error detection correction code adding section 133 places the error detection code or the correction code in the FCS section of the data packet.

Note that, the error detection code (see Document 2) is a cyclic code, such as a CRC (Cyclic Redundancy Check), while the correction code is a BCH code, such as a parity examination code, a hamming code, or a Reed-Solomon code. The CRC code has a specific length, and the detectable data amount depends on this length. More specifically, the CRC code is 16 bits, 32 bits, etc., and a 16 bits CRC code can detect 100% of 1-bit error in the data up to 2048 bytes.

The transmission section 14 outputs a plurality of packets received from the controller 13 at a predetermined time interval via an infrared communication path.

The electronic device according to the present embodiment includes a receiver for receiving data. The following describes the receiver 2 with reference to FIG. 8.

Figure 8:
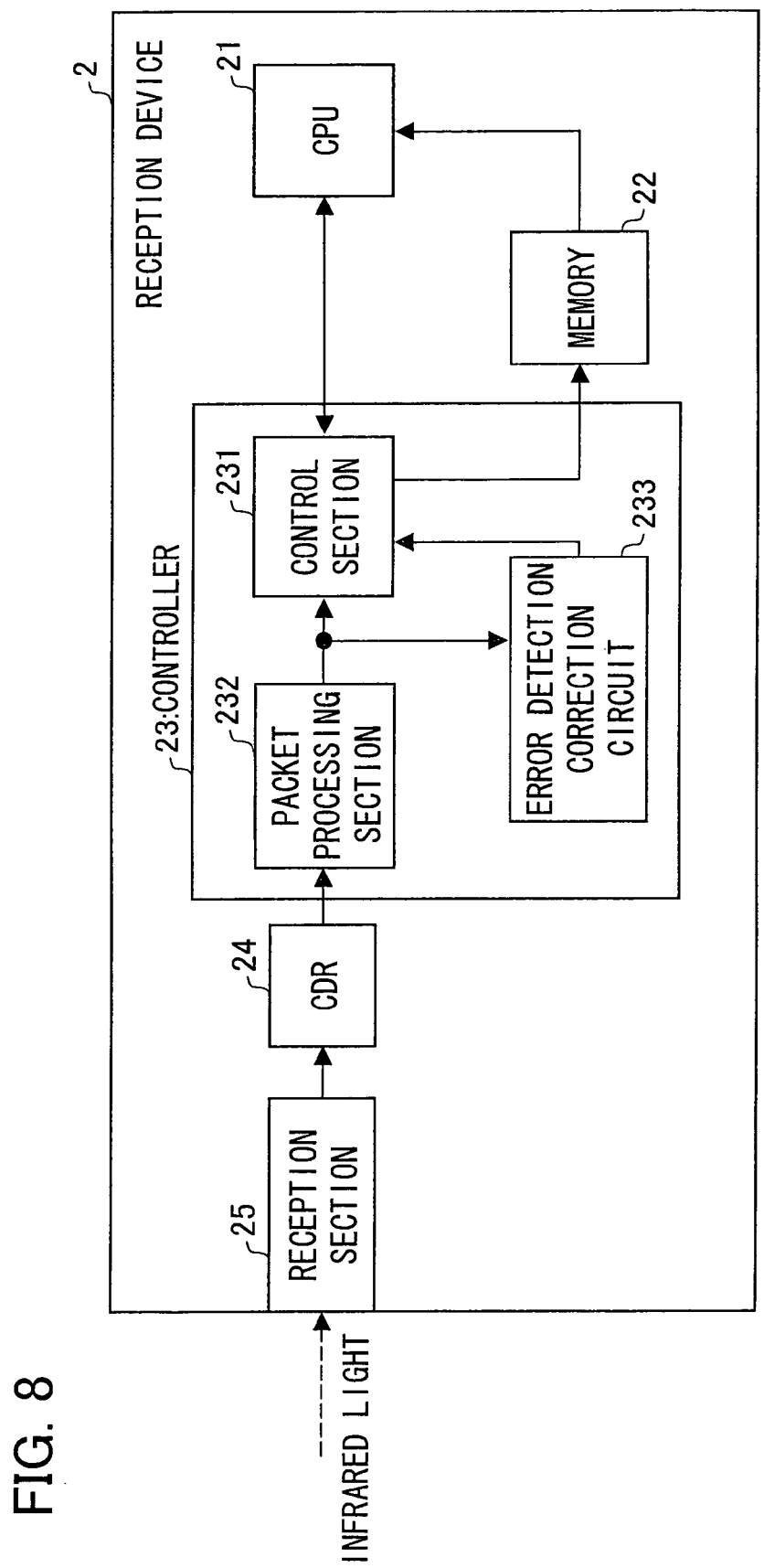
FIG. 8 is a block diagram illustrating a receiver of the mobile device.

As shown in FIG. 8, the receiver 2 includes a CPU 21, a memory 22, a controller 23, a CDR 24 and a reception section 25 serving as a wireless communication interface.

The reception section 25 receives the packet which has been transmitted from the transmitters via an infrared communication path. The reception section 25 transmits the packet to the CDR 24.

The CDR 24 extracts (recover) a clock signal and a data signal from the received packet. Then, the CDR 24 transmits the clock signal and the data signal to the controller 23.

The controller 23 carries out predetermined control operation with respect to the packet received from the CDR 24. The controller 23 includes a control section 231, a packet operation section 232 and an error detection/correction circuit 233.

The packet operation section 232 receives the packet recovered by the CDR 24, and detects the start flag and the stop flag. Then, the packet operation section 232 extracts the data field and the FCS section from the packet. More specifically, the packet operation section 232 extracts information contained in the data field of packet received in the receiving section 25, as well as the error detection code or the correction code with respect to the information. The packet operation section 232 then transmits the information and either the error detection code or the correction code thus extracted to the control section 231 and the error detection/correction circuit 233.

For example, upon reception of the packet, the operation section 232 extracts the data and the error detection code or the correction code from the data packet, and transmits the data and the error detection code or the correction code to the control section 231 and the error detection/correction circuit 233.

The error detection/correction circuit 233 carries out error detection and/or correction with respect to the received information, and sends the result to the control section 231.

The control section 231 carries out a predetermined operation according to a result transmitted from the error detection/correction circuit 233. More specifically, if it was found as a result of detection by the error detection/correction circuit 233 that there are no errors in the divided data, the control section 231 carries out writing of data into the memory 22, and informs the CPU 21 of completion of reception. On the other hand, when it was found as a result of detection by the error detection/correction circuit 233 that there is an error in the divided data, the control section 231 abrogates the data, and informs the CPU 21 of the reception error.

The memory 22 temporarily stores the data received from the reception section 25. This is performed through writing of the data into the memory 22 by the control section 231. In the present embodiment, the memory 22 also functions as storing means for storing a program and data for realizing various communication functions. As with the transmitter 1, the various communication functions are; a set constituted of the communication function 3 and at least one of the communication functions 1 and 2; a set constituted of the communication function 6 and at least one of communication functions 4 and 5; and a set constituted of the communication function 9 and at least one of communication functions 7 and 8. These communication functions 3, 6, 9 are IrDA, as described above.

The CPU 21 causes a display section (not shown) to display, for example, an image generated from image data stored in the memory 22.

Next, with reference to the sequence views shown in 1(a) and 1(b), the following explains data transfer operation between the transmitter 1 and the transmitter 2.

First, when infrared communication is carried out between the transmitter 1 and the receiver 2 with IrDA protocol, which is the communication function 3, exchange of XID command (station search command) packet and the XID response packet is performed as shown in FIG. 1(a).

However, in general infrared communication, the transmitter 1 held in the user's hand and the receiver 2 on the other end of communication are both visible by the user.

In this view, in the present embodiment, as shown in FIG. 1(b), the user perceives and selects a receiver to find an electronic device for communicating with the transmitter 1, which is a mobile device for example, instead of carrying out the packet exchange of the XID command (station search command) and XID response. More specifically, the use of the first communication function, which does not require search for the other end upon start of communication, allows omission of packet exchange of the station search command, thereby reducing time for transmission of image file. Concretely, the time consumed for station search in IrDA protocol is usually 3 to 4 seconds, and the time for transmission of the file is shortened by this amount.

Figure 27:
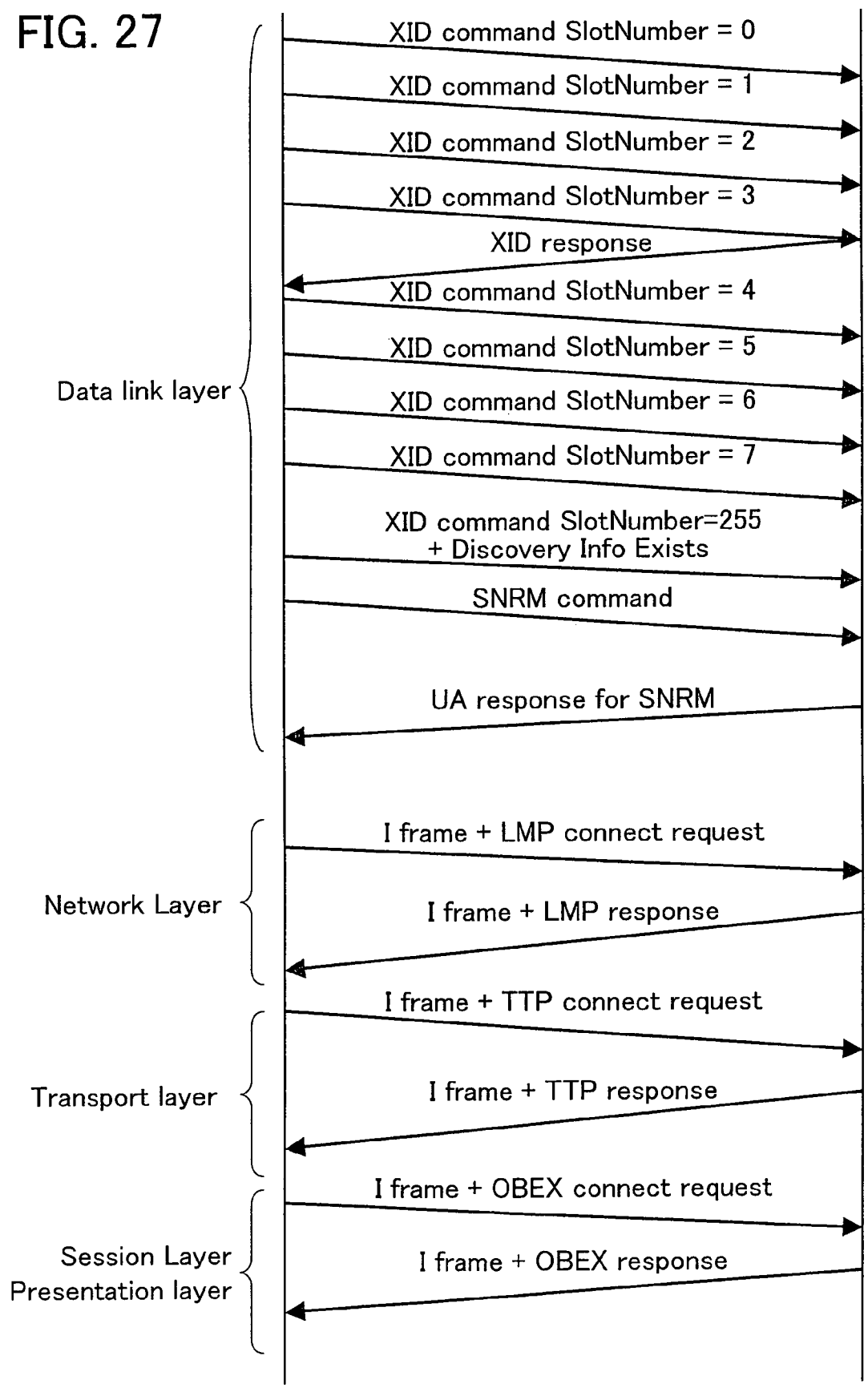
FIG. 27 is a sequence view showing a procedure for establishing data transfer state in IrDA standard.

Meanwhile, when communication begins according to IrDA protocol, as shown in FIG. 1(a) or FIG. 27, the respective devices exchange their various capabilities, for example, allowable communication speed, maximum turn around time, data size for each frame, window size, additional BOF, minimum turn around time, disconnect threshold time of the link etc., so as to carry out plural kinds of communications including a bidirectional data exchange, such as IrCOMM or IrFM. This exchange is performed by using a SNRM command/response.

However, with the arrangement of the present embodiment which only performs transmission of files, all parameters required for the transmission of file can be determined in advance.

Specifically, when the data size for each frame, the maximum/minimum turn around times etc. is determined in advance, the first station outputs the connection command including information of specific parameter desired to be changed. When there is no desired parameter is written in the connection command, the second station selects the predetermined value and sends a response to the first station so as to notify the final value as a negotiation value considering its own parameter. As with the first station, the second station is not required to specify the parameter in the response if the parameter is the same as the predetermined value. When there is no specific parameter in the command, the first station selects the predetermined value, and starts communication under the predetermined condition.

Further, for example, the first station declares that transmission is performed at a predetermined communication speed determined by the user, and outputs the connection command containing a parameter indicating that the response from the second station is not necessary. After receiving the connection command, the second station prepares for communication at the specified parameter without sending a response. Then, the first station outputs data. The procedure of this method is further simpler.

To still further simplify the procedure, all communication factors may be determined in advance so that the data transmission can be started even without transmission of the connection packet from the first station. In IrDA protocol, several to several tens times of packet exchange are performed for this information exchange, taking 1-2 seconds. Thus, in this arrangement omitting exchange of some of device information factors, and only 1 or 2 factors are exchanged, the information exchange takes about 100 ms.

However, the parameter of application is not always required to be set in advance, instead, an application parameter may be transmitted together with the connection packet. FIG. 11(a) shows an example of structure in which parameters for the upper layers are put behind the connection parameter of the data link layer so that they are transmitted together. In this manner, a single round of connection procedure establishes connection not only in data link layer but also in the upper layers (network layer, transport layer, session layer). FIG. 11(c) shows an example of connection packet.

By thus omitting some of device information items in data exchange, and exchanging only data informing minimum connection parameter and necessity of response at the beginning of communication, while fixing the values for the other parameters or sending the connection parameters of the upper layers together with the connection request for the data link layer, the time taken for the entire file communication can be further reduced, as shown in FIG. 1(b).

Further, in IrDA protocol, as shown in FIG. 9(a), after the first station transmits a data frame (I frame), the second station sends a response to the first station in order to ensure integrity of data (ensure proper data transmission).

However, when communication is performed with a mobile phone which is a hand-sized device, the angle or distance between the devices easily exceeds a certain range. In this case, there is a serious difficulty in carrying on communication even if the integrity of the protocol is thus ensured. Consequently, transmission error more often occurs, and the second station needs to frequently make a retransmission demand to the first station, requiring the first station to retransmit data to the second station frequently. This increases time for packet exchange.

In contrast, the present embodiment uses the communication functions 4 or 5 in which request for data retransmission is performed less frequently, or the data retransmission is not performed at all.

That is, in the present embodiment, the sender is able to visually confirm at once a result of data transmission if something visible is transmitted, with a record or display in the electronic device, allowing the user to obtain better communication condition by approaching the receiver or by changing the direction. On this account, it is possible to ease error handling. By thus employing the communication functions 4, 5 which transmit all of the requests for retransmission at the same time after receiving a plurality of data items, the time taken for file communication can be further reduced, as shown in FIG. 9(*b*).

FIG. 32(*a*) shows the sequence for retransmission in IrDA. In the IrDA-D1.1, the transmitter transmits data and the receiver sends back a response for lower layer (LAP), and then the transmitter grants the transmission right to the receiver (RR). Thereafter, the receiver sends back a response for upper layer (OBEX), and then transmits the next data.

When an error occurs, the notification of error is included in the response for lower layers, and the packet in question is retransmitted.

FIG. 32(*b*) shows general system operation of the present invention according to the communication functions 4 and 7, and FIG. 32(*c*) shows operation in the case of error. The transmitter puts a sequence number on each packet, and after transmitting a predetermined number of packets, grants the transmission right to the receiver, and asks the receiver if there is any problem in the data.

When the data was OK (no error is detected), the receiver notifies the transmitter of the proper reception. When an error is detected, the receiver ignores the data after the missed packet, and only confirms the part for granting the transmission right. Then, after obtaining the transmission right, the receiver inform the transmitter of packet number which has not been received. The "error" here denotes the case of detecting that the data in the packet is partly damaged by CRC, or a case of missing a certain number in the sequence.

When the proper transmission is notified, the transmitter carries on transmission and transmits the next packet. When an error is notified (with the number of packet not transmitted), the transmitter retransmits packets from the number notified by the receiver.

With this arrangement, the interval between the packets is reduced, thereby efficiently performing transmission.

FIG. 33(*a*) shows general system operation of the present invention according to the communication functions 5 and 8, and FIG. 33(*b*) shows operation in the case of error. The transmitter puts a sequence number on each packet, and transmits all data items in sequence. The receiver only confirms whether the transmission is properly done, and if it is confirmed in it that all data items are properly received, the receiver carries out the next operation, which is display, printing, storing etc. of the received data.

When the receiver detects an error, the error is recognized in it and carries out different operation, which is error indication to the user, stand-by for the next data etc.

However, because error handling is reduced in the structure of the present embodiment, the number of data packets and the number of response packets are reduced. On this account, the time taken for exchange of data packet and response packet is reduced, thus requiring little load of CPU. Accordingly, the effective speed of transmission with the power of a mobile phone will become 3.5-3.8 Mbps when FIR is used. For example, in the case of transmission of a 150 kByte 800000-pixel file (XGA: 1024×768) compressed by JPEG, it takes 0.6 seconds when the effective speed of IrDA protocol is 2 Mbps, and takes 1.2 seconds when 1 Mbps. However, since handling of error rate is reduced in the present embodiment, the effective speed is increased to 3.8 Mbps and therefore the transmission will take 0.31 seconds, or take 0.35 seconds when 3.5 Mbps. As a result, the communication speed is reduced almost to a half, thereby reducing the time taken for file communication.

Figure 10:
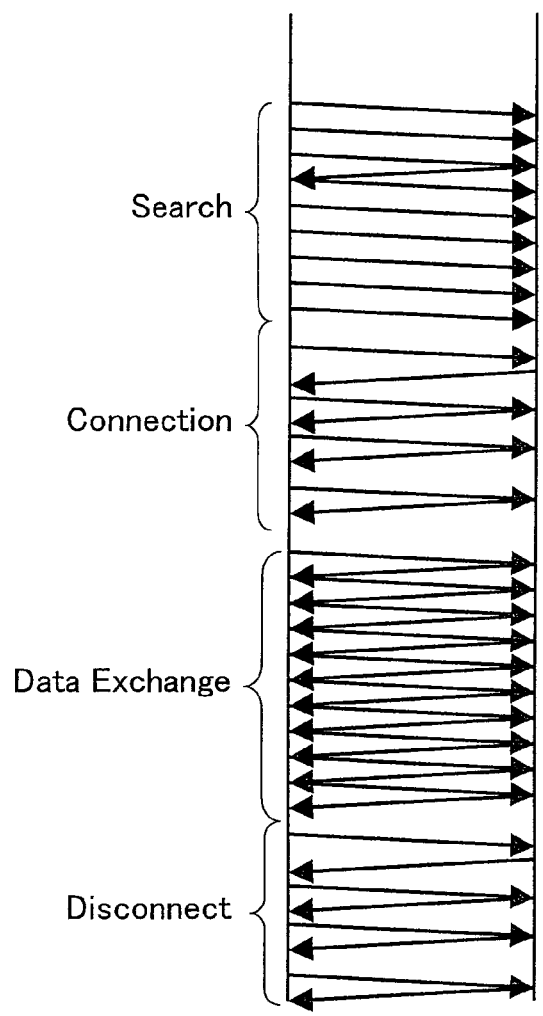
FIG. 10(a) is a sequence view showing a data transfer method according to the IrDA-D1.1 protocol.
FIG. 10(b) is a sequence view illustrating a data transfer method according to the communication function 7.
FIG. 10(c) is a sequence view illustrating a data transfer method according to the communication function 8.
Figure 10:
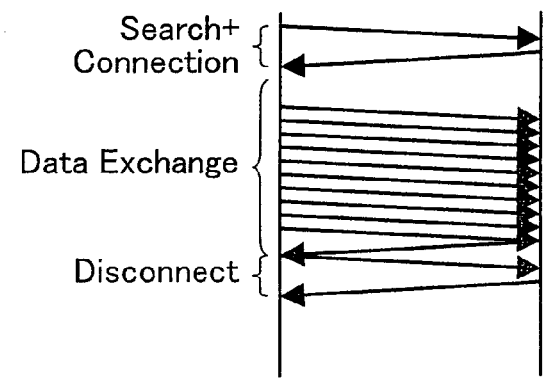
Figure 10:
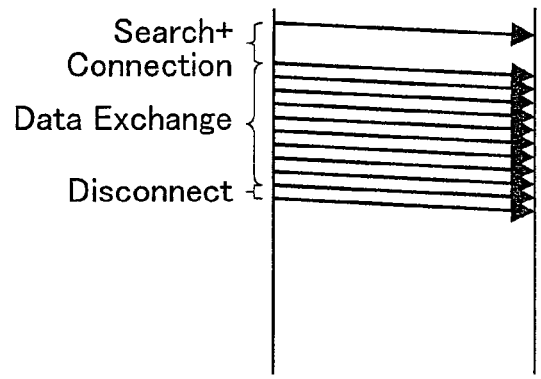

Further, when the seventh or eighth protocols each having the respective functions of two different communication functions is used, the time taken for file transmission with IrDA protocol, that is shown in FIG. 10(*a*), is further reduced, as shown in FIGS. 10(*b*) and 10(*c*).

For example, when the respective functions of two different communication functions are used in the foregoing transmission of 150 k Byte image file, the time taken for the whole communication is expressed as follows.

Station search (0.1 seconds)+data transmission (0.31 to 0.35 seconds)=total (0.41 to 0.45 seconds)

On the other hand, when the IrDA protocol is used for the same transmission, the communication time is expressed as follows.

Station search (3-4 seconds)+information exchange (1-2 seconds)+data transmission (0.6 to 1.2 seconds)=total (4.6 to 7.2 seconds)

As shown above, with the use of the seventh and eights protocols, the communication time becomes $\frac{1}{10}$ to $\frac{1}{17}$ of the communication using IrDA protocol.

When the communication takes about 5 seconds, the user may change the direction of the mobile phone or may think that the communication did not succeed. However, if the communication takes only about 0.5 second, there is little chance the user moves the mobile phone since the data communication will finish while the user is still operating the device. In this way, communication can be easily performed with a higher convenience.

As described, the data transfer system and the data transfer method according to the present embodiment is realized by a mobile device including a transmission sections 14 and a reception section 25 each serving as a wireless communication interface, and a storage medium (memories 12 and 22) for storing data; and an electronic device including a transmission section 14 and a reception section 25 and carries out recording of data. The mobile device and the electronic device each include storing means (memories 12 and 22) for storing the communication functions 1 and 2 which carries out search of the other end at the beginning of communication, and exchanges parameters required for establishing connection, controllers 13 and 23 serving as communication control means for controlling communication, the controllers 13 and 23 carrying out data transfer between the mobile device and the electronic device using the communication functions 1 and 2.

More specifically, to reduce communication time, the communication between the mobile device and the electronic device is performed by using the communication functions 1 or 2, which output a packet having both a searching function and a function as a command having a parameter required for establishing connection, instead of outputting the station search command (XID command in IrDA) used only for search of the other end is not outputted at the beginning of communication.

With this protocol, the station search command and station search procedure are not necessary, thereby reducing time for data transfer. On this account, it is possible to reduce probability of communication failure when the angle or the distance between the communication devices exceeds a certain value.

Further, in the data transfer system and the data transfer method according to the present embodiment, when using the communication function 1 or 2, the parameters required for connection are previously determined as default values, or the connection packet for a layer may contain connection parameters and/or commands for the upper layers.

By thus previously setting a fixed value for the parameter required for connection, or by using parameters for the upper layers and/or command contained in a single connection packet, it is possible to further reduce the time for establishing connection. On this account, it is possible to reduce probability of communication failure when the angle or the distance between the communication devices exceeds a certain value.

The followings are examples of default values for the data link layer.

Baud Rate: 4 Mbps, 115 kbps, 9600 bps (Communication Speed)

Maximum Turn Around Time: 1 s [transmitter (Primary)], 100 ms [receiver (Secondary)]

(Maximum Time to Hold Transmission Right)

Data Size: 2048 bytes (Maximum Length of a Single Packet)

Window Size: 1

(Allowable number of packets for continuous transmission)

Additional BOFs: 0

(Number of dummy pulse given to stabilize optical characteristic in 115 kbps or 9600 bps communication)

Minimum Turn Around Time: 0.5 ms (Minimum waiting time for transmission after the packets arrive from the other end)

Link Disconnect/Threshold Time: 1 seconds (Duration of disconnection state which occurs when the received packet is less than the default volume)

Minimum Packet Interval: 100 us (Time Interval Between the Packets)

Meanwhile, the command for upper layer may be an OBEX connect command and a response such as a success.

Further, in the data transfer system and the data transfer method used for the data transfer system according to the present embodiment, the mobile device and the electronic device do not perform retransmission of data when an error is detected. Otherwise, the data transfer system and the data transfer method are realized by a mobile device and an electronic device which respectively includes: the memories 12 and 22 serving as storing means for storing data and the communication functions 4, 5 which performs data retransmission less frequently, e.g. only once in a sequence of a large number of transmission data, when an error occurs during the communication; and controllers 13 and 23 serving as communication control means for controlling communication, the controllers 13 and 23 carrying out data transfer between the mobile device and the electronic device by using the communication functions 4 and 5.

More specifically, to reduce communication time, the communication between the mobile device and the electronic device is carried out the communication functions 4, 5 which performs data retransmission less frequently. In addition to this, the response for error information is made with a single packet.

Consequently, it is possible to reduce the number of frames and the number of response packets, which are generally exchanged quite frequently if the device is equipped with a data retransmission function. Therefore, the operation power of CPU for data retransmission can be saved, as well as data transfer time. On this account, it is possible to reduce probability of communication failure when the angle or the distance between the communication devices exceeds a certain value.

Further, the data transfer system and the data transfer method are realized by a mobile device and an electronic device which respectively includes: the memories 12 and 22 serving as storing means for storing data and the communication function 7 having functions of the first and fourth communication functions, or the communication function 8 having the functions of the second and fifth communication functions; and controllers 13 and 23 serving as communication control means for controlling communication, the controllers 13 and 23 carrying out data transfer between the mobile device and the electronic device by using the communication functions 7 and 8.

With this arrangement using communication functions 7, 8 respectively having functions of the first and fourth communication functions, and functions of the second and fifth communication functions, data transfer time is further reduced. On this account, it is possible to reduce probability of communication failure when the angle or the distance between the communication devices exceeds a certain value.

Further, in the data transfer system and the data transfer method used for the data transfer system according to the present embodiment, infrared (IR) communication is used as the wireless communication.

As described above, one of the data transfer methods using infrared light is IrDA standard. By using the structure of the present embodiment, for example, to each device in the IrDA data transfer system, it is possible to reduce probability of communication failure when the angle or the distance between the communication devices exceeds a certain value.

Second Embodiment

Figure 11:
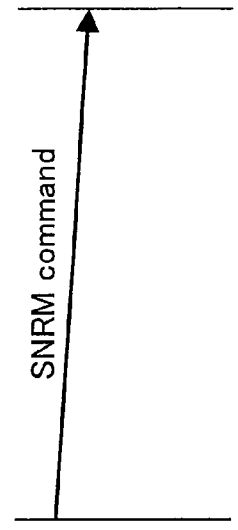
FIG. 11(a) is a sequence view showing a process for establishing communication according to the communication functions 1 and 7.
FIG. 11(b) is a sequence view showing a process for establishing communication according to the communication functions 2 and 8.
FIG. 11(c) shows a packet performance for establishing communication according to the communication functions 1, 2, 7 and 8. Note that, the response packet in the bottom layer is not used in the communication functions 2 and 8.
Figure 11:
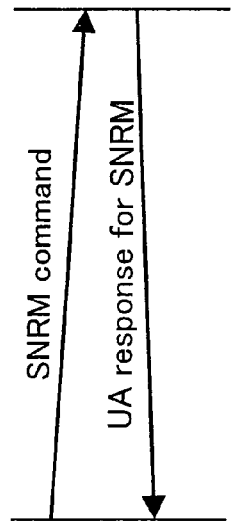
Figure 11:
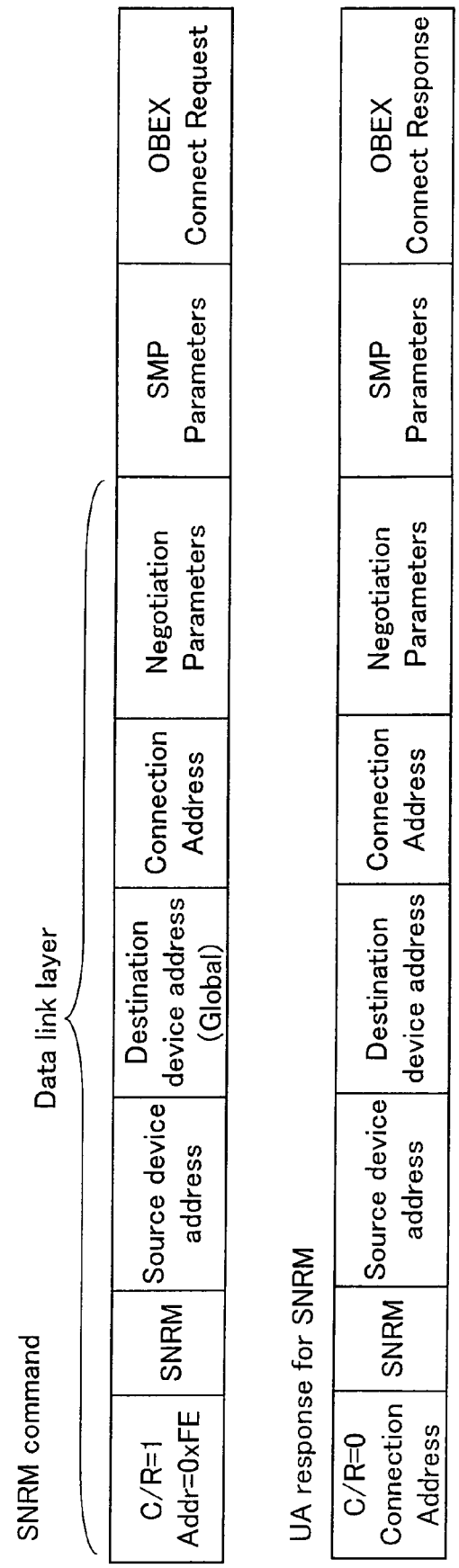

The following explains another embodiment of the present invention with reference to FIGS. 10 and 11. Note that, the structure of the present invention is identical to that of First Embodiment except for the differences explained below. For ease of explanation, materials having the equivalent functions as those shown in the drawings pertaining to the foregoing First Embodiment will be given the same reference symbols, and explanation thereof will be omitted here.

FIG. 10(*b*) shows an example using less number of connection processes so as to reduce the responses from the receiving end. Further, by carrying out one-way communication according to the communication function 8, the receiver does not need to have transmission function. Though such a one-way communication is not convenient in the general data communication because there is no way to confirm data reception, the present invention is free from this problem since the user can confirm the result of transmission of a still image or the like with his own eyes, which transmission is also made by himself with his mobile phone. FIG. 10(*c*) shows a sequence of one-way communication. The structure of packet for this communication is the same as that of FIG. 10(*b*).

FIGS. 11(*a*) and 11(*b*) show sequences of the present embodiment only for establishing connection, and FIG. 11(*c*) illustrates a structure of the connection packet. In this case, the response packet on the bottom layer is not used.

Third Embodiment

The following explains another embodiment of the present invention with reference to FIGS. 34 through 58. Note that, the structure of the present invention is identical to that of First and Second Embodiments except for the differences explained below. For ease of explanation, materials having the equivalent functions as those shown in the drawings pertaining to the foregoing First or Second Embodiment will be given the same reference symbols, and explanation thereof will be omitted here.

(1) Communication Layer

Figure 34:
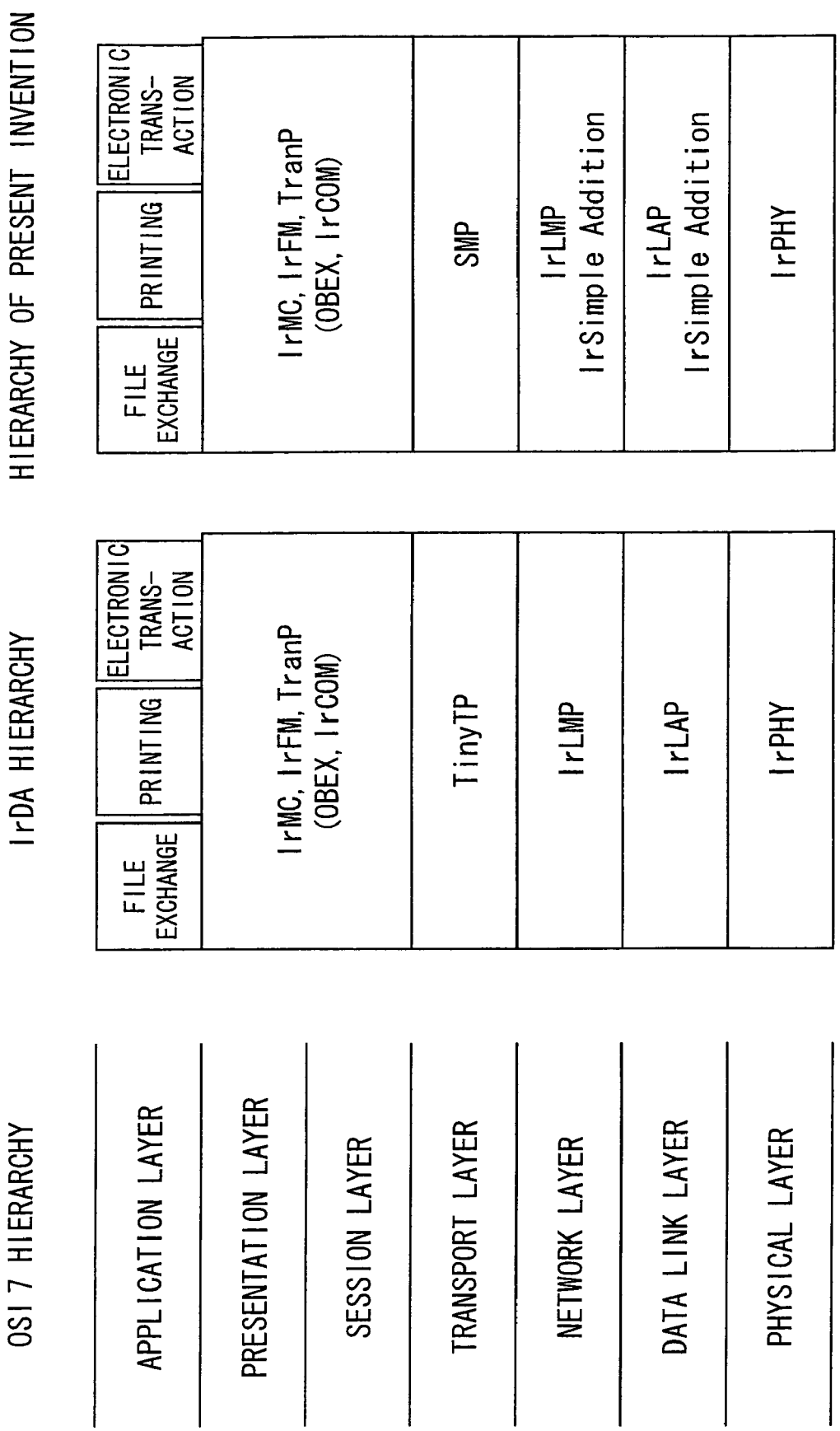
FIG. 34 is a schematic view showing a corresponding relation among an OSI7 hierarchical model, IrDA hierarchical model and the hierarchical model of the present invention.
Figure 37:
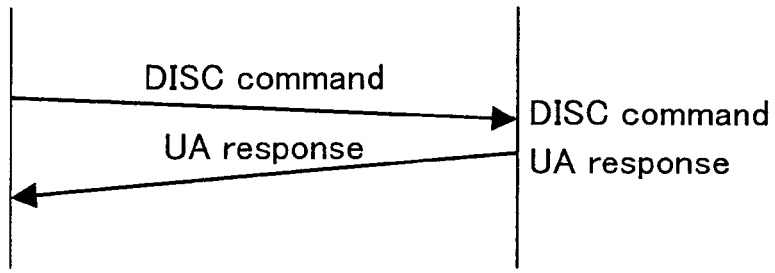
FIG. 37(a) illustrates a disconnection sequence when connection is established by the communication functions 1 and 7.
FIG. 37(b) illustrates a disconnection sequence when connection is established by the communication functions 2 and 8.
FIG. 37(c) illustrates a packet format used in a disconnection sequence when connection is established by the communication functions 1, 2, 7 or 8. Note that, the response packet in the bottom layer is not used in the communication functions 2 and 8.
Figure 37:
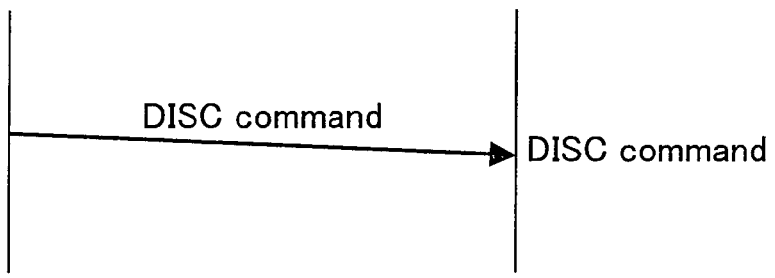
Figure 37:
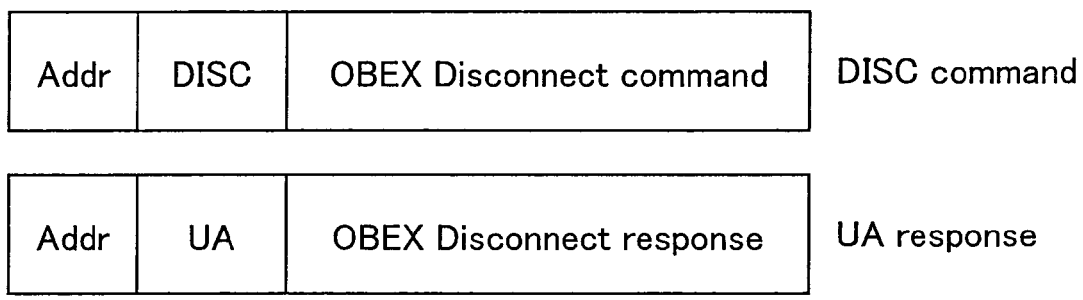

FIG. 34 is a schematic view showing a corresponding relation among an OSI7 hierarchical model, IrDA hierarchical model and the hierarchical model of the communication system according to the present invention.

The present embodiment describes structure and operation of a transmitter and a receiver of the communication system according to the present invention, based on the OSI7 hierarchical model. The OSI7 hierarchical model is also refereed to as "OSI base reference model", or "OSI seven layers model".

To enable data communication between different types of device, the OSI7 hierarchical model divides the required communication function of computer into seven layers, each of which is defined as a different standard function module.

The first layer (physical layer) serves to perform electrical conversion, mechanical operation etc. required to output data into the communication line. The second layer (data link layer) finds physical communication paths, and detects error of data being transmitted in the communication path. The third layer (network layer) selects a communication path, and supervises addresses in the communication path. The fourth layer (transport layer) carries out data compression, error detection, retransmission control etc. The fifth layer (session layer) establishes/releases a virtual path (connection) for carrying out data transmission/reception between plural communication programs. The sixth layer (presentation layer) converts the data received from the fifth layer into a different format suitable for the user, and converts the data transmitted from the seventh layer into a format suitable for transmission. The seventh layer (application layer) provides various available services using data communication to a person or to a program.

Each of the communication layers according to the present embodiment has the same function as that of corresponding layer in the OSI7 hierarchical model. However, it should be noted that, as shown in FIG. 34, the foregoing communication system has a six-layered structure in which the session layer and the presentation layer are unified.

The present invention is useful for a wide range of communication system in which the transmitter and the receiver carry out communication through individual connection of plural communication layers. More specifically, the division of communication function is not necessarily have to be based on the OSI7 hierarchical model. Further, when there are plural communication layers, any one of them may be selected.

Further, the present invention provides an effect of reducing time required for establishing connection by handling all connection requests for the plural communication layers at the same time, and therefore can easily recover disconnection of communication path. In view of this, the present invention is particularly useful for infrared wireless communication, for example. Note that the present invention is also useful for other wireless communication such as IEEE802.11 or bluetooth, and for wired communication.

Further, though the present embodiment explains an example in which all of the communication layers are connected through a single round of communication, the present invention is not limited to this case. For example, the present invention may be arranged so that one communication layer is connected first, and the rests are connected thereafter. Further, one communication layer may establish connection through plural rounds of communication. For example, given that two rounds of communication is required to establish connection of the network layer, it may be carried out such that the connection of the data link layer and the first step of connecting the network layer are handled as a single connection request, and the connection of the transport layer and the second step of connecting the network layer are handled as a single connection request.

For ease of explanation, the present embodiment describes "IrSimple", one application example of the present invention. However, the present invention is not limited to IrSimple. The IrSimple is made by partly modifying the function of IrDA-D1.1.

Note that, in the present embodiment, the data link layer, the network layer, the transport layer, the session/presentation layer may be referred to as LAP, LMP, SMP, and OBEX, respectively. To discriminate the communication layers in the transmitter and the communication layer in the receiver, the symbols "P" and "S" are used for transmitter and receiver, respectively.

(2) Sequence of Communication Between Transmitter and Receiver (2-1) Connection Sequence (A) IrDA-D1.1

FIG. 27 is a sequence view showing a connection sequence according to IrDA-D1.1. FIG. 28 is an explanatory view illustrating a structure of communication data used in the connection sequence of the IrDA-D1.1.

As shown in FIG. 27, the IrDA-D1.1 uses an XID command for the search for the target device to be connected with. The search is carried out as judgment as to whether or not the device is within the communication area. Here, to allow the device in the other end to receive the XID command, a global address should be used for the Destination Device Address (XID command in FIG. 28).

After receiving the XID command, the receiver sends back a XID response. In this XID response, the Source Device Address of XID command is added to the Destination Device Address (XID response in FIG. 28).

When the device in the other end is found, the transmitter transmits a SNRM command to establish connection in data link layer. At this time, the Source Device Address of XID response is added to the Destination Device Address of the SNRM command so that the connection is established only with the detected device. Receiving the SNRM command, the receiver sends back a response containing a parameter required for connection. Through these steps, the connection in data link layer is completed.

With the similar steps, the connection is established also in the upper layers: the network layer, the transport layer, the session layer, and the presentation layer.

(B) The Present Embodiment (Response is Sent)

FIG. 11(*a*) is a sequence view showing a connection sequence according to the present embodiment (response is sent). FIG. 11(*c*) is an explanatory view illustrating a structure of communication data used in the connection sequence of the present embodiment (response is sent).

In the present embodiment (response is sent), a global address is used for the Destination Device Address of SNRM command, thereby giving a searching function to the SNRM command (SNRM command in FIG. 11(c)).

Further, in the present embodiment (response is sent), the SNRM command, which is a connection packet for data link layer, and the UA response contain a parameter required for connection of the upper layers, such as the network layer, the transport layer, the session layer, the presentation layer etc. Compared with the IrDA-D1.1, the present embodiment uses only one packet to connect all of the upper layers.

In this way, the present invention carries out both search and connection sequence with a single packet, and therefore the conventional plural packets are not required.

(C) The Present Embodiment (Response is not Sent)

FIG. 11(b) is a sequence view showing a connection sequence according to the present embodiment (response is not sent). FIG. 11(c) is an explanatory view illustrating a structure of communication data used in the connection sequence of the present embodiment (response is not sent). Note that, in the present embodiment (response is not sent), the UA response (UA response for SNRM in FIG. 11(c)) is not required.

Depending on the user, the application, or the type of data, it is possible to select a communication mode which does not require a response from the receiver. In this case, as shown in FIG. 11(b), the SNRM command completes both search and connection.

(2-2) Data Exchange Sequence (A) IrDA-D1.1

FIG. 32(a) is a sequence view showing a data exchange sequence according to the IrDA-D1.1. FIG. 35(a) is an explanatory view illustrating a structure of communication data used in the data exchange sequence of the IrDA-D1.1.

As shown in FIG. 32(a), in the IrDA-D1.1, the transmitter transmits data and the receiver sends back a response for lower layers (LAP response), and then the transmitter grants the transmission right to the receiver (RR). Thereafter, the receiver sands back a response for upper layers (OBEX response), and then transmits the next data.

When an error occurs, the notification of error is included in the response for lower layers, and the packet in question is retransmitted.

In the IrDA-D1.1, the data communication is carried out using an I frame (FIG. 35(a)). Ns denotes a reference number for the transmitter, and Nr denotes a reference number for the receiver. With these numbers, the data link layer (LAP layer) carries out retransmission, and ensures that all the packets are contained.

(B) The Present Embodiment (Response is Sent)

FIGS. 32(b) and 32(c) are sequence views each showing a data exchange sequence according to the present embodiment (response is sent). FIG. 35(b) is an explanatory view illustrating a structure of communication data used in the data exchange sequence of the present embodiment (response is sent).

In the present embodiment (response is sent), a response from a lower layer/upper layer is not transmitted for each data, thereby reducing the number of response as much as possible. Then, the response to inform an error is given after a large number of data is transmitted.

The transmitter uses (i) a flag for asking the receiver if there is any problem in the sequence of packet number or in the data received, and (ii) a packet constituted of the plural data items created by dividing the data according to the packet size.

As shown in FIG. 32(b), the transmitter transmits a predetermined number of packets, and then transmits a packet in which the flag is on. The receiver transmits a notification of completion of reception to the transmitter if no error is detected after the whole of the predetermined number of data items is received or after the response is sent for the data with the flag on. If an error is detected at this time, the receiver ignores the data after the missed packet, and only confirms the part for granting the transmission right. Then, after obtaining the transmission right, the receiver inform the transmitter of packet number which has not been received due to the error.

When the proper transmission is notified, the transmitter carries on transmission and transmits the next packet. When an error is notified (with the number of packet not transmitted), the transmitter retransmits packets from the number notified by the receiver to the packet with the flag on.

With this arrangement, the interval between the packets is reduced, thereby efficiently performing transmission.

As shown in FIG. 35(b), the present embodiment (response is sent) uses an UI flame. Therefore, the data link layer (LAP layer) becomes incapable of recognizing missing of packets, and the missing is detected by the transport layer.

In the UI flame, the data for the transport layer contains the sequence number, a flag for confirming data, a flag for informing as to whether the packet is the final packet of data, and a flag for checking if there is any problem in the data. The data transmission is carried out using these flags.

(C) The Present Embodiment (Response is not Sent)

FIGS. 33(a) and 33(b) are sequence views each showing a data exchange sequence according to the present embodiment (response is not sent). FIG. 35(b) is an explanatory view illustrating a structure of communication data used in the data exchange sequence of the present embodiment (response is not sent).

In the present embodiment (response is not sent), if the response from the receiver is not required, only the completeness of data is confirmed. Therefore, the transmitter puts a sequence number on each packet, and transmits all the packets sequentially.

The receiver only confirms whether the transmission is properly done. When the all packets (data) are properly received, and the proper completion of data is perceived in the receiver, and the next operation is carried out, which is display, printing, storing etc. of the received data. On the other hand, when an error is detected, the error is perceived in the receiver, and a different operation is carried out, which is error indication to the user, stand-by for the next data etc.

Note that, the present embodiment (response is not sent) also uses the UI flame shown in FIG. 35(b).

(2-3) Disconnection Sequence (A) IrDA-D1.1

FIG. 36(a) is a sequence view showing a disconnection sequence according to the IrDA-D1.1. FIG. 36(b) is an explanatory view illustrating a structure of communication data used in the disconnection sequence of the IrDA-D1.1.

As shown in FIG. 36(a), in the IrDA-D1.1, the disconnection is carried out from upper to lower layers, and is completed with the disconnection of the data link layer (LAP layer).

(B) The Present Invention (Response is Sent)

FIG. 37(a) is a sequence view showing a disconnection sequence according to the present embodiment (response is sent). FIG. 37(c) is an explanatory view illustrating a structure of communication data used in the disconnection sequence of the present embodiment (response is sent).

As shown in FIG. 37(c), in the present embodiment (response is sent), the DISC command and the UA response contain the parameter/command used for disconnection of upper layers, such as the network layer, the transport layer, the session layer, and the presentation layer.

In this way, the present embodiment carries out a disconnection sequence with a single packet, and therefore the conventional plural packets are not required.

(C) The Present Invention (Response is not Sent)

FIG. 37(b) is a sequence view showing a disconnection sequence according to the present embodiment (response is not sent). FIG. 37(c) is an explanatory view illustrating a structure of communication data used in the disconnection sequence of the present embodiment (response is sent). Note that, in the present embodiment (response is not sent), the UA response (the UA response in FIG. 37(c)) is not required.

As shown in FIG. 37(b), in the present embodiment (no response from the other end), when the connection is established without requiring a response from the receiver, the DISC command completes both search and disconnection.

(3) Sequence in Transmitter and Sequence in Receptor

In FIGS. 38 through 58, for ease of explanation, the data link layer, the network layer, the transport layer, the session/presentation layer may be referred to as LAP, LMP, TTP or SMP, and OBEX, respectively. To discriminate the communication layers in the transmitter and the communication layer in the receiver, the symbols "P" and "S" are used for transmitter and receiver, respectively; e.g., "LAP (P)" denotes the data link layer of the transmitter.

(3-1) Connection Sequence (A) IrDA-D1.1

Figure 38:
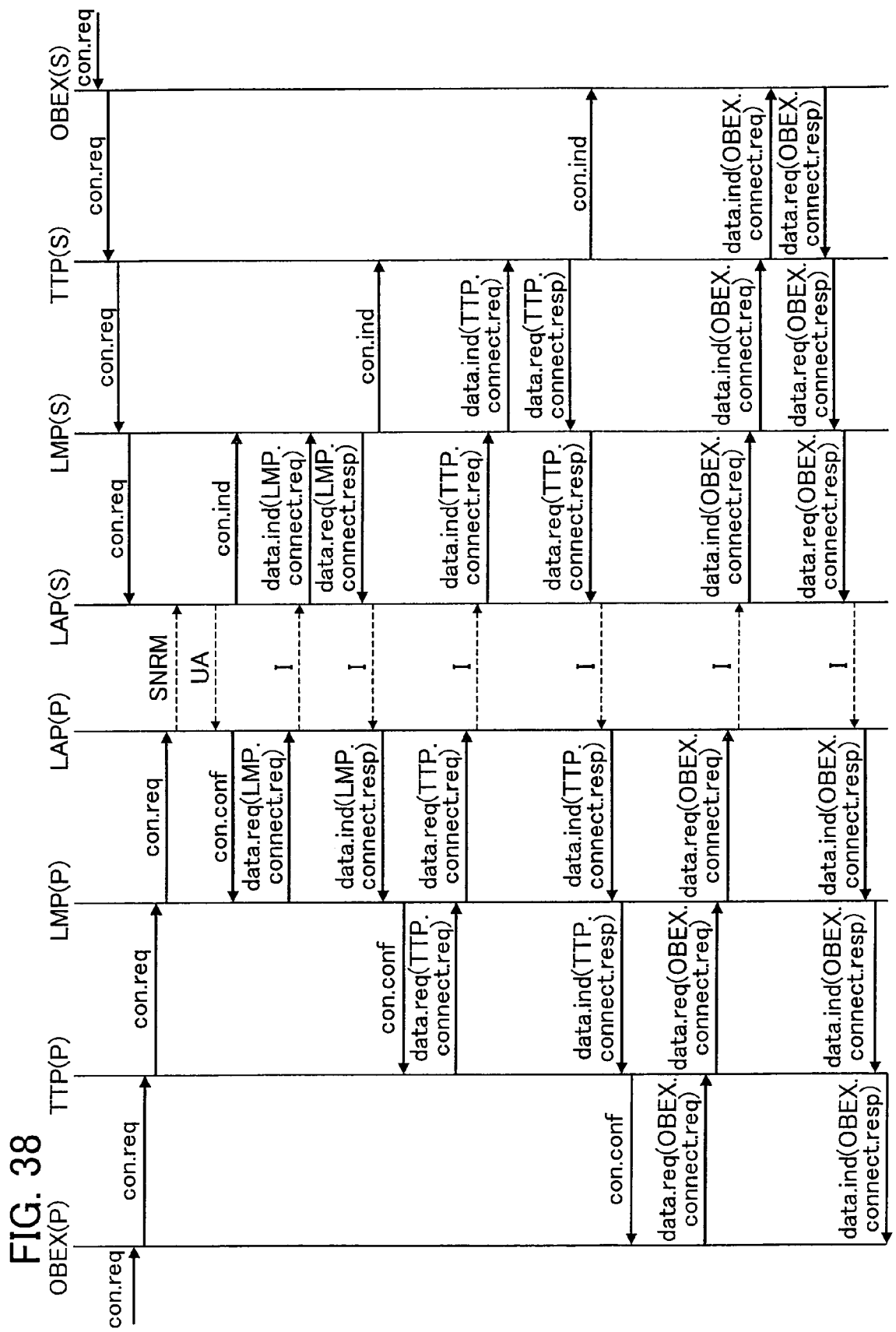
FIG. 38 is a sequence view showing functions (command, message) between the layers and the flow of packet in a connection sequence in IrDA.

FIG. 38 is a sequence view showing a connection sequence according to IrDA-D1.1. The structure of communication data used in the connection sequence of the IrDA-D1.1 is shown in FIG. 28 as explained above.

As shown in FIG. 38, in the IrDA-D1.1, both the transmitter and the receiver first carry out preparation for connection, and then start establishing connection of the lower layers. Each communication layer then receives a notification from the lower layer, and establishes connection. After the connection is done, the communication layer notifies the upper layer of the establishment of connection. Finally, the OBEX is connected, and the connection is completed.

(B) The Present Embodiment (Response is Sent)

Figure 39:
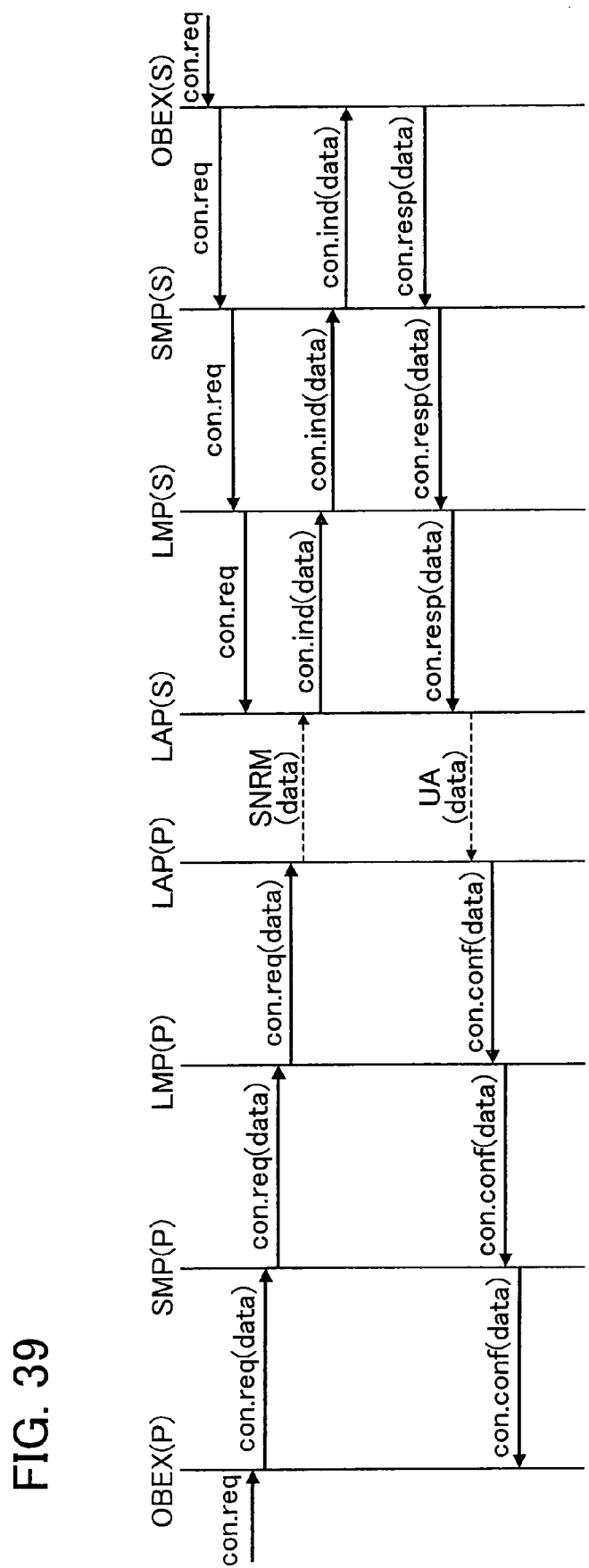
FIG. 39 is a sequence view showing functions (command, message) between the layers and the flow of packet, in a connection sequence according to the communication functions 1 and 7.
Figure 40:
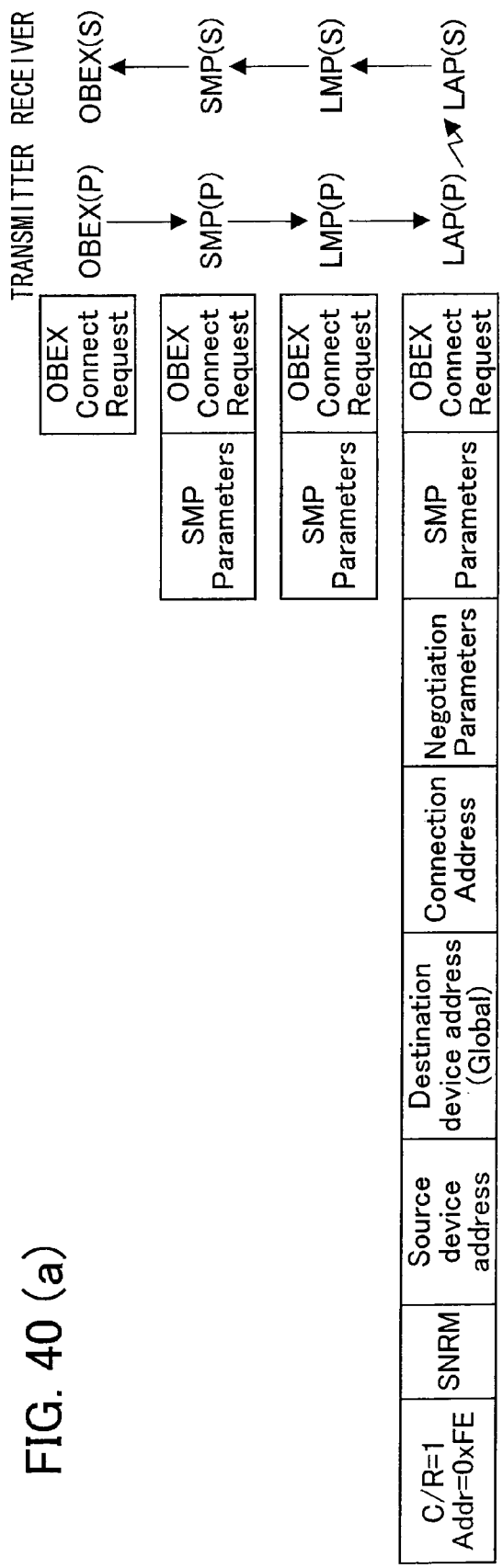
FIG. 40(a) is an explanatory view showing a change of data in the functions between the layers with the arrows pointing rightward, in the connection sequence according to the communication functions 1, 2, 7, 8, which are shown in FIGS. 39 and 41.
FIG. 40(b) is a drawing showing a change of data in the functions between the layers with the arrows pointing leftward, in the communication functions 1, 7.
Figure 40:
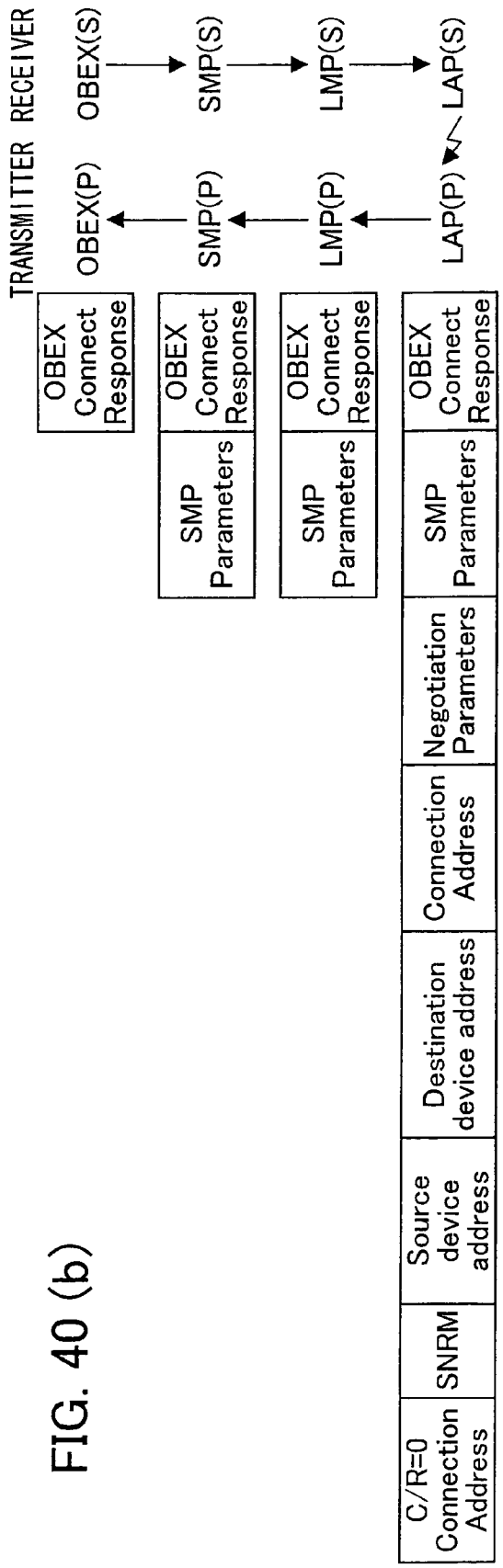

FIG. 39 is a sequence view showing a connection sequence according to the present embodiment (response is sent). FIGS. 40(a) and 40(b) are explanatory views each illustrating a structure of communication data used in the connection sequence of the present embodiment (response is sent).

As shown in FIG. 39, in the present embodiment (response is sent), the transmitter and the receiver first carry out preparation for connection. Then, the transmitter passes on the request from the upper layer to the lower layers, and then transmits the request as a single packet (SNRM). Meanwhile, the receiver receives the SNRM packet, and passes on the notification of completion of connection to lower to upper layers, and then passes on a response from the OBEX(S) from upper to lower layers, and transmits the response as a single packet (UA). The transmitter is notified of completion of connection with the reception of UA, and passes on the notification (Connect. confirm) from lower to upper layers.

The following separately describe the sequence in the transmitter and the sequence in the receptor.

First, the communication layers in the transmitter are explained.

When a connection request is transmitted from the application to the OBEX (P), the OBEX (P) emits a connection request function (Primitive), which contains a connection request command, to the lower layer (SMP (P)). Further, when a connection confirmation function is transmitted from SMP (P) to the OBEX (P), the OBEX (P) checks a response for OBEX connection which is contained in the data. When the response tells that the connection has been properly done ("Success"), the OBEX (P) finishes the connecting operation.

The SMP (P) receives the connection request function from the OBEX (P), and adds (a) parameter(s) required for communication with the SMP (S) of the receiver to the data, and emits the connection request function to the lower layer (LMP (P)). When a connection confirmation function is transmitted from LMP (P) to the SMP (P), the SMP (P) extracts (a) parameter(s) generated by the SMP (S) of the receiver from the data of the function, and checks the value, and then finishes the negotiation with the SMP (S). Further, the SMP (P) removes the parameter(s) of SMP (S) from the data of connection confirmation function, and transmits the resulting data to the OBEX (P) as the connection confirmation function.

The LMP (P) receives the connection request function from the SMP (P), and immediately adds (a) parameter(s) required for communication with the LMP (S) of the receiver to the data of connection request function from the SMP (P), and emits the connection request function to the lower layer (LAP (P)). When a connection confirmation function is transmitted from the LAP (P) to the LMP (P), the LMP (P) extracts (a) parameter(s) generated by the LMP (S) of the receiver from the data of the function, and checks the value, and then finishes the negotiation with the LMP (S). Further, the LMP (P) removes the parameter(s) of LMP (S) from the data of connection confirmation function, and transmits the resulting data to the SMP (P) as the connection confirmation function.

Note that, in general operation, a LSAP (Link Service Access Point) is defined to manage the logic port. When the connection is established by connecting the layers one by one, the LMP is not required. In this case, a connectionless value is used as the fixed value of LSAP. Therefore, the exchange of connection parameter(s) for LMP is not required.

The LAP (P) receives the connection request function from the LMP (P), and immediately adds (a) parameter(s) required for communication with the LAP (S) of the receiver to the data of connection request function from the LMP (P), and emits the SNRM command to the physical layer of the receiver. When the UA response is transmitted from the physical layer of the receiver to the LAP (P), the LAP (P) extracts (a) parameter(s) generated by the LAP (S) of the receiver from the data of the UA response, and checks the value, and then finishes the negotiation with the LAP (S). Further, the LAP (P) removes the parameter(s) of LAP (S) from the data of UA response, and transmits the resulting data to the LMP (P) as the connection confirmation function.

Next, the communication layers in the receiver are explained.

The OBEX (S) receives the connection request function from the application, and stands by for the next reception. When a connection notification function (Indication) is transmitted from the lower layer (SMP (S)), the OBEX (S) checks a command for OBEX connection which is contained in the data. When the command indicates that the connection has been properly done, the OBEX (S) emits a response called "Success" as a connection response function (Response) to the SMP (S), and finishes the connecting operation.

The SMP (S) receives the connection request function from the OBEX (S), and stands by for the next reception. When the connection notification function is transmitted from the lower layer (LMP (S)), the SMP (S) extracts (a) parameter(s) generated by the SMP (P) of the transmitter from the data of the function, and creates (a) parameter(s) for response, and emits the connection request function containing the data thus created by removing the parameter(s) of SMP (P) from the data of the function, to the OBEX (S), and then stands by for a connection response function which comes from the OBEX (S). Further, when the connection response function is transmitted from the OBEX (S), the SMP (S) adds the parameter(s) of the response to the data of connection response function of the OBEX (S), emits the connection response function to the LMP (S), and finishes the negotiation for the SMP layer.

The LMP (S) receives the connection request function from the SMP (S), and stands by for the next reception. When the connection notification function is transmitted from the lower layer (LAP (S)), the LMP (S) extracts (a) parameter(s) generated by the LMP (P) of the transmitter from the data of the function, and creates (a) parameter(s) for response, and emits the connection request function containing the data thus created by removing the parameter(s) of LMP (P) from the data of the function, to the SMP (S), and then stands by for a connection response function which comes from the SMP (S). Further, when the connection response function is transmitted from the SMP (S), the LMP (S) adds the parameter(s) of the response to the data of connection response function of the SMP (S), emits the connection response function to the LAP (S), and finishes the negotiation for the LMP layer.

Note that, in general operation, a LSAP (Link Service Access Point) is defined to manage the logic port. When the connection is established by connecting the layers one by one, the LMP is not required. In this case, a connectionless value is used as the fixed value of LSAP. Therefore, the exchange of connection parameter(s) for LMP is not required.

The LAP (S) receives the connection request function from the LMP (S), and stands by for the next reception. When the SNRM command is transmitted from the physical layer, the LAP (S) extracts (a) parameter(s) generated by the LAP (P) of the transmitter from the SNRM command, and creates (a) parameter(s) for response after transmitting the connection request function, containing the data thus created by removing the parameter(s) of LAP (P) from the data of the command, to the LMP (S), and then stands by for a connection response function which comes from the LMP (S). Further, when the connection response function is transmitted from the LMP (S), the LAP (S) adds the parameter(s) of the response to the data of connection response function of the LMP (S), emits the UA response to the physical layer, and finishes the negotiation for the LAP layer.

(C) The Present Embodiment (Response is not Sent)

Figure 41:
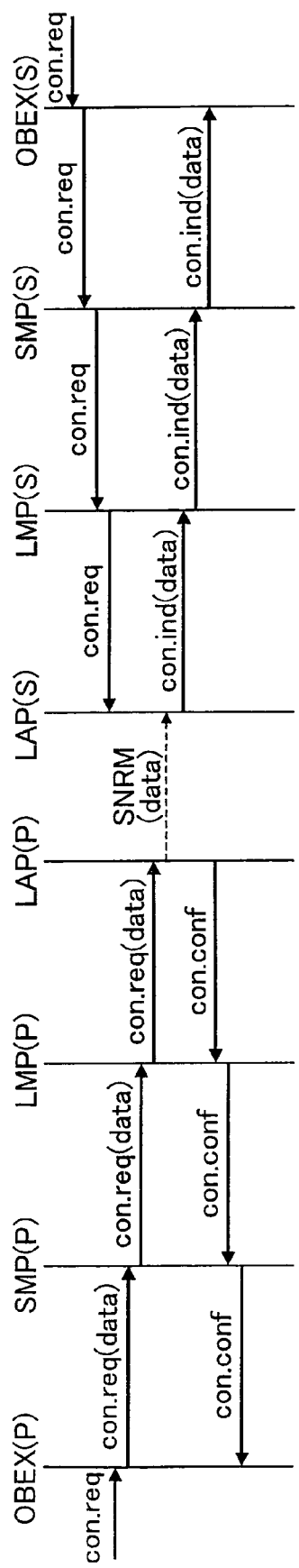
FIG. 41 is a sequence view showing functions (command, message) between the layers and the flow of packet in a connection sequence according to the communication functions 2 and 8.

FIG. 41 is a sequence view showing a connection sequence according to the present embodiment (response is not sent). FIG. 40(a) is an explanatory view showing a data structure of communication data used in the connection sequence according to the present embodiment response is not sent).

As shown in FIG. 41, in the present embodiment (response is not sent), the transmitter and the receiver first carry out preparation for connection. Then, the transmitter passes on the request from the upper layer to the lower layers, and then transmits the request as a single packet (SNRM). Having transmitted the SNRM packet, the transmitter passes on the notification of completion of connection (Connect.confirm) from the LAP (P) to upper layers. Meanwhile, the receiver receives the SNRM packet, and passes on the notification of completion of connection to lower to upper layers. The connection is regarded completed when the notification of completion of connection is received by the OBEX (S).

The following separately describe the sequence in the transmitter and the sequence in the receptor.

First, the communication layers in the transmitter are explained.

When a connection request is transmitted from the application to the OBEX (P), the OBEX (P) immediately emits a connection request function (Primitive), which contains a connection request command, to the lower layer (SMP (P)). Further, when a connection confirmation function is transmitted from SMP (P) to the OBEX (P), the OBEX (P) finishes the connecting operation.

The SMP (P) receives the connection request function from the OBEX (P), and immediately adds (a) parameter(s) required for communication with the SMP (S) of the receiver to the data, and emits the connection request function to the lower layer (LMP (P)). When a connection confirmation function is transmitted from LMP (P) to the SMP (P), the SMP (P) regards that the procedure has been done with the transmitted parameter(s), and finishes the negotiation for the SMP layer. Then the SMP (P) transmits the connection confirmation function to the OBEX (P).

The LMP (P) receives the connection request function from the SMP (P), and immediately adds (a) parameter(s) required for communication with the LMP (S) of the receiver to the data of connection request function from the SMP (P), and emits the connection request function to the lower layer (LAP (P)). When a connection confirmation function is transmitted from the LAP (P) to the LMP (P), the LMP (P) regards that the procedure has been done with the transmitted parameter(s), and finishes the negotiation for the LMP layer. Then the LMP (P) transmits the connection confirmation function to the SMP (P).

Note that, in general operation, a LSAP (Link Service Access Point) is defined to manage the logic port. When the connection is established by connecting the layers one by one, the LMP is not required. In this case, a connectionless value is used as the fixed value of LSAP. Therefore, the exchange of connection parameter(s) for LMP is not required.

The LAP (P) receives the connection request function from the LMP (P), and immediately adds (a) parameter(s) required for communication with the LAP (S) of the receiver to the data of connection request function from the LMP (P), and emits the SNRM command to the physical layer of the receiver. Transmitting the SNRM command, the LAP (P) regards that the procedure has been done with the transmitted parameter(s), and finishes the negotiation for the LAP layer. Then the LAP (P) transmits the connection confirmation function to the LMP (P).

Next, the communication layers in the receiver are explained.

The OBEX (S) receives the connection request function from the application, and stands by for the next reception. When a connection notification function (Indication) is transmitted from the lower layer (SMP (S)), the OBEX (S) checks a command for OBEX connection which is contained in the data. When the command indicates that the connection has been properly done, the OBEX (S) finishes the connecting operation.

The SMP (S) receives the connection request function from the OBEX (S), and stands by for the next reception. When the connection notification function is transmitted from the lower layer (LMP (S)), the SMP (S) extracts (a) parameter(s) generated by the SMP (P) of the transmitter from the data of the function, and finishes negotiation by using the parameter(s). Then the SMP (S) emits the connection request function containing the data thus created by removing the parameter(s) of SMP (P) from the data of the function, to the OBEX (S).

The LMP (S) receives the connection request function from the SMP (S), and stands by for the next reception. When the connection notification function is transmitted from the lower layer (LAP (S)), the LMP (S) extracts (a) parameter(s) generated by the LMP (P) of the transmitter from the data of the function, and finishes negotiation by using the parameter(s). Then the LMP (S) emits the connection request function containing the data thus created by removing the parameter(s) of LMP (P) from the data of the function, to the SMP (S).

Note that, in general operation, a LSAP (Link Service Access Point) is defined to manage the logic port. When the connection is established by connecting the layers one by one, the LMP is not required. In this case, a connectionless value is used as the fixed value of LSAP. Therefore, the exchange of connection parameter(s) for LMP is not required.

The LAP (S) receives the connection request function from the LMP (S), and stands by for the next reception. When the SNRM command is transmitted from the physical layer, the LAP (S) extracts (a) parameter(s) generated by the LAP (P) of the transmitter from the SNRM command, and finishes negotiation by using the parameter(s). Then the LAP (S) emits the connection request function containing the data thus created by removing the parameter(s) of LAP (P) from the data of the function, to the LMP (S).

(3-2) Data Exchange Sequence (A) IrDA-D1.1

Figure 42:
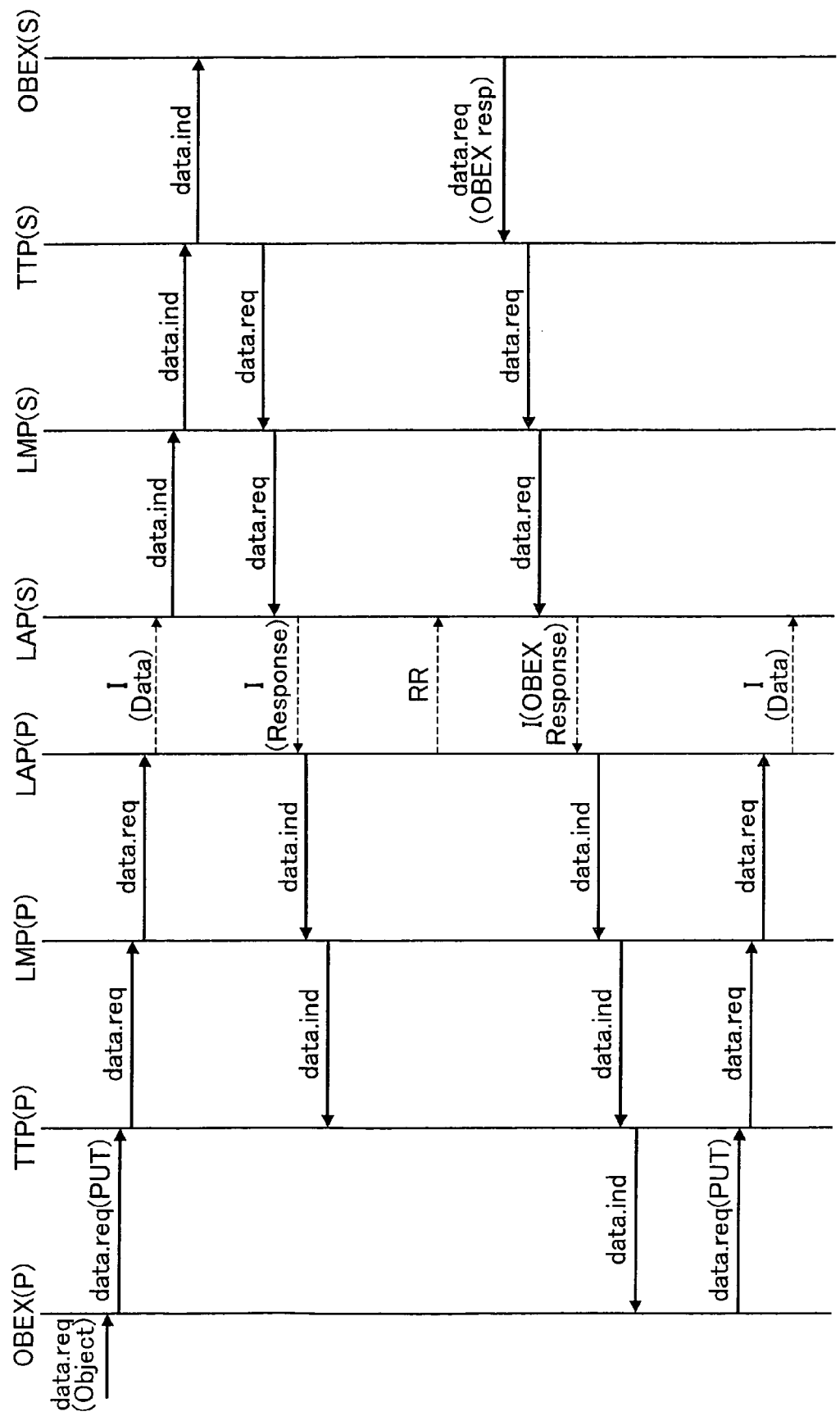
FIG. 42 is a sequence view showing functions (command, message) between the layers and the flow of packet in a data exchange process in IrDA.

FIG. 42 is a sequence view showing a data exchange sequence according to IrDA-D1.1. The structure of communication data used in the data exchange sequence of the IrDA-D1.1 is shown in FIG. 35 (a) as explained above.

As shown in FIG. 42, in the IrDA-D1.1, the transmitter generates a PUT command, which is propagated through the lower layers to be transmitted as an I frame. Obtaining the I frame, the receiver propagates an indication of data from lower to upper layers. The TTP (S) transmits a credit indicating an acceptable number of packets to the transmitter. The TTP layer serves to control the operation flow.

The transmitter propagates the obtained credit to the TTP (P). At this time, the LAP (P) transmits the RR (granting of transmission right) packet. Obtaining the RR packet, the receiver outputs a response, which is generated by the OBEX (S), as an I frame.

Receiving the response from the OBEX (S), the transmitter generates the next PUT command.

(B) The Present Embodiment (Response is Sent)

Figure 43:
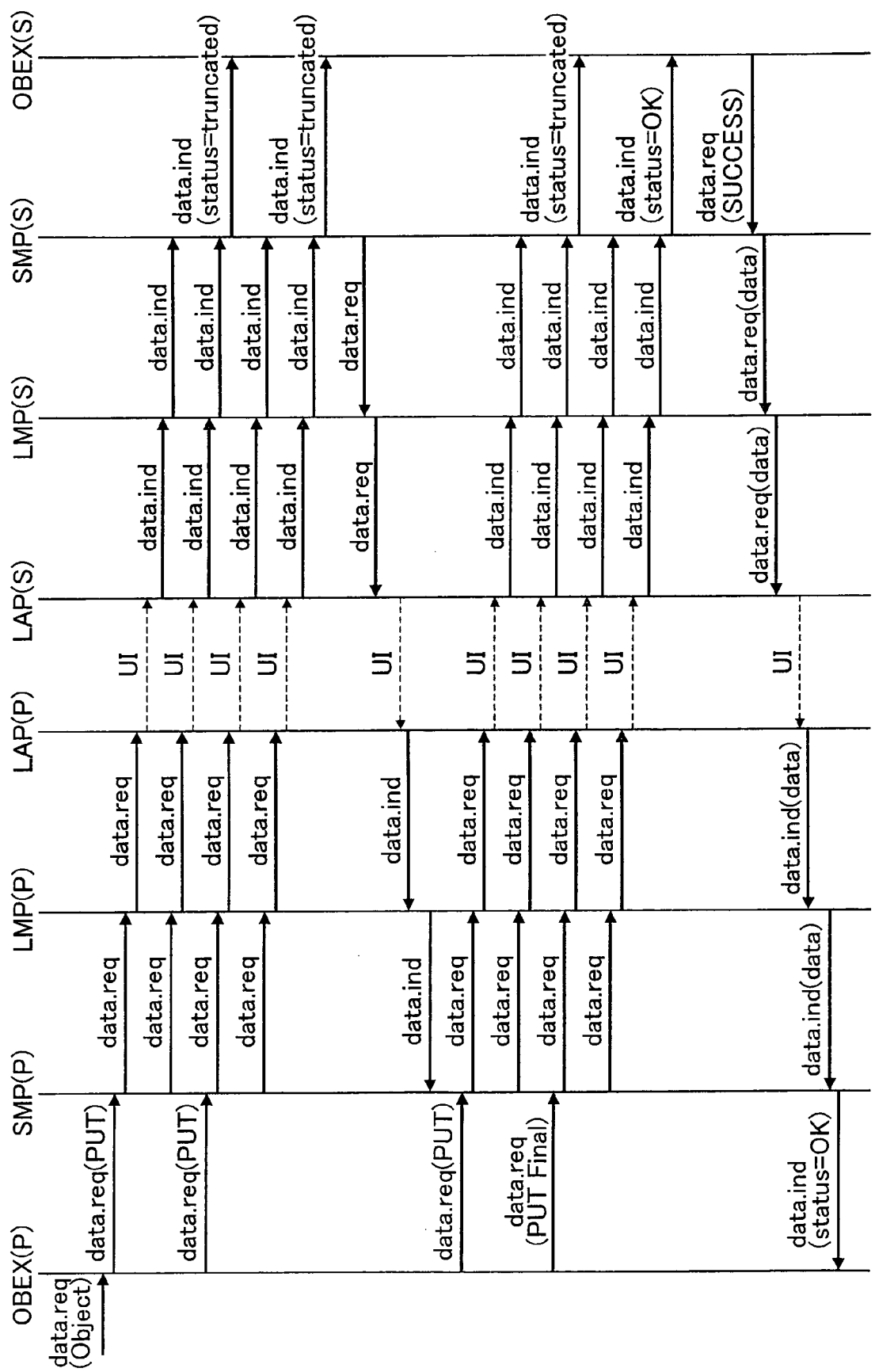
FIG. 43 is a sequence view showing functions (command, message) between the layers and the flow of packet in a data exchange process according to the communication functions 4, 7.
Figure 44:
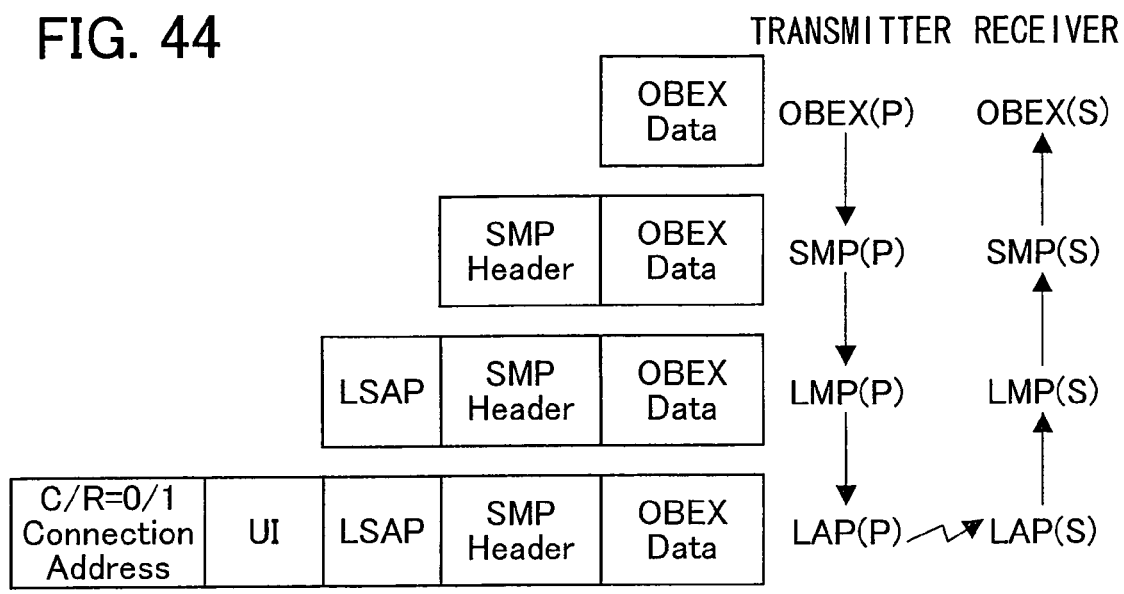
FIG. 44 is a view showing functions between the layers in a data exchange process according to the communication functions 4, 5, 7, 8, which are shown in FIGS. 43 and 45.

FIG. 43 is a sequence view showing a data exchange sequence according to the present embodiment (response is sent). FIG. 44 is an explanatory view illustrating a structure of communication data used in the data connection sequence of the present embodiment (response is sent).

As shown in FIG. 43, in the present embodiment (response is sent), the transmitter generates a PUT command, which is propagated through the lower layers to be transmitted as an UI frame.

Obtaining the data, the receiver propagates a notification from lower to upper layers. At this time, the SMP (S) notifies the upper layer OBEX (S) of continuity of data (status=truncated).

After transmitting a predetermined number of packets, the transmitter transmits a packet in which the flag for confirming proper data transmission is on. The receiver on the other end receives the data with the flag on, and checks if the transmission has been done properly. If an error is detected, the receiver inform the transmitter of packet number which has not been received due to the error.

If no error is detected, the transmitter outputs the next packet. If an error is detected, the transmitter retransmits the remaining part of packet having been suspended after the error.

The transmitter put an ON-flag in the final data, the flag indicating that this is the final data. Meanwhile, the receiver notifies the OBEX (S) that all data items have been received (status=OK), and stands by for a response from the OBEX (S). The response generated from the OBEX (S) is propagated to the lower layers, and is outputted as an UI frame.

If the response is "Success", the transmitter finishes the operation in a general way.

The following separately describe the sequence in the transmitter and the sequence in the receptor.

In the transmitter, the OBEX (P) outputs a PUT command to the lower layers as a data transmission function. However, if the SMP (P) is capable of transmission without a response ("Continue" in general) with respect to a PUT command, except for the PUT final (final PUT), the OBEX (P) outputs the next command. In the case of a command other than the PUT final or the PUT command, the operation is suspended to wait for the data notification function from the lower layer, and the command is finished after checking the response in the data.

The data transmission function denotes a function (Data Request) for requesting the lower layer to transmit data. Further, the data notification function denotes a function (Data Indicate) serving as a notification of data reception from the lower layer.

In the receiver, the OBEX (S) receives data from the lower layer with the data notification function. However, the OBEX (S) does not send back a response to P U T commands other than the PUT Final command, and sends back, as a response, a data transmission function to commands other than the PUT Final command or PUT command.

The following explains a header etc. of the data transmission functions and the data notification functions in the upper and lower layers. These data items are used for both transmitter and receiver.

In receiving the data transmission function from the OBEX, (a) if the predetermined size for transmission data in the LMP is smaller than the size of data in the data transmission function, the SMP divides the data into smaller items to allow the LMP to transmit the data. On the other hand, (b) if the predetermined size for transmission data in the LMP is larger than the size of data in the data transmission function, the SMP combines plural data items of the data transmission function to make a larger volume of data, however within the predetermined range. The SMP also creates a SMP header constituted of, for example, a sequential number, an argument for asking the device in the other end about data reception condition, an argument indicating the end of data, an argument indicating necessity of transmission of OBEX response to the other end, and an argument indicating whether the received data was a complete set of data items. Further, the SMP header is added to the divided/combined data and is contained in the data transmission function. The data transmission function is transmitted to the LMP.

When the SMP receives the data notification function from the LMP, the SMP extracts the SMP header from the data in the function, and checks whether the sequential numbers are appropriate (i.e., the numbers are in sequence). If the numbers are in sequence, the SMP transmits the data notification function to the OBEX. At this point, the data notification function may be outputted for each data notification function coming from the lower layer, or for a predetermined set of those.

The SMP (P) of the transmitter modifies the data transmission function from OBEX (P) into a suitable form for the LMP (P), and emits a data transmission function with a predetermined amount of data. After that, the SMP (P) sets "true" for the argument for asking the receiver about data reception condition, and transmits the data transmission function. The SMP then stands by for the data notification function from the LMP (P).

The SMP (P) analyzes the SMP header in the data notification function, and confirms if the transmission has been done properly by referring to the argument indicating whether the received data was a complete set of data items. Having been confirmed the transmission has been done properly, the SMP is turned into a state allowing transmission to the OBEX (P), that is, it is ready to send the next data. In this state, the SMP (P) is capable of receiving data from the OBEX (P).

On the other hand, when the SMP found out, according to the argument indicating whether the received data was a complete set of data items, that the transmission has not been done properly, the SMP (P) retransmits data sequence from the unsent data transmission function to the argument set to "true" for asking the receiver about data reception condition. The SMP (P) repeats the retransmission predetermined times, or until the all data of the data transmission function is received in the receiver.

Further, when the SMP (P) receives from OBEX (P) the data transmission function with an argument indicating the end of data, which is set to "true", the SMP (P) sets "true" for the argument indicating the end of data, or for the argument indicating necessity of response from OBEX(S) in the data of transmission function to the LMP (P), and sends this new transmission function to the LMP (P).

On the other hand, when the SMP (S) receives from the LMP (S) the data transmission function in which either the argument indicating the end of data or the argument indicating necessity of transmission of OBEX response to the other end is set to "true", the SMP (S) of the receiver removes the header of SMP (S) from the data notification function before transmitting the function to the OBEX (S).

Further, when the SMP (S) receives the data notification function from the LMP (S), the SMP (S) analyzes the SMP header in the data notification function, and checks the sequential number. If the SMP (S) confirms that the receiver has received all data items until the header in which the argument for asking the device in the other end about data reception condition is "true", the SMP (S) creates a SMP header by modifying the argument indicating whether the received data was a complete set of data items into an appropriate format for indicating that the received data was a complete set of data items. With this data, the SMP (S) transmits the data transmission function to the LMP (S).

On the other hand, when the SMP (S) found out that there was a problem in data reception in the receiver, the SMP (S) infers the number of SMP header not transmitted and stores the number. For example, when the data items 0, 1, 2, 3, 5 are received, obviously the fifth number should be "4", but "4" is missing. That is, the number of data not received is "4". After this, the SMP(S) only checks if the argument for asking the device in the other end about data reception condition is set to "true" in the SMP header, and stops output of the data notification function to the OBEX (S).

When the SMP (S) receives the data notification function in which the argument for asking the device in the other end about data reception condition is "true", the SMP (S) creates a SMP header by modifying the argument indicating whether the received data was a complete set of data items into an appropriate format for indicating that the received data was not a complete set of data items, and inserting the number of the SMP header not properly received into the field for the sequential number. With this data, the SMP (S) transmits the data transmission function to the LMP (S).

Further, when the SMP (S) receives the data notification function in which either the argument indicating the end of data or the argument indicating necessity of transmission of OBEX (S) response to the other end is "true", the SMP (S) transmits the data notification function to the OBEX (S), and stands by for a data transmission request from the OBEX (S).

When the SMP (S) receives a data transmission request from the OBEX (S), the SMP (S) creates a SMP header by modifying the argument indicating whether the received data was a complete set of data items into an appropriate format for indicating that the received data was a complete set of data items. The SMP (S) adds the SMP header to the data transmission function from the OBEX (S), and sends the resulting data to the LMP (S). Note that, since the notification to the OBEX (S) stops in case of error, the SMP (S) stands by only when the transmission is properly completed.

When the LMP receives the data transmission request function from the upper layer, the LMP adds a LMP header to the data of the data transmission request function, and contains the data to the data transmission function, and transmits the function to the LAP. Further, when the LMP receives the data notification function from the LAP, the LMP removes the LMP header from the data of function and contains the resulting data in the data notification function, and transmits the function to the SMP.

Note that, when the connection is established by connecting the layers one by one, the LMP is not required. In this case, the LMP header includes LSAP having a connectionless value.

When the LAP receives the data transmission request function from the LMP, the LAP adds a LAP header to the data of the data transmission request function, and contains this data in a UI frame, and transmits the UI frame to the physical layer. Further, when the LAP receives the data reception notification from the physical layer, the LAP removes the LAP header from the data of UI frame and contains the resulting data in the data notification function, and transmits the function to the LMP. Note that, in the present embodiment, the LAP header contains a connection address and an UI indicator.

(C) The Present Embodiment (Response is not Sent)

Figure 45:
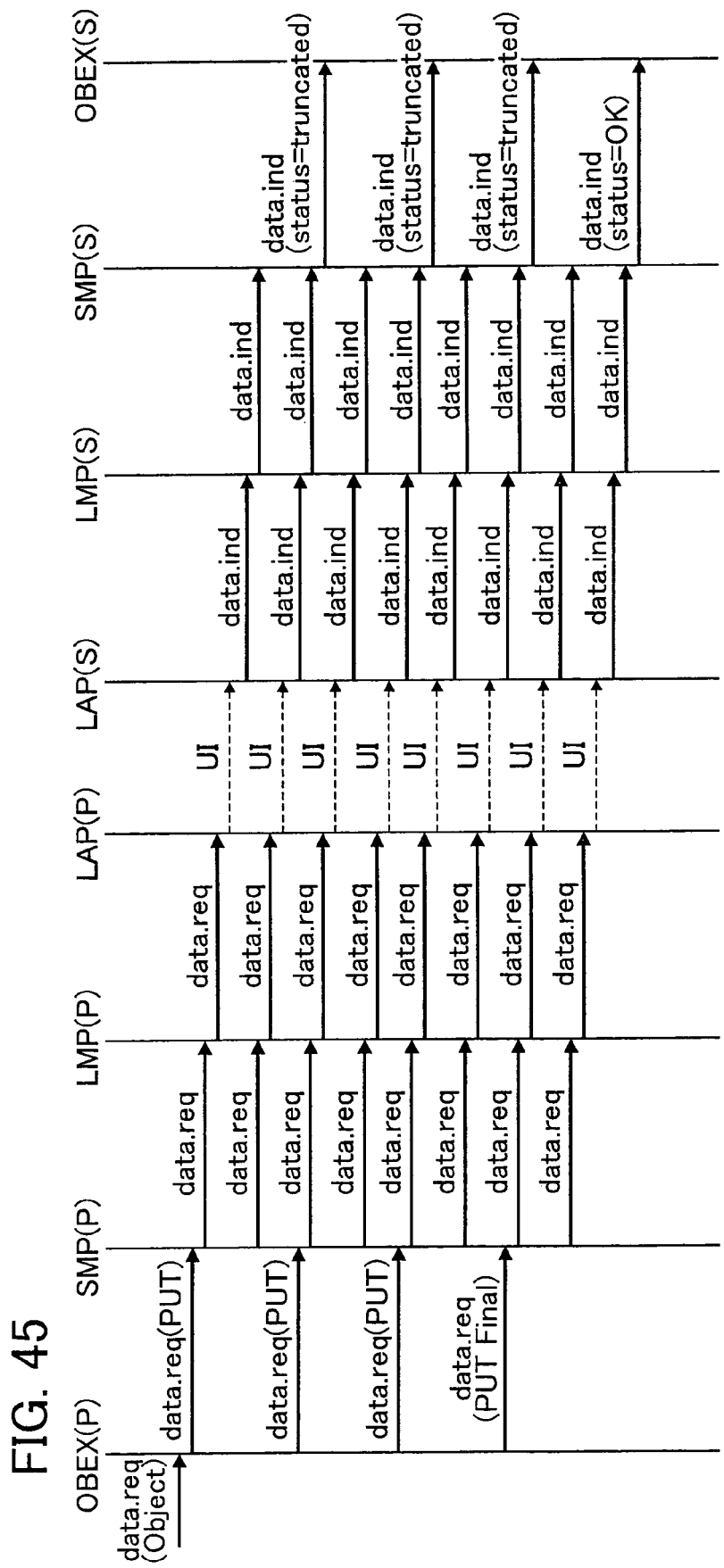
FIG. 45 is a sequence view showing functions (command, message) between the layers and the flow of packet in a data exchange process according to the communication functions 5, 8.

FIG. 45 is a sequence view showing a data exchange process according to the present embodiment. FIG. 44 is an explanatory view showing a data structure of communication data used in the connection sequence according to the present embodiment (response is not sent).

As shown in FIG. 45, in the present embodiment (response is not sent), the transmitter generates a PUT command, and the PUT command is propagated through the lower layers, and is outputted as an UI frame.

Obtaining the data, the receiver propagates a notification from lower to upper layers. At this time, the SMP (S) notifies the upper layer OBEX (S) of continuity of data (status=truncated).

The transmitter put an ON-flag in the final data, the flag indicating that this is the final data. Meanwhile, the receiver confirms the ON-flag of the SMP (S), and notifies the OBEX (S) that all data items have been received (status=OK), and then finishes data exchange sequence.

The following separately describe the sequence in the transmitter and the sequence in the receptor.

In the transmitter, the OBEX (P) outputs a PUT command to the lower layers as a data transmission function. However, the OBEX (P) is capable of finishing a command without a response with respect to each command. Then, the OBEX (P) outputs the next command if transmission is allowed in the SMP (P).

In the receiver, the OBEX (S) receives the data notification function from the lower layer. However, the OBEX (S) does not send back a response for each command, only receiving data.

The following explains a header etc. of the data transmission functions and the data notification functions in the upper and lower layers. These data items are used for both transmitter and receiver.

In receiving the data transmission function from the OBEX, (a) if the predetermined size for transmission data in the LMP is smaller than the size of data in the data transmission function, the SMP divides the data into smaller items to allow the LMP to transmit the data. On the other hand, (b) if the predetermined size for transmission data in the LMP is larger than the size of data in the data transmission function, the SMP combines plural data items of the data transmission function to make a larger volume of data, however within the predetermined range. The SMP also creates a SMP header constituted of, for example, a sequential number, an argument for asking the device in the other end about data reception condition, an argument indicating the end of data, an argument indicating necessity of transmission of OBEX response to the other end, and an argument indicating whether the received data was a complete set of data items. Further, the SMP header is added to the divided/combined data and is contained in the data transmission function. The data transmission function is transmitted to the LMP.

When the SMP receives the data notification function from the LMP, the SMP extracts the SMP header from the data in the function, and checks whether the sequential numbers are appropriate (i.e., the numbers are in sequence). If the numbers are in sequence, the SMP transmits the data notification function to the OBEX. At this point, the data notification function may be outputted for each data notification function coming from the lower layer, or for a predetermined set of those.

The SMP (P) of the transmitter modifies the data transmission function from OBEX (P) into a suitable form for the LMP (P). When the SMP (P) receives a data transmission function in which the argument for asking the receiver about data reception condition is set to "false", the SMP (P) adds the SMP header to the data, and transmits the data to the LMP (P). On the other hand, when the SMP (P) of the receiver receives from the LMP (S) a data transmission function in which the argument indicating the end of data is set to "true", the SMP (P) sets "true" for the argument indicating the end of data, or for the argument indicating necessity of transmission of OBEX(S) response in the transmission function to the LMP (P), and sends this new transmission function to the LMP (S).

Further, when the SMP (S) receives the data notification function from the lower layer, the SMP (S) analyzes the SMP header in the data notification function, and checks the sequential number. If the SMP (S) confirms that the receiver has received all data items, the SMP (S) transmits the data transmission function to the LMP (S).

On the other hand, when the SMP (S) found out that there was a problem in data reception in the receiver, the SMP (S) notifies the OBEX (S) of the error. For example, when the data items 0, 1, 2, 3, 5 are received, obviously the fifth number should be "4", but "4" is missing.

After that, the SMP (P) stands by for a function with a SMP header in which the argument indicating the end of data and the argument indicating necessity of transmission of OBEX response to the other end are set to "true". The SMP (S) stops data notification to the OBEX (S) until it receives either the "true" data notification function (however no notification is sent to the OBEX (S)), receives a disconnection notification function, or a certain time period elapsed.

When the LMP (P) receives a data transmission request function from the SMP (P), the LMP (P) adds the LMP header to the data of function. The LMP (P) then transmits the data transmission function containing the created data to the LAP (P).

When the LMP (S) of the receiver receives the data notification request function from the LAP (S), the LMP (S) removes the LMP header from the data of the data notification request function, and contains the data to the data notification function, and transmits the function to the SMP (S).

Note that, when the connection is established by connecting the layers one by one, the LMP is not required. In this case, a connectionless value is used as the fixed value of LSAP.

When the LAP (P) receives the data transmission request function from the LMP (P), the LAP (P) adds a LAP header to the data of the data transmission request function, and contains this data in a UI frame, and transmits the UI frame to the physical layer.

Further, when the LAP (S) receives the data reception notification from the physical layer, the LAP (S) removes the LAP header from the data of UI frame and contains the resulting data in the data notification function, and transmits the function to the LMP (S). Note that, in the present embodiment, the LAP header contains a connection address and an UI indicator.

(3-3) Disconnection Sequence (A) IrDA-D1.1

Figure 46:
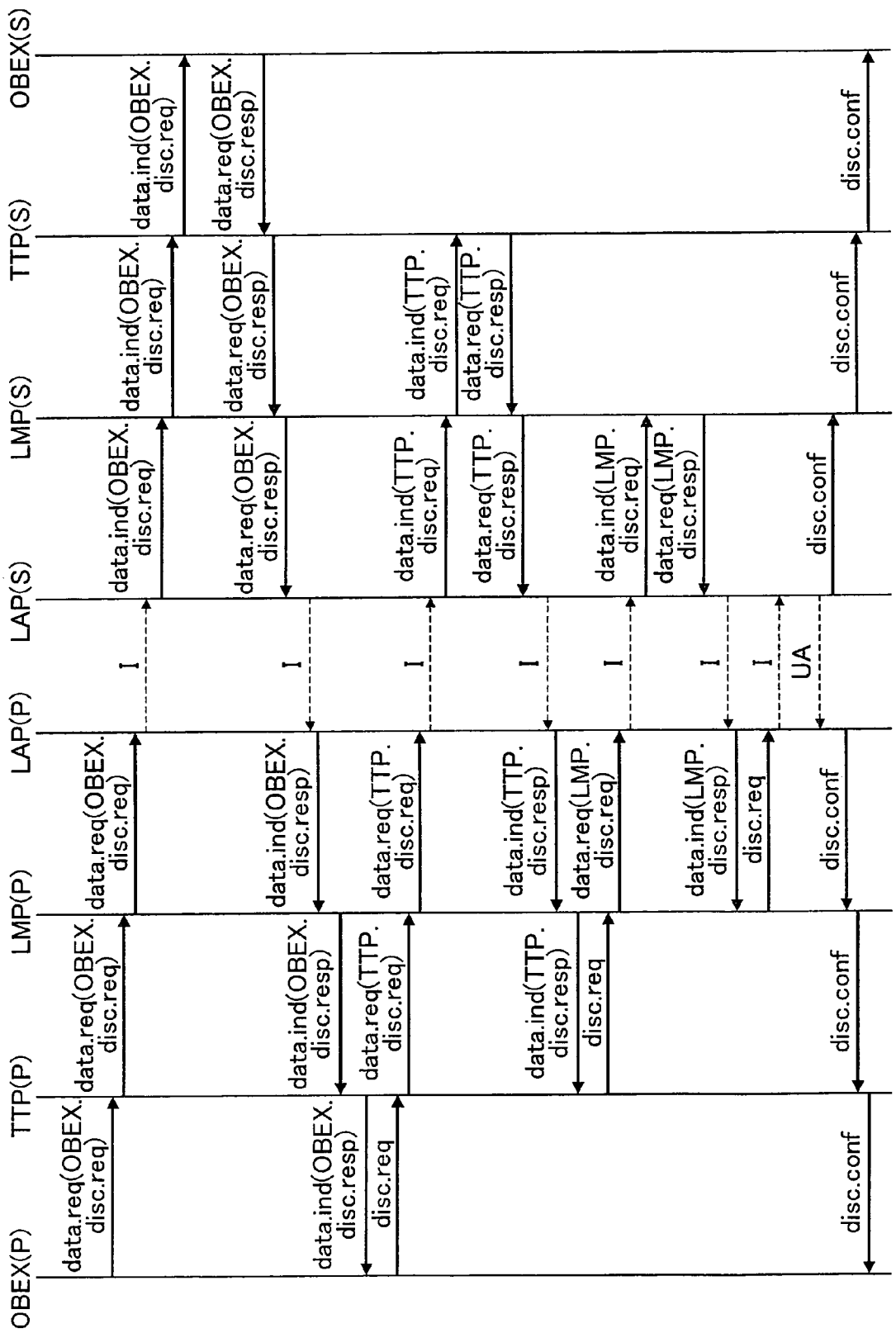
FIG. 46 is a sequence view showing functions (command, message) between the layers and the flow of packet in a disconnection sequence in IrDA.

FIG. 46 is a sequence view showing a disconnection sequence according to IrDA-D1.1. The structure of communication data used in the disconnection sequence of the IrDA-D1.1 is shown in FIG. 36(*b*) as explained above.

As shown in FIG. 46, in the IrDA-D1.1, the OBEX (P) of the transmitter generates a disconnection command, and both the transmitter and the receiver carry out disconnection from upper to lower layers. When the LAP layer is disconnected, the disconnection is completed.

(B) The Present Embodiment (Response is Sent)

Figure 47:
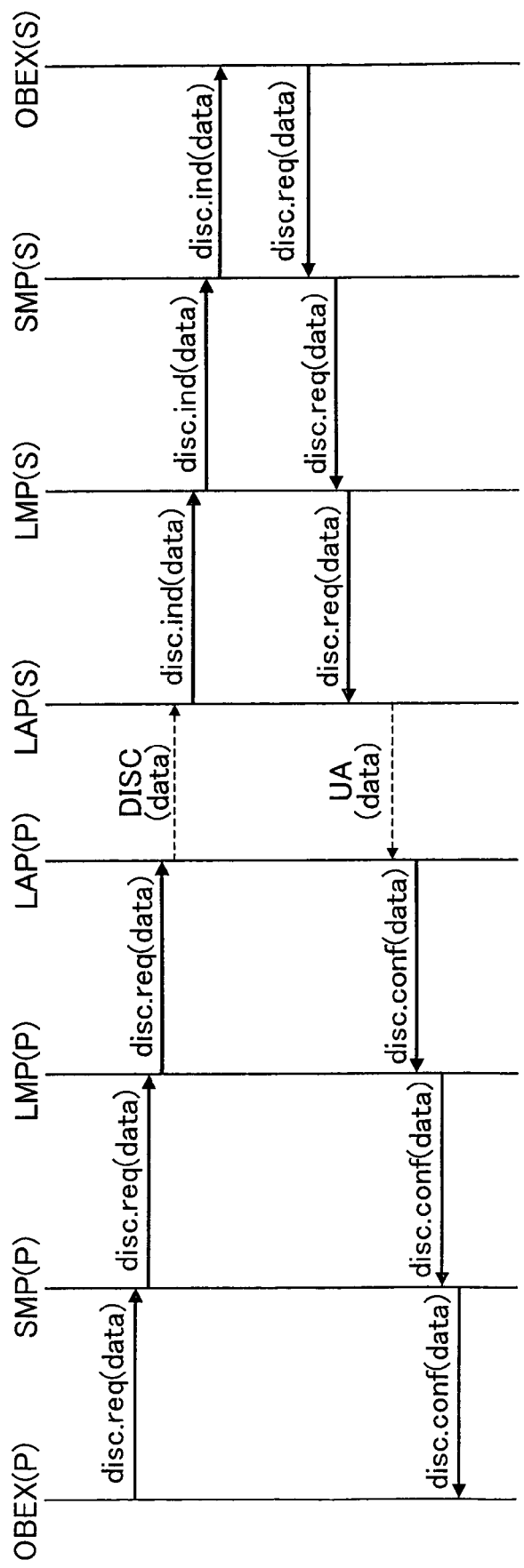
FIG. 47 is a sequence view showing functions (command, message) between the layers and the flow of packet in a disconnection sequence according to the communication functions 1, 7.
Figure 48:
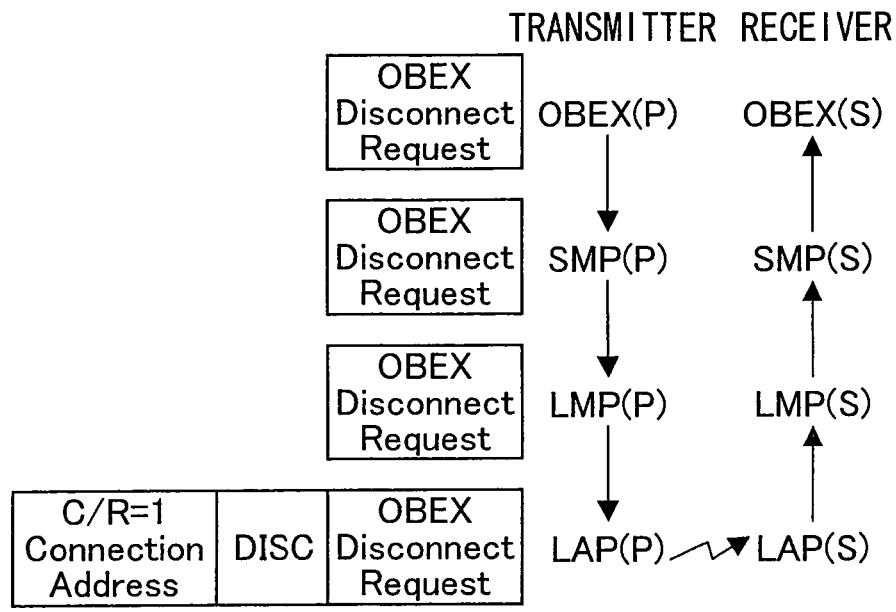
FIG. 48(a) is an explanatory view showing a change of data in the functions between the layers with the arrows pointing rightward, in the connection sequence according to the communication functions 1, 2, 7, 8, which are shown in FIGS. 47 and 49.
FIG. 48(b) is a drawing showing a change of data in the functions between the layers with the arrows pointing leftward, in the communication functions 1, 7.
Figure 48:
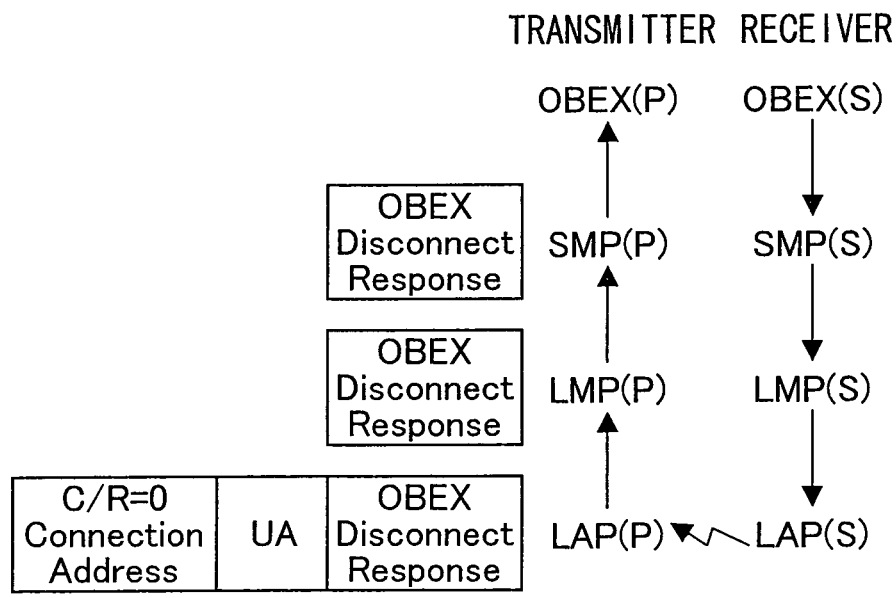

FIG. 47 is a sequence view showing a disconnection sequence according to the present embodiment (response is sent). FIGS. 48(*a*) and 48(*b*) are explanatory views each illustrating a structure of communication data used in the disconnection sequence of the present embodiment (response is sent).

As shown in FIG. 47, in the present embodiment (response is sent), the disconnection command of the transmitter is propagated from upper to lower layers, and a DISC command is generated. Meanwhile, the receiver receives the DISC command, and passes on the command from lower to upper layers, and then passes on a response from upper to lower layers, and a UA response is generated. The notification of reception of UA response is passed on from lower to upper layers of the transmitter, and the sequence is completed.

The following separately describe the sequence in the transmitter and the sequence in the receptor.

First, the communication layers in the transmitter are explained.

When a disconnection request is transmitted from the application to the OBEX (P), the OBEX (P) immediately emits a disconnection request function (Primitive), which contains a disconnection request command, to the lower layer (SMP (P)). Further, when a disconnection confirmation function is transmitted from SMP (P) to the OBEX (P), the OBEX (P) checks a response for OBEX disconnection which is contained in the data. When the response tells that the disconnection has been properly done ("Success"), the OBEX (P) finishes the disconnecting operation.

The SMP (P) receives the disconnection request function from the OBEX (P), and immediately adds (a) parameter(s) required for communication with the SMP (S) of the receiver to the data, and emits the disconnection request function to the lower layer (LMP (P)). When a disconnection confirmation function is transmitted from LMP (P) to the SMP (P), the SMP (P) extracts (a) parameter(s) generated by the SMP (S) of the receiver from the data of the function, and checks the value, and then finishes the negotiation with the SMP (S). Further, the SMP (P) removes the parameter(s) of SMP (S) from the data of disconnection confirmation function, and transmits the resulting data to the OBEX (P) as the disconnection confirmation function. It however should be noted that there is no parameter to be added to the disconnection request function in the SMP (P).

The LMP (P) receives the disconnection request function from the SMP (P), and immediately adds (a) parameter(s) required for communication with the LMP (S) of the receiver to the data of disconnection request function from the SMP (P), and emits the disconnection request function to the lower layer (LAP (P)). When a disconnection confirmation function is transmitted from the LAP (P) to the LMP (P), the LMP (P) extracts (a) parameter(s) generated by the LMP (S) of the receiver from the data of the function, and checks the value, and then finishes the disconnecting operation with the LMP (S). Further, the LMP (P) removes the parameter(s) of LMP (S) from the data of disconnection confirmation function, and transmits the resulting data to the SMP (P) as the disconnection confirmation function. It however should be noted that there is no parameter to be added to the disconnection request function in the LMP (P).

The LAP (P) receives the disconnection request function from the LMP (P), and immediately adds (a) parameter(s) required for communication with the LAP (S) of the receiver to the data of disconnection request function from the LMP (P), and emits the DISC command to the physical layer of the receiver. When the UA response is transmitted from the physical layer of the receiver to the LAP (P), the LAP (P) extracts (a) parameter(s) generated by the LAP (S) of the receiver from the data of the UA response, and checks the value, and then finishes the disconnecting operation with the LAP (S). Further, the LAP (P) removes the parameter(s) of LAP (S) from the data of UA response, and transmits the resulting data to the LMP (P) as the disconnection confirmation function. It however should be noted that there is no parameter to be added to the disconnection request function in the LAP (P).

Next, the communication layers in the receiver are explained.

When a disconnection notification function (Indication) is transmitted from the lower layer (SMP (S)), the OBEX (S) checks a command for OBEX disconnection which is contained in the data. When the command indicates that the disconnection has been properly done, the OBEX (S) emits a response called "Success" as a disconnection response function to the SMP (S), and finishes the disconnecting operation.

When the disconnection notification function is transmitted from the lower layer (SMP (S)), the SMP (S) extracts (a) parameter(s) generated by the SMP (P) of the transmitter from the data of the function, and creates (a) parameter(s) for response, and emits the disconnection request function containing the data thus created by removing the parameter(s) of SMP (P) from the data of the function, to the OBEX (S), and then stands by for a disconnection response function which comes from the OBEX (S). Further, when the disconnection response function is transmitted from the OBEX (S), the SMP (S) adds the parameter(s) of the response to the data of disconnection response function of the OBEX (S), emits the disconnection response function to the LMP (S), and finishes the disconnection in the SMP layer. It however should be noted that there is no parameter to be added to the disconnection request function in the SMP (S).

When the disconnection notification function is transmitted from the lower layer (LAP (S)), the LMP (S) extracts (a) parameter(s) generated by the LMP (P) of the transmitter from the data of the function, and creates (a) parameter(s) for response, and emits the disconnection request function containing the data thus created by removing the parameter(s) of LMP (P) from the data of the function, to the SMP (S), and then stands by for a disconnection response function which comes from the SMP (S). Further, when the disconnection response function is transmitted from the SMP (S), the LMP (S) adds the parameter(s) of the response to the data of disconnection response function of the SMP (S), emits the disconnection response function to the LAP (S), and finishes the disconnection in the LMP layer. It however should be noted that there is no parameter to be added to the disconnection request function in the LMP (S).

When the DISC command is transmitted from the physical layer, the LAP (S) extracts (a) parameter(s) generated by the LAP (P) of the transmitter from the DISC command, and creates (a) parameter(s) for response after transmitting the disconnection request function, containing the data thus created by removing the parameter(s) of LAP (P) from the data of the command, to the LMP (S), and then stands by for a disconnection response function which comes from the LMP (S). Further, when the disconnection response function is transmitted from the LMP (S), the LAP (S) adds the parameter(s) of the response to the data of disconnection response function of the LMP (S), emits the UA response to the physical layer, and finishes the disconnection in the LAP layer. It however should be noted that there is no parameter to be added to the disconnection request function in the LAP (S).

(C) The Present Embodiment (Response is not Sent)

Figure 49:
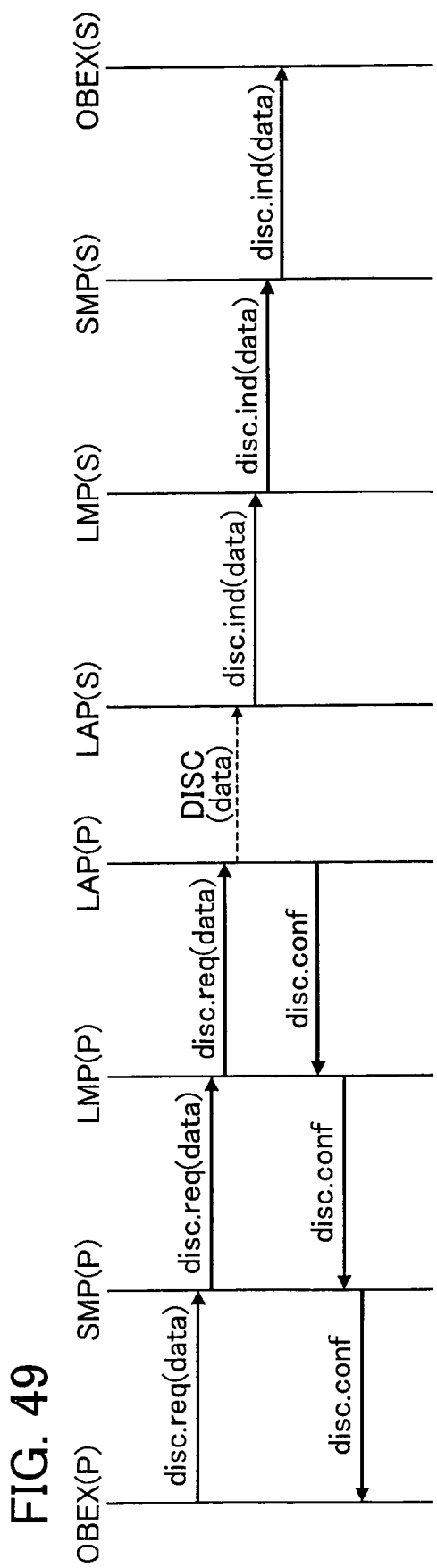
FIG. 49 is a sequence view showing functions (command, message) between the layers and the flow of packet in a disconnection sequence according to the communication functions 2, 8.

FIG. 49 is a sequence view showing a disconnection sequence according to the present embodiment (response is not sent). FIG. 48(*a*) is an explanatory views each illustrating a structure of communication data used in the disconnection sequence of the present embodiment (response is not sent).

As shown in FIG. 49, in the present embodiment (response is not sent), the disconnection command of the transmitter is propagated from upper to lower layers, and a DISC command is generated. In the transmitter, the disconnecting operation is completed at this point. Meanwhile, the receiver receives the DISC command, and passes on the DISC command from lower to upper layers. When the DISC command is passed onto the uppermost layer, the disconnection sequence is completed.

The following separately describe the sequence in the transmitter and the sequence in the receptor.

First, the communication layers in the transmitter are explained.

When a disconnection request is transmitted from the application to the OBEX (P), the OBEX (P) immediately emits a disconnection request function (Primitive), which contains a disconnection request command, to the lower layer (SMP (P)). Further, when a disconnection confirmation function is transmitted from SMP (P) to the OBEX (P), the OBEX (P) finishes the disconnecting operation.

The SMP (P) receives the disconnection request function from the OBEX (P), and immediately adds (a) parameter(s) required for communication with the SMP (S) of the receiver to the data, and emits the disconnection request function to the lower layer (LMP (P)). When a disconnection confirmation function is transmitted from LMP (P) to the SMP (P), the disconnection is completed with the transmitted parameter(s) and the SMP (P) finishes the disconnection in the SMP (S). Further, the SMP (P) transmits the disconnection confirmation function to the OBEX (P). It however should be noted that there is no parameter to be added to the disconnection request function in the SMP (P).

The LMP (P) receives the disconnection request function from the SMP (P), and immediately adds (a) parameter(s) required for communication with the LMP (S) of the receiver to the data of disconnection request function from the SMP (P), and emits the disconnection request function to the lower layer (LAP (P)). When a disconnection confirmation function is transmitted from LAP (P) to the LMP (P), the disconnection is completed with the transmitted parameter(s), and the LMP (P) finishes the disconnection in the LMP layer. Further, the LMP (P) transmits the disconnection confirmation function to the SMP (P). It however should be noted that there is no parameter to be added to the disconnection request function in the LMP (P).

The LAP (P) receives the disconnection request function from the LMP (P), and immediately adds (a) parameter(s) required for communication with the LAP (S) of the receiver to the data of disconnection request function from the LMP (P), and emits the DISC command to the physical layer of the receiver. When a DISC command is outputted, the disconnection is completed with the transmitted parameter(s), and the LMP (P) finishes the disconnection in the LAP layer. Further, the LAP (P) transmits the disconnection confirmation function to the LMP (P). It however should be noted that there is no parameter to be added to the disconnection request function in the LAP (P).

Next, the communication layers in the receiver are explained.

When a disconnection notification function (Indication) is transmitted from the lower layer (SMP (S)), the OBEX (S) checks a command for OBEX disconnection which is contained in the data. When the command indicates that the disconnection has been properly done, the OBEX (S) finishes the disconnecting operation.

When the disconnection notification function is transmitted from the lower layer (LMP (S)), the SMP (S) extracts (a) parameter(s) generated by the SMP (P) of the transmitter from the data of the function, and completes the disconnection with the parameter(s). Further, the SMP (S) removes the SMP (P) parameter(s) from the data of disconnection notification function, contains the data into a disconnection request function, and send it to the OBEX (S). It however should be noted that there is no parameter to be added to the disconnection request function in the SMP (S).

When the disconnection notification function is transmitted from the lower layer (LAP (S)), the LMP (S) extracts (a) parameter(s) generated by the LMP (P) of the transmitter from the data of the function, and finishes the disconnection with the parameter(s). Further, the LMP (S) removes the parameter(s) of LMP (P) from the data of the function, contains the data into a disconnection request function, and send it to the SMP (S). It however should be noted that there is no parameter to be added to the disconnection request function in the LMP (S).

When the DISC command is transmitted from the physical layer, the LAP (S) extracts (a) parameter(s) generated by the LAP (P) of the transmitter from the DISC command, and completes disconnection with the parameter(s). Further, the LAP (S) removes the parameter(s) of the LAP (P) from the data of DISC command, and contain the resulting data to the disconnection request function and then emits the function to the LMP (S). It however should be noted that there is no parameter to be added to the disconnection request function in the LAP (S).

(4) Activate/Deactivate Response Function

With reference to FIGS. 50 to 57, the following explains a flow of data and parameter(s) among the respective communication layers in the transmitter and the receiver.

In the present embodiment, the communication layers LAP, LMP, SMP, OBEX each has a connection request function, a connection notification function, a connection response function, and a connection confirmation function, respectively. These functions are used for access to the LAP layer from the upper layer (LMP layer etc.).

For these functions, either Data (hereinafter referred simply as data), Requested-QoS or Returned-QoS may be specified as an argument. As described above, the data is determined in each layer.

Meanwhile, QoS notifies the upper layers, including OBEX, of the negotiation parameter(s) such as a baud rate determined in the LAP, a negotiation result etc. Note that, the IrDA-D1.1 also uses QoS.

For example, when the application or the OBEX (P) of the transmitter emits a QoS, it is propagated through the lower layers and reaches the LAP (P). Then, the LAP (P) uses the value of QoS as the value of the negotiation parameter(s) (Ack Less Connect), and transmits the parameter(s) to the receiver.

Consequently, the communication layers of the transmitter and the communication layers of the receiver are separately operated depending on whether the response function of the application or the OBEX (P9) is activated/deactivated, thereby enabling connection both in a bidirectional manner and in a one-way manner.

FIGS. 50 to 54 are explanatory views showing a flow of data and parameter(s) among the respective communication layers in the connection sequence (FIG. 39) according to the present embodiment (response is sent). Note that, the respective QoS parameter(s) between OBEX-SMP, between SMP-LMP, between LMP-LAP may be identical or different They are discriminated by the added symbols-a, -b, and -c in the figure.

Figure 50:
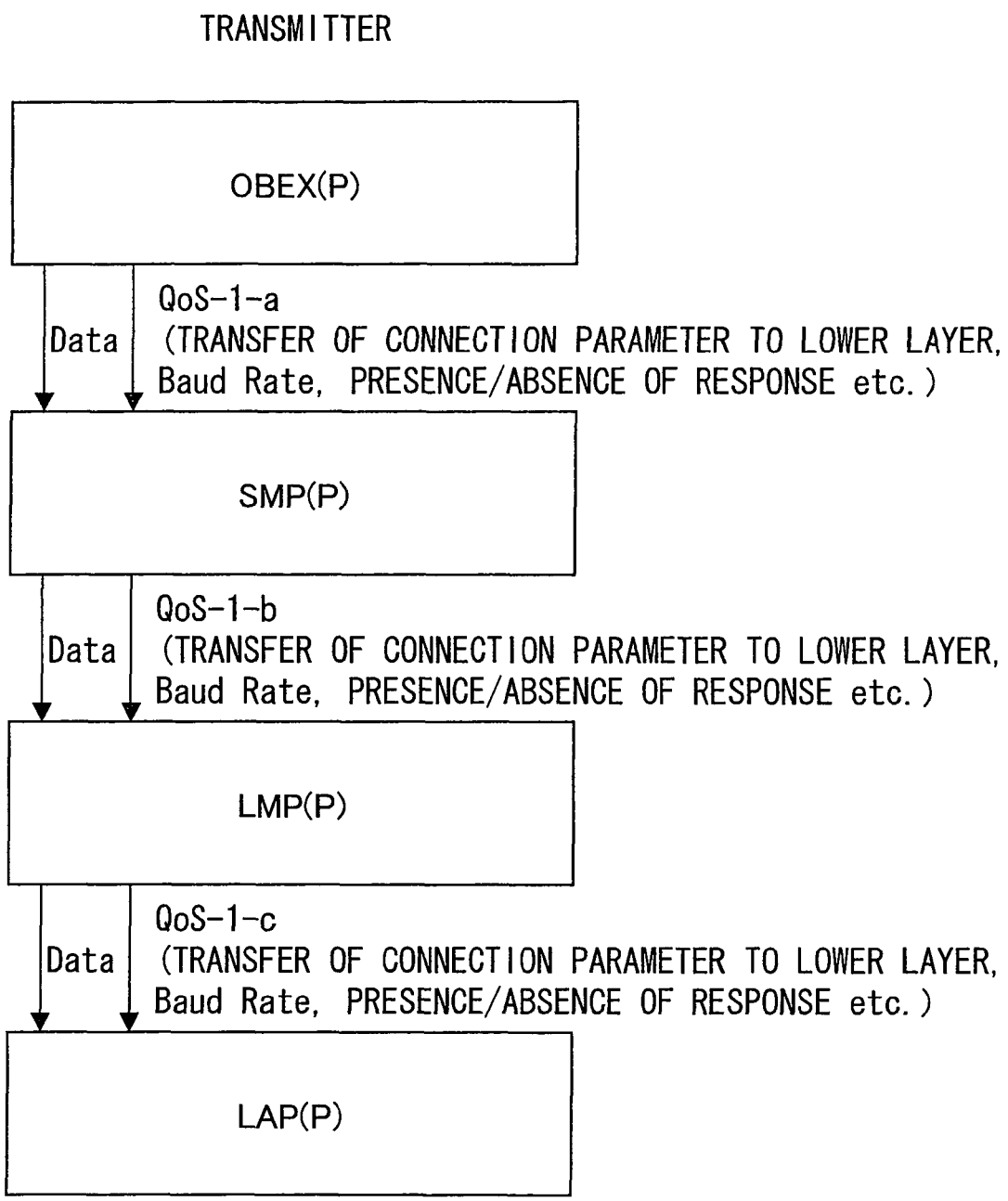
FIG. 50 is a schematic view showing a process of delivering connection request function data and connection parameter in the first station, according to the communication functions 1, 2, 7, 8.

In the transmitter, as shown in FIG. 50, the data transmitted to the receiver and the data and QoS-1 (QoS requested by the transmitter) are propagated through upper to lower layers by con.req (data) (FIG. 39).

Figure 51:
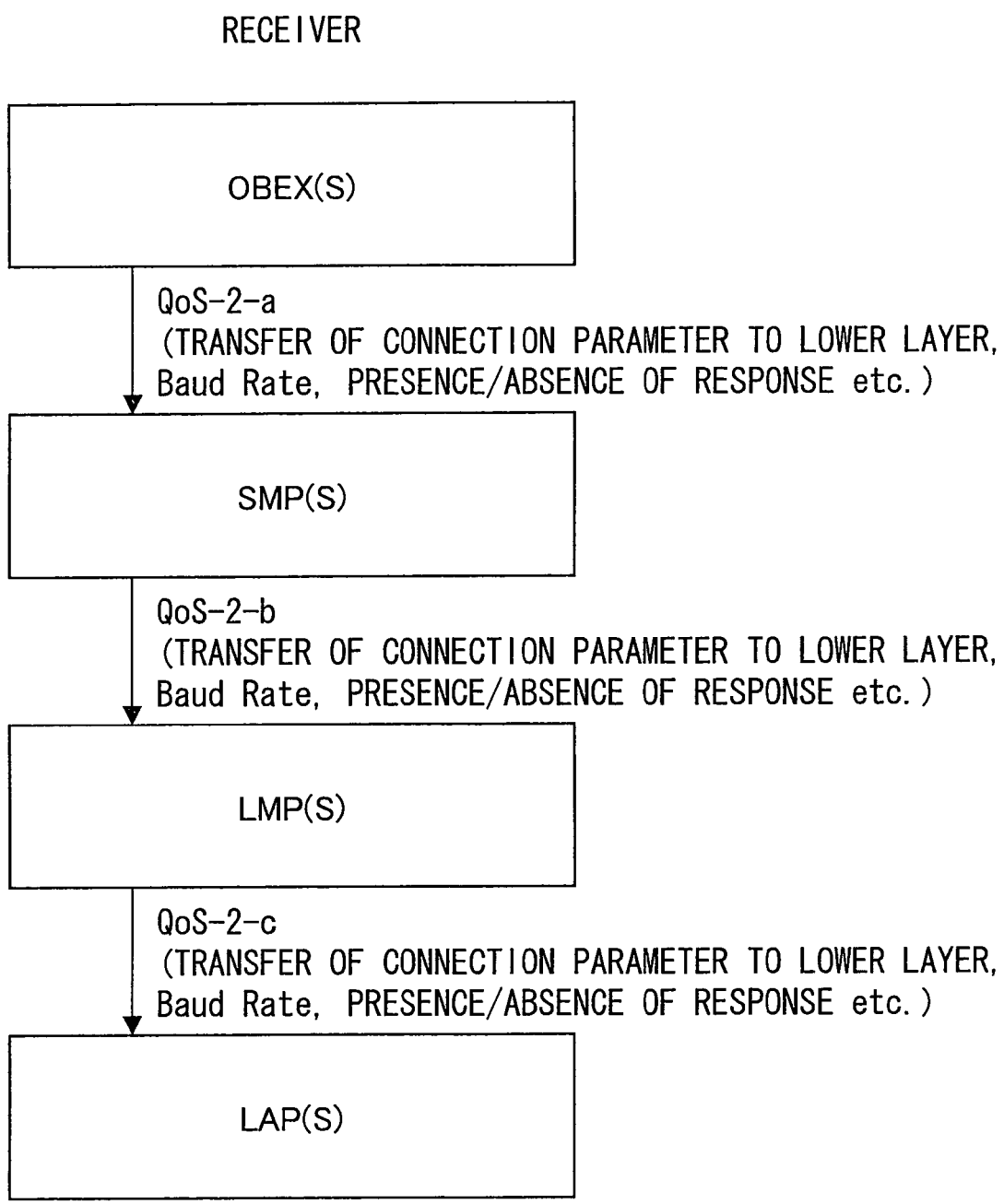
FIG. 51 is a schematic view showing a process of delivering connection request function data and connection parameter in the second station according to the communication functions 1, 2, 7, 8.

Meanwhile, in the transmitter, as shown in FIG. 51, only the data of QoS-2 (QoS requested by the receiver) is propagated through upper to lower layers by the con.req.

Figure 52:
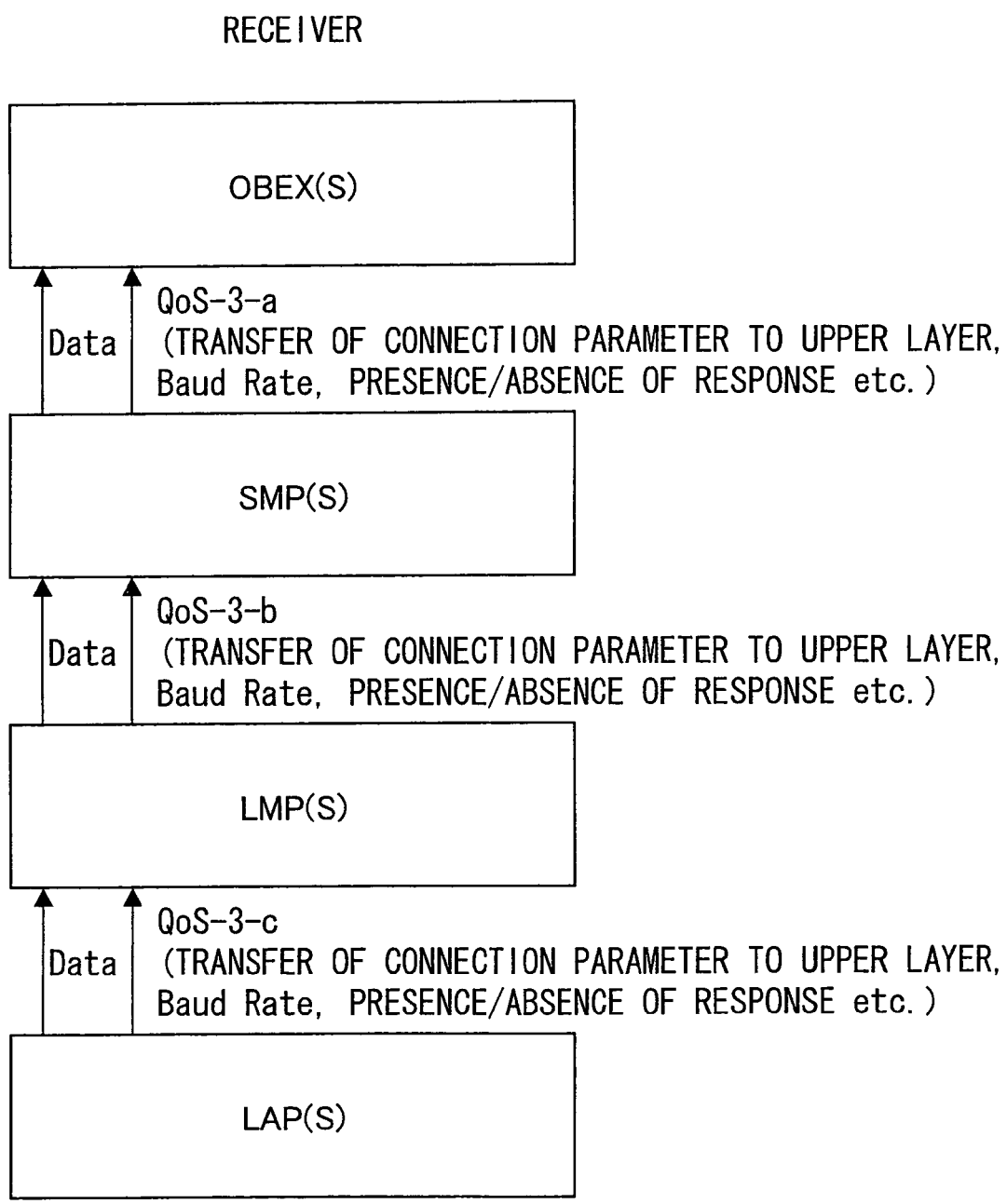
FIG. 52 is a schematic view showing a process of delivering connection notification function data and connection parameter in the first station according to the communication functions 1, 2, 7, 8.

Thereafter, in the receiver, the QoS-1 of the transmitter and the QoS-2 of the receiver are compared at the time of receiving the SNRM command in the LAP (S), thereby creating a common negotiation parameter(s) QoS-3. Then, as shown in FIG. 52, the LAP (S) passes on the QoS-3 and the data from the transmitter to the upper layers by con.ind (data). The upper layers each stores the QoS-3 and keeps it as (a) connection parameter(s) to establish connection.

Figure 53:
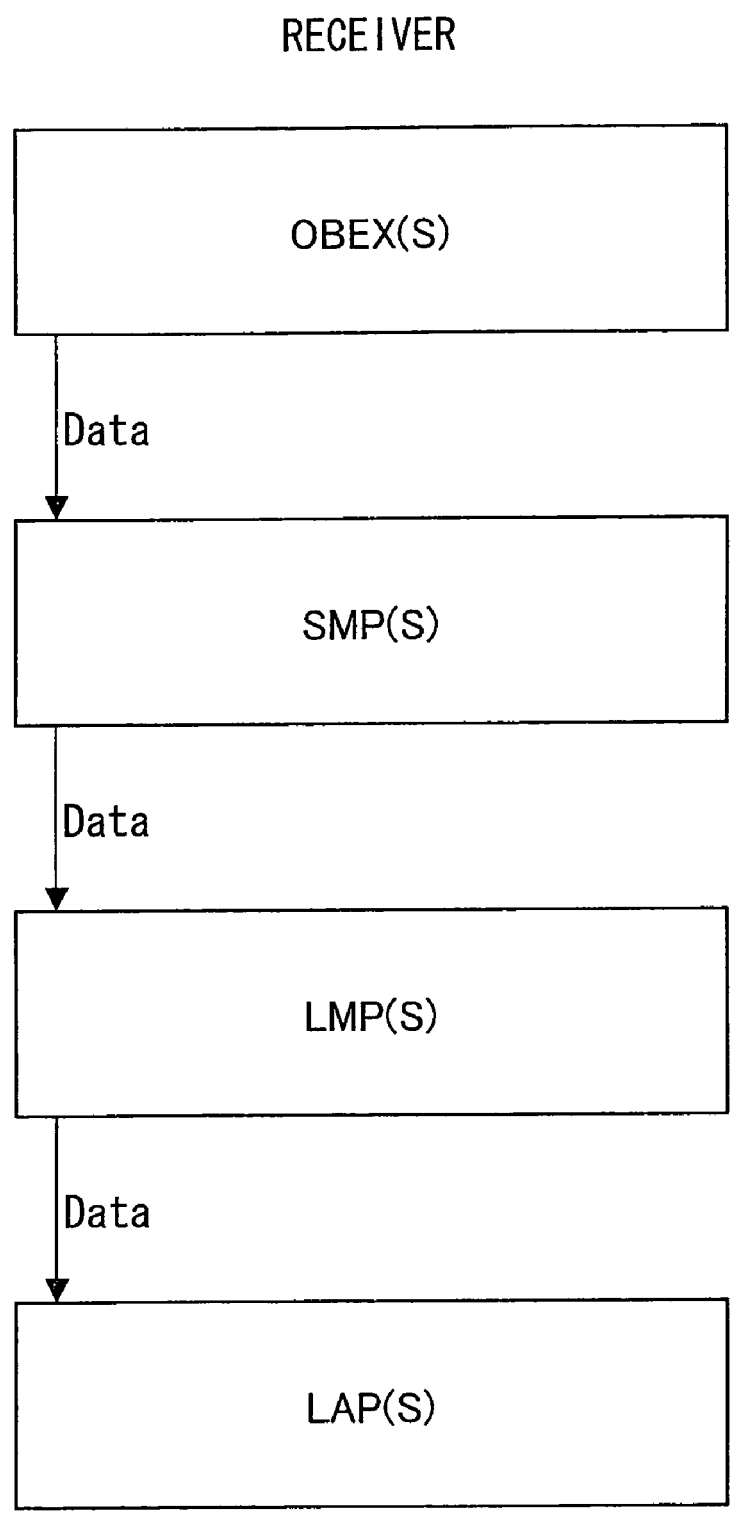
FIG. 53 is a schematic view showing a process of delivering connection response function data in the second station according to the communication functions 1, 7.

In the receiver, QoS is not required in propagation of con.resp (data). Therefore, as shown in FIG. 53, only data is propagated from upper to lower layers by the con.resp (data). Then, when the LAP (S) receives the con.resp (data), the QoS-3 is contained in the UA response, and the UA response is transmitted.

Figure 54:
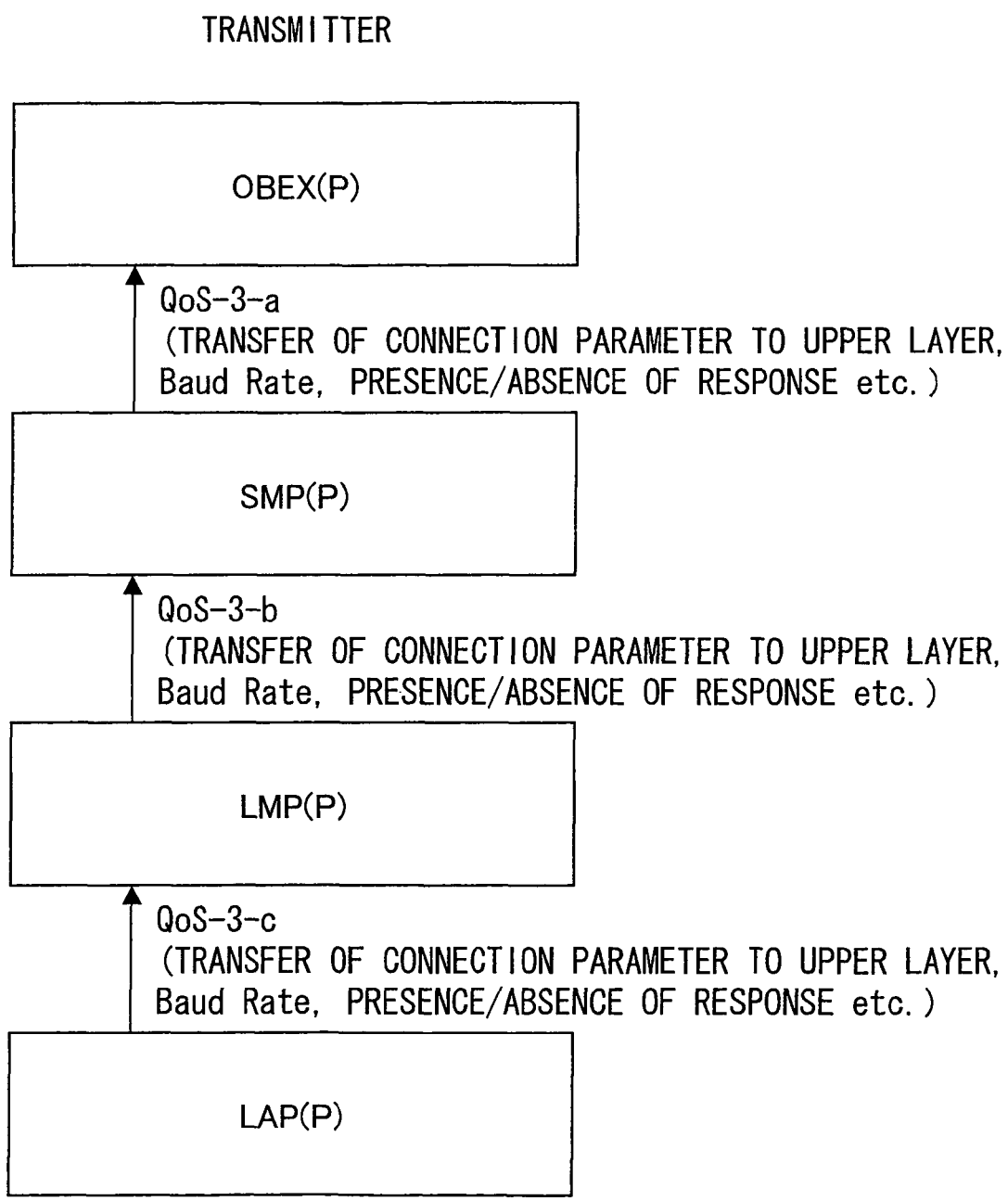
FIG. 54 is a schematic view showing a process of delivering connection parameter of connection confirmation function in the second station according to the communication functions 2, 8.

In the transmitter, the LAP (P) receives the UA response and stores the QoS-3 as (a) negotiation parameter(s). Then, as shown in FIG. 54, the LAP (P) passes on the QoS-3 and the data from the receiver to the upper layers by con.conf (data). The communication layers each stores the QoS-3 and keeps it as (a) connection parameter(s) to establish connection.

In the present embodiment, as a QoS of con.req, "Requested-QoS:Baud-Rate+Max-Turn-Around-Time+Disconnect-Threshold+DataSize+Ack less connection+Min-Packet-Interval" is used. Further, as a QoS of Con.ind,con-.conf, "Resultant-QoS:Baud-Rate+Disconnect-Threshold+DataSize+Ack less connection (indication primitive only)" is used.

The following explains a flow of data and parameter(s) among the respective communication layers in the connection sequence (FIG. 41) according to the present embodiment (response is not sent).

In the transmitter, as shown in FIG. 50, the data transmitted to the receiver and the data of QoS-1 (QoS requested by the transmitter) are propagated through upper to lower layers by con.req (data) (FIG. 39).

Then, the LAP (P) of the transmitter stores the QoS-1 as QoS-3. Further, as shown in FIG. 54, the LAP (P) passes on the QoS-3 to the upper layers by con.conf. The communication layers each stores the QoS-3 and keeps it as (a) connection parameter(s) for the established connection.

Meanwhile, in the receiver, only data of QoS-2 (QoS requested by the receiver) is propagated from upper to lower layers by the con.req, as shown in FIG. 51.

Thereafter, in the receiver, the QoS-1 of the transmitter is determined as QoS-3 at the time of receiving a SNRM command in the LAP (S). Note that, when the combination of the parameter(s) of QoS-2 and the QoS-1 is not adequate, the SNRM command cannot be received.

Then, as shown in FIG. 52, the LAP (S) passes on the QoS-3 and the data from the transmitter to the upper layers by con.ind (data). The upper layers each stores the QoS-3 and keeps it as (a) connection parameter(s) to establish connection.

In this manner, QoS-1 and QoS-2 are controlled by the application in the upper layer (application), thereby allowing activation/deactivation of the response function.

The activation/deactivation of response function may be selected, for example, according to the type of file to be transmitted, the application, or on user's demand.

For example, if the response function is activated/deactivated according to the type of file, it may be arranged so that the response function can be freely turned on and off in the case of a multimedia-related file or the like. In this case, it is more convenient if the response function is automatically activated for the data that the user particularly desires to confirm its reception, such as telephone book, mail, schedule etc. Further, if the response function is activated/deactivated according to the application, the response function may be automatically deactivated in the case of a slide show. Further, if the response function is activated/deactivated on user's demand, a menu screen may be shown, allowing the user to input a command.

Figure 55:
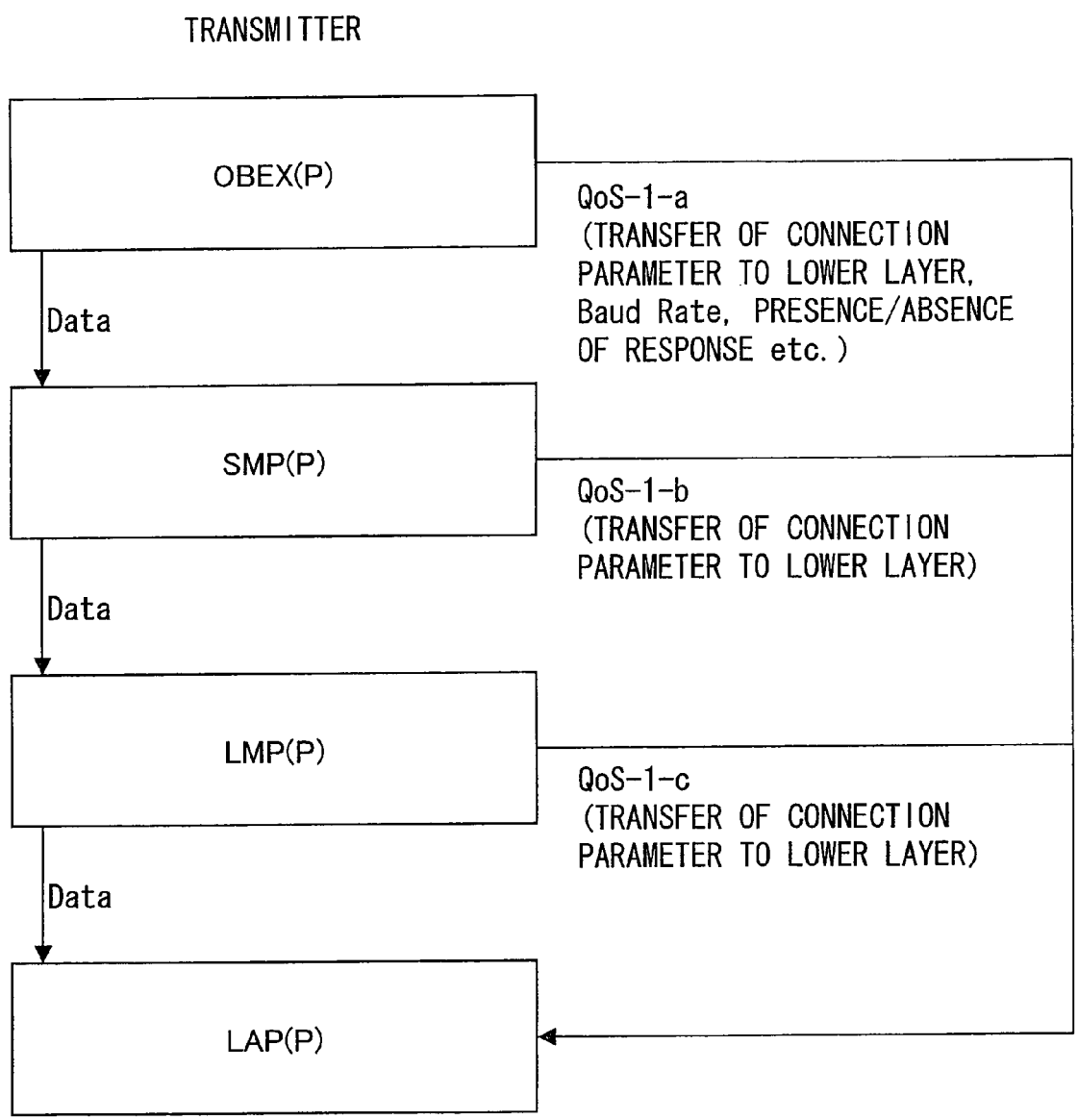
FIG. 55 is a schematic view showing an alternative of the embodiment, the figure showing a process of delivering connection request function data and connection parameter in the first station according to the communication functions 1, 2, 7, 8, in the case of sharing the connection parameter in plural layers.
Figure 56:
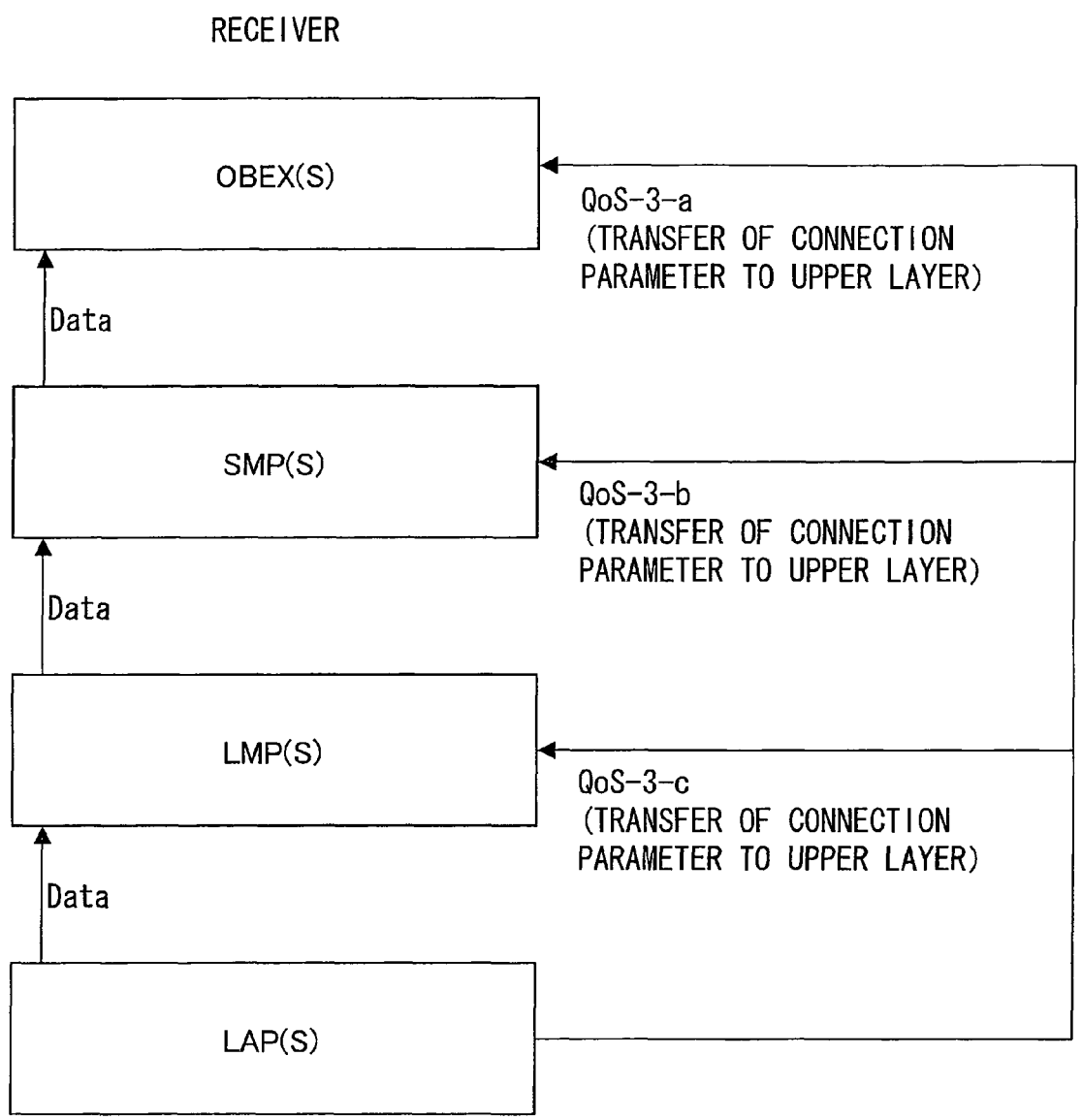
FIG. 56 is a schematic view showing an alternative of the embodiment, the figure showing a process of delivering connection notification function data and connection parameter in the second station according to the communication functions 1, 2, 7, 8, in the case of sharing the connection parameter in plural layers.
Figure 57:
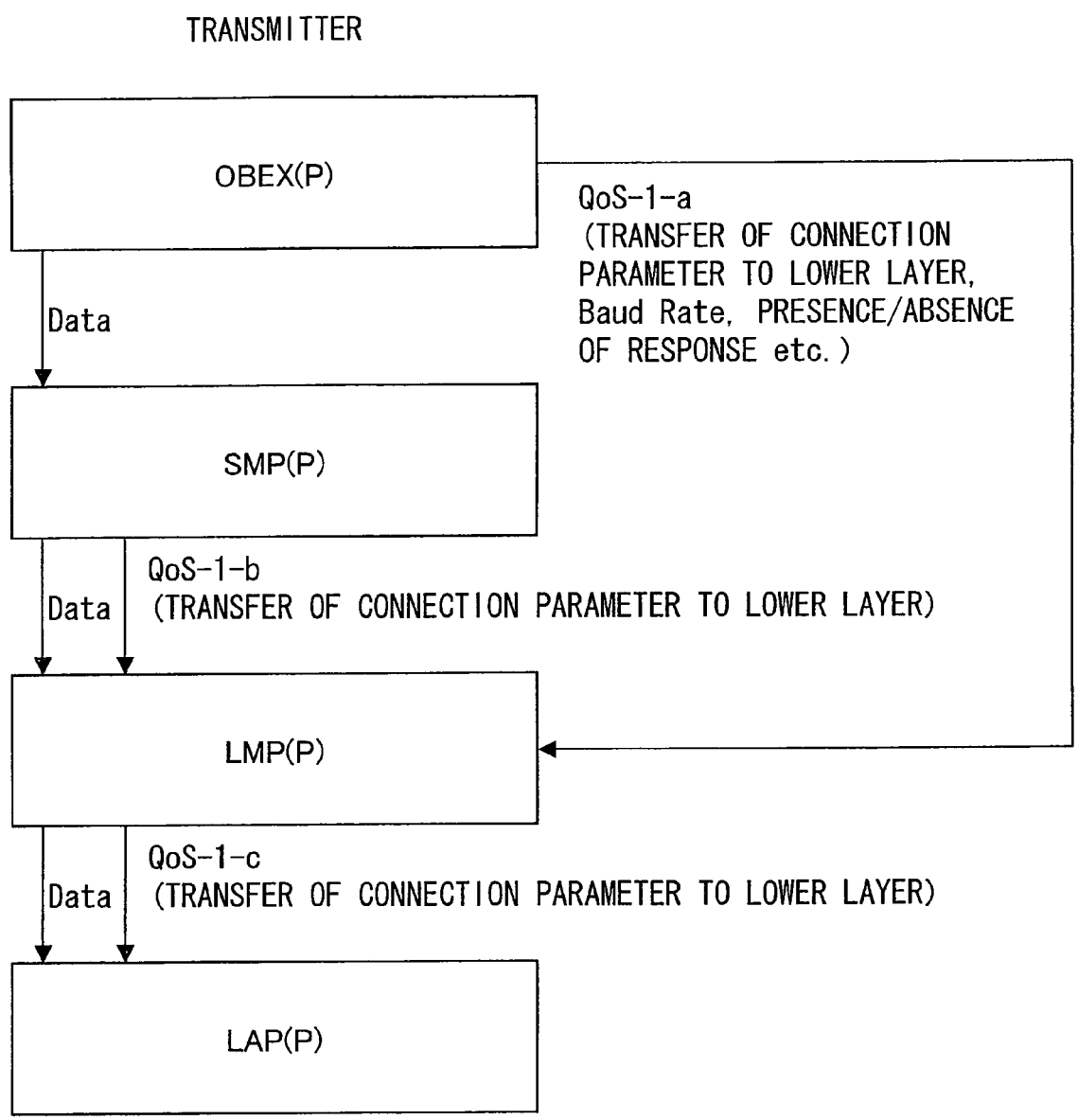
FIG. 57 is a schematic view showing an alternative of the embodiment, the figure showing a process of delivering connection request function data and connection parameter in the first station according to the communication functions 1, 2, 7, 8, in the case where respective layers individually deliver the connection parameter to lower layers.

FIGS. 55 through 57 are explanatory views showing an alternative of flow of data and parameter(s) among the respective communication layers in a connection sequence according to the present embodiment.

In the transmitter, when the first SNRM command includes information of all communication layers (FIG. 39), the data and parameter(s) may be directly transmitted to the LAP layer from each communication layer, instead of passing those on among the communication layers (FIG. 50). This direct transmission to the LAP layer is shown in FIG. 55.

On the other hand, as shown in FIG. 56, the receiver may be arranged so that all of the data and the parameter(s) contained in the SNRM command are extracted, and are transmitted directly from the LAP layer to the respective corresponding communication layers.

Further, as shown in FIG. 57, it may be arranged so that the data items for OBEX (P), SMP (P), and LMP (P) are unified in the LMP (P), and the parameter(s) of the LAP (P) is added to the unified data/parameter(s), thereby generating a SNRM command.

(5) Functional Block

Figure 58:
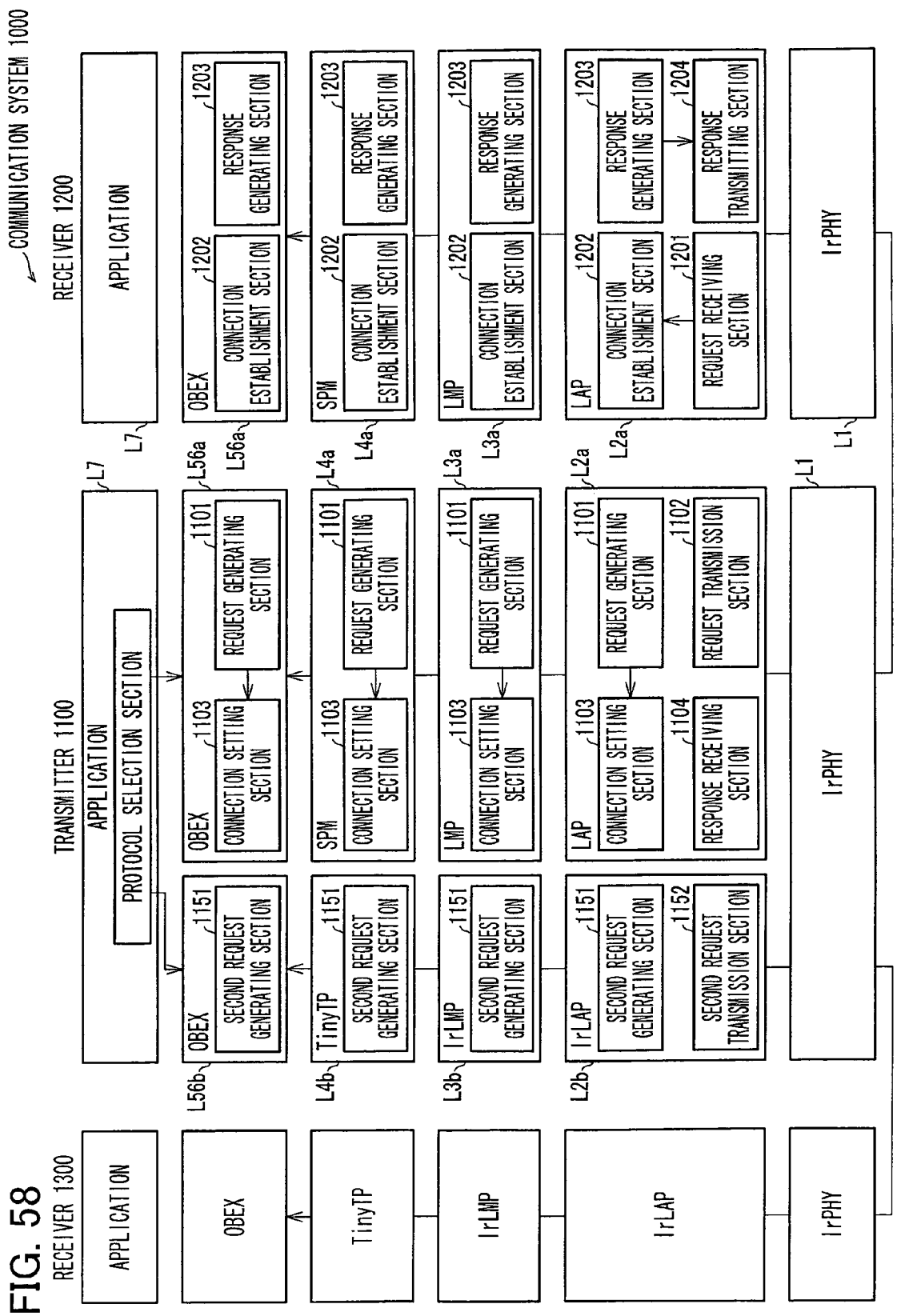
FIG. 58 is a function block diagram illustrating a structure example of communication system according to the embodiment. In the figure, the respective communication layers of the device only capable of IrDA communication, the device capable of IrDA communication and has the function of the present invention, and the device having only the function of the present invention are shown on the basis of OSI7 hierarchy layer.

FIG. 58 is a block diagram showing a structure example of a communication system 1000 according to the present embodiment.

As shown in FIG. 58, the communication system 1000 is constituted of a transmitter 1100 and the receiver 1200, which are communicated with each other by connecting their plural communication layers. The transmitter 1100 and the receiver 1200 correspond to a protocol in which connection/disconnection of a plurality of communication layers are carried out by exchanging a single connecting/disconnecting request. The request contains all required commands and data for connecting/disconnecting two adjacent layers among the communication layers.

Further, the communication system 1000 includes another receiver 1300 which is communicated with the transmitter 1100 by connecting its plural communication layers to the communication layers of the transmitter 1100. The transmitter 1100 and the receiver 1300 correspond to a protocol (eg., IrDA-D1.1) in which connection/disconnection of a plurality of communication layers are carried out by exchanging plural connecting/disconnecting requests, each of which contains commands and data for connecting/disconnecting one of the communication layers.

Note that, the transmitter 1100, the receivers 1200 and 1300 may all function as both a transmitter and a receiver. More specifically, a device having the functions of transmitter 1100 and the receiver 1200 serves as a communication device capable of carrying out transmission/reception with the communication protocol of the present embodiment. Similarly, a device having the functions of transmitter 1100 and the receivers 1200/1300 serves as a communication device capable of carrying out transmission/reception by selectively using the communication protocol of the present embodiment or the IrDA-D1.1 protocol.

The transmitter 1100 includes at least a request generating section (connection request generating means, disconnection request generating means) 1101, the request transmission section (connection request transmitting means, disconnection request transmitting means) 1102, a connection setting section (connection setting means) 1103, and a response receiving section (response receiving means) 1104.

The request generating section 1101 and the connection setting section 1103 are provided in each of communication layers L2a, L3a, L4a, and L56a. The request transmission section 1102 and the response receiving section 1104 are provided on a communication layer L2a which is formed right on the physical layer L1.

The request generating section 1101 generates a connection request containing all required commands and data for connecting two adjacent layers among the communication layers. Further, the request generating section 1101 also generates a disconnection request containing all required commands and data for disconnecting two adjacent layers among the communication layers. Note that, the plural communication layers denote the intermediate layers (communication layers L2a, L3a, L4a, L56a), that are communication layers other than the physical layer L1 and the application layer L7.

Note that, the combination of communication layers for which the commands and data are joined in a single request may be different in the case of connection request and in the case of disconnection request. As one example, the plural communication layers are divided into two groups so that the connection is established by two connection requests, while they are disconnected by using a single disconnection request.

Further, when the connection is established with the protocol in which a response is sent, the request generating section 1101 includes in the connection request a command for requesting the receiver 1200 to transmit a response to the connection request.

Further, when the connection is established with the protocol in which a response is sent, the request generating section 1101 includes in the connection request a command for requesting the receiver to transmit a response during data communication.

Note that, even when the connection is established with the protocol in which a response is sent, the request generating section 1101 may include in the connection request only one of the command for sending a response to the connection request and the command for transmitting a response during data communication. In other words, it is allowed to omit the response to the connection request or the response during data communication. It may be obvious but, if they are both omitted, the communication is performed with a protocol in which a response is not sent.

The request transmission section 1102 transmits the connection request and the disconnection request, which are generated by the request generating section 1101, to the receiver 1200. Further, the response receiving section 1104 receives a response to the connection/disconnection request from the receiver 1200.

When the connection is established with the protocol in which a response is sent, the connection setting section 1103 carries out setting for each communication layer according to the response, which is received from the receiver 1200 as a response to the connection request transmitted from the connection setting section 1103.

Further, when the connection is established with the protocol in which a response is not sent, the connection setting section 1103 does not receive a response to the transmitted connection request transmitted from the connection setting section 1103, and carries out setting for each communication layer according to the connection request.

The receiver 1200 includes a request receiving section (connection request receiving means, disconnection request receiving means) 1201, the connection establishing section (connection establishing means, disconnecting means) 1202, a reception generating section (response generating means) 1203, and a response transmission section (response transmitting means) 1204.

The request receiving section 1201 and the response transmitting section 1204 are provided on a communication layer L2a which is formed right on the physical layer L1. The connection establishing section 1202 and the response generating section 1203 are provided in each of communication layers L2a, L3a, L4a, and L56a.

The request receiving section 1201 receives a connection request from the transmitter 1100. The connection request contains all required commands and data for connecting two adjacent layers among the communication layers. Further, the request receiving section 1201 also receives a disconnection request from the transmitter 1100. The disconnection request contains all required commands and data for disconnecting two adjacent layers among the communication layers.

The connection establishing section 1202 extracts commands and data from the connection request received by the connection request receiving section 1201, and establishes connection for each communication layer according to the commands and data. Further, the connection establishment section 1202 extracts commands and data from the disconnection request, and cuts off the connection for each communication layer according to the commands and data.

When the connection is established with the protocol in which a response is sent, that is, when receiving a command for requesting a response to the received request or data, the response generating section 1203 generates a response.

For example, when the received connection request contains a command for requesting a response to the connection request, the response generating section 1203 generates a response. Further, when the received connection request contains a command for requesting a response during data exchange, the response generating section 1203 generates a response according to reception of data.

The response transmitting section 1204 transmits a response, generated by the response generating section 1203, to the transmitter 1100.

With this arrangement, the plural communication layers may be connected by a single connection request. Therefore, all commands and data required for connecting plural layers can be joined in a single connection request.

In this way, the time taken to establish connection is reduced compared with a protocol in which a connection request is sent for each communication layer, such as the IrDA-D1.1. Therefore, even when the connection is cut off during the data exchange, the connection can be established again without taking much time, allowing quick recovery of data exchange.

Further, the request from the transmitter may contain instruction to request/not request a response from the receiver. Further, if the transmitter does not request a response from the receiver, it can complete the operations, such as establishment of connection.

Further, in order to communicate with the receiver 1300, the transmitter 1100 has a function of creating a separate request for each communication layer when transmitting commands and data for connection/disconnection of the plural communication layers. Since the receiver 1300 can be realized by any arbitrary device compatible with the IrDA-D1.1 protocol etc., detailed explanation for the receiver 1300 is omitted here.

In addition to the request generating section (first connection request generating means) 1101, the request transmission section 1102, the connection setting section 1103, the transmitter 1100 further includes a second request generating section (second connection request generating means) 1151, the second request transmission section (connection request transmitting means) 1152, and a protocol selection section (selecting means) 1131.

The second request generating section 1151 is provided in each of communication layers L2b, L3b, L4b, and L56b. The protocol selection section 1131 is provided on the application layer L7. The request transmission section 1152 is provided on a communication layer L2b which is formed right on the physical layer L1. The communication layers L2b, L3b, L4b, and L56b have a similar function to that of the connection setting section 1103.

When generating the connection/disconnection request, the protocol selection section 1131 selects either the first request generating section 1101 or the second request generating section 1151. Note that, the selection of protocol may be performed by the application, or as push-button operation by a user.

The second request generating section 1151 generates the connection request containing data and commands required for establishing connection and the disconnection request for each communication layer. The generated request accommodates with the IrDA-D1.1, for example.

The second transmission section 1152 transmits the connection request and the disconnection request generated by the second request generating section 1151 to the receiver 1300.

With this structure, the transmitter selectively uses either a protocol which generates a single connecting request for a plurality of communication layers so as to reduce connection time, or a protocol which generates plural commands and data for each of the communication layers, such as the IrDA-D1.1.

Note that, in receiving a request, the transmitter 1100 is further provided with a connection request receiving means for receiving plural connection requests from the transmitter, the connection requests each containing commands and data required for connection of one of the communication layers.

The communication system according to the present embodiment is useful for infrared communication or the like whose communication path is often blocked. The communication system according to the present embodiment is however applicable to any arbitrary physical layer.

In the present embodiment, the physical layer is the same as that for the protocol which sends a separate request for each communication layer also serves as a physical layer, but it is allowable to use a different physical layer. Further, though the present embodiment describes a case of using the IrDA-D1.1 with four intermediate layers as the protocol for transmitting a separate request for each communication layer, it is also allowable to provide only one intermediate layer.

(6) Example

The transmitter of the present embodiment is also useful for a mobile phone or an image capturing device for transmitting a captured image to a receiver.

In the case of a mobile phone having an image capturing function and a function as the transmitter, the present invention allows, in spite of the relatively low-speed performance of its CPU, the mobile phone to transfer an address book or data of mails stored therein to other mobile phones or devices without much of load.

Further, the present invention is particularly advantageous to the case of transferring image data obtained by a built-in image capturing function, in which case the capacity of unit file is relatively large. It may be obvious but the present invention is also applicable to an image capturing device not contained in a mobile phone, such as a digital camera.

Further, the receiver of the present embodiment is suitable for a broadcast receiving device for receiving broadcast from a transmitter or a broadcast recording device for recording broadcast received from a transmitter.

With the foregoing receiver function, a broadcast receiving/recording device becomes capable of high speed downloading of image files or the like from a mobile phone or a digital camera even though their processing abilities are relatively low, and displaying the files in a display device. This allows the user to easily display any desired images stored in the device in his hand, with a remote control operation. It becomes also possible to record data into a large-capacity recording section of a broadcast receiving/recording device.

Note that, the transmitter and the receiver according to the present embodiment may be realized by software. Therefore, when the functions of the transmitter and receiver are realized by a mobile phone, the software for realizing functions of transmitter and receiver can be delivered via a mobile phone network.

Fourth Embodiment

The following will explain another embodiment of the present invention with reference to FIGS. 12 through 15. Note that, the structure of the present invention is identical to those of First through Third Embodiments except for the differences explained below. For ease of explanation, materials having the equivalent functions as those shown in the drawings pertaining to First Embodiment above will be given the same reference symbols, and explanation thereof will be omitted here.

Figure 13:
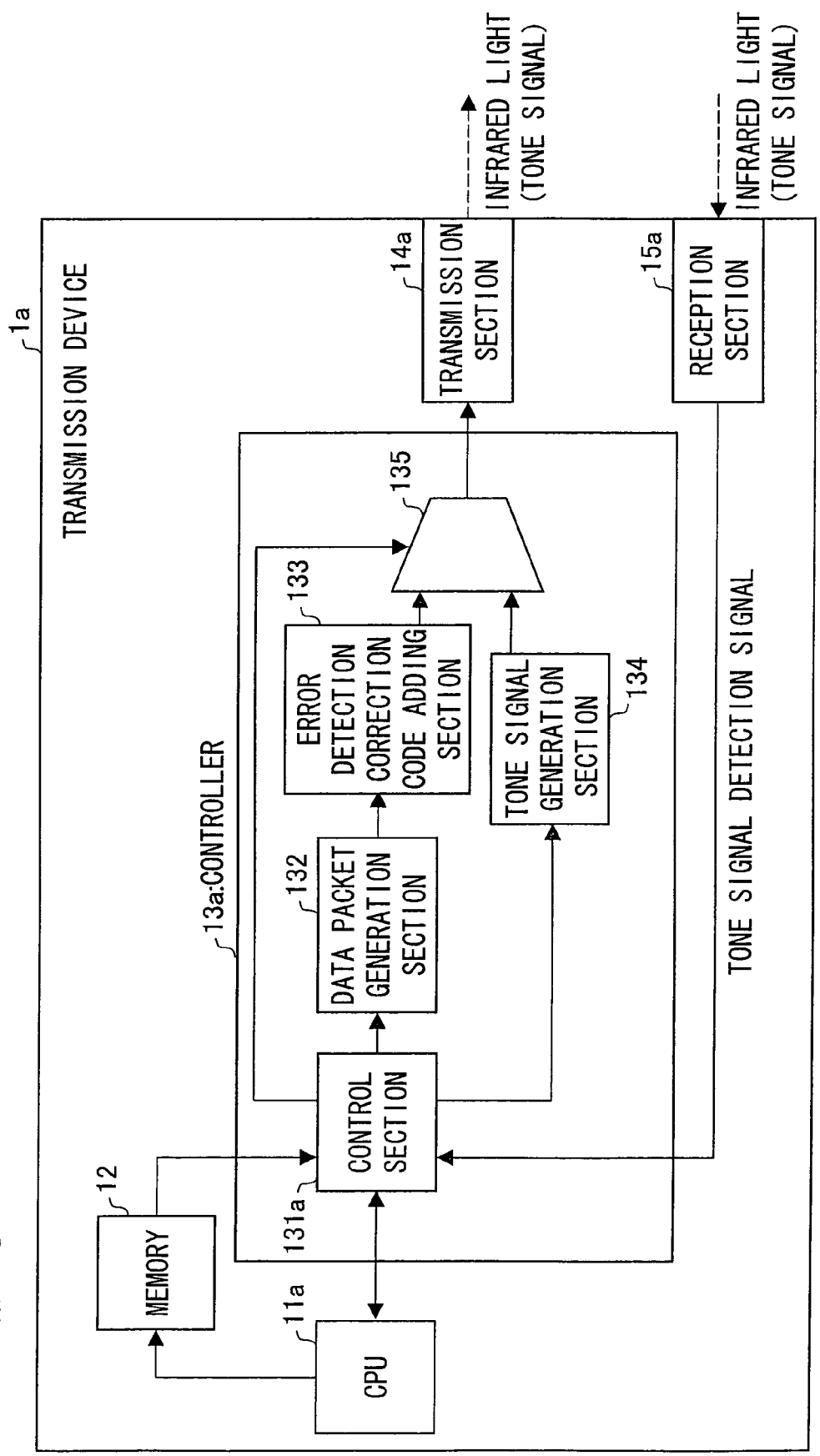
FIG. 13 is a block diagram illustrating a transmitter of the mobile device.
Figure 14:
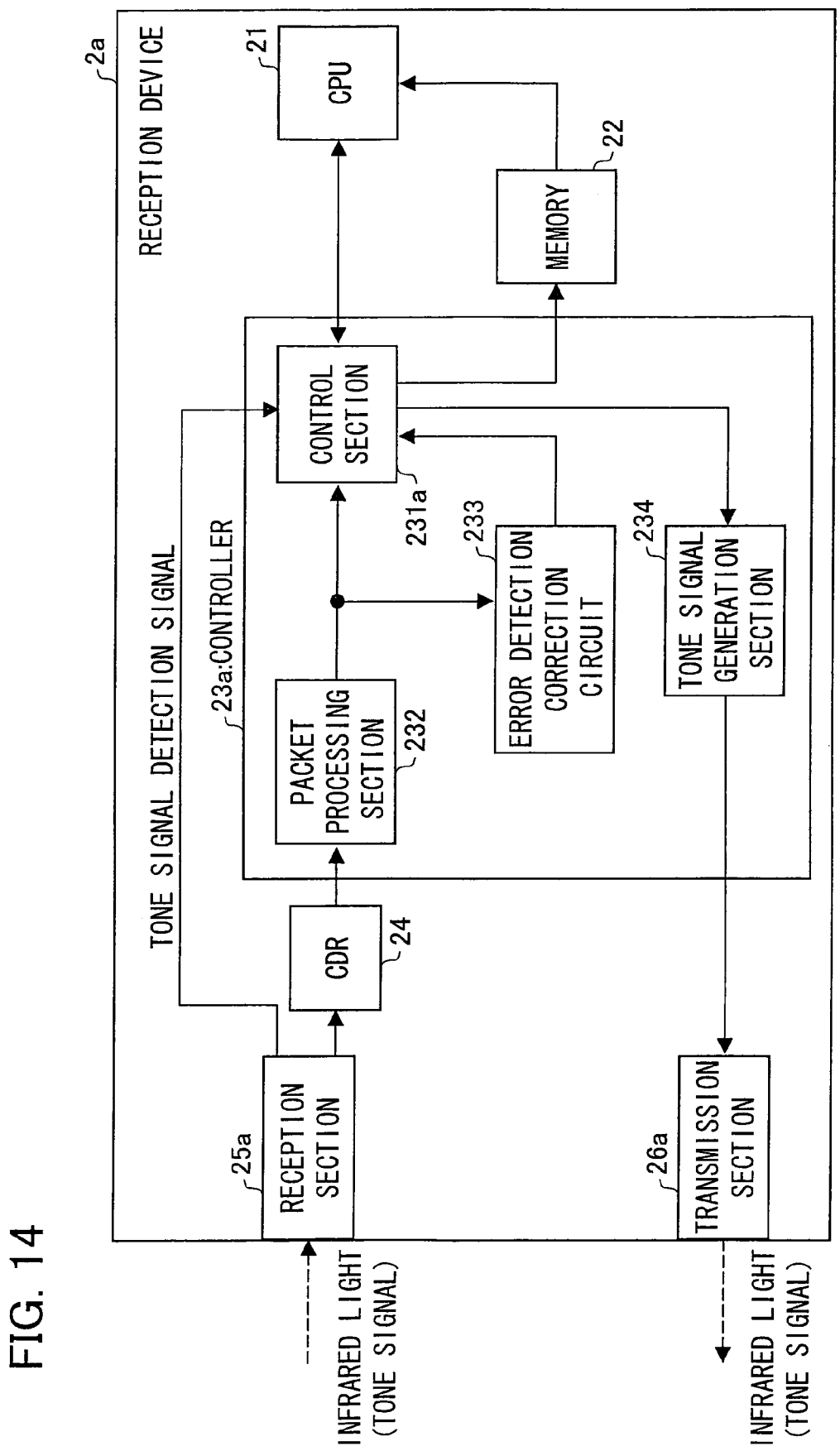
FIG. 14 is a block diagram illustrating a receiver of the mobile device.

As shown in FIGS. 13 and 14, the mobile device and the electronic device in the data transfer system according to the present embodiment includes memories (storing means) 12/22 storing at least one of the communication functions 1, 2, 4, 5, 7 and 8, and one of the communication functions 3, 6 and 9 in which search for the other end is performed before exchanging device information. These communication functions 3, 6 and 9 perform strict data retransmission. They (3, 6, 9) are IrDA protocol.

Figure 12:
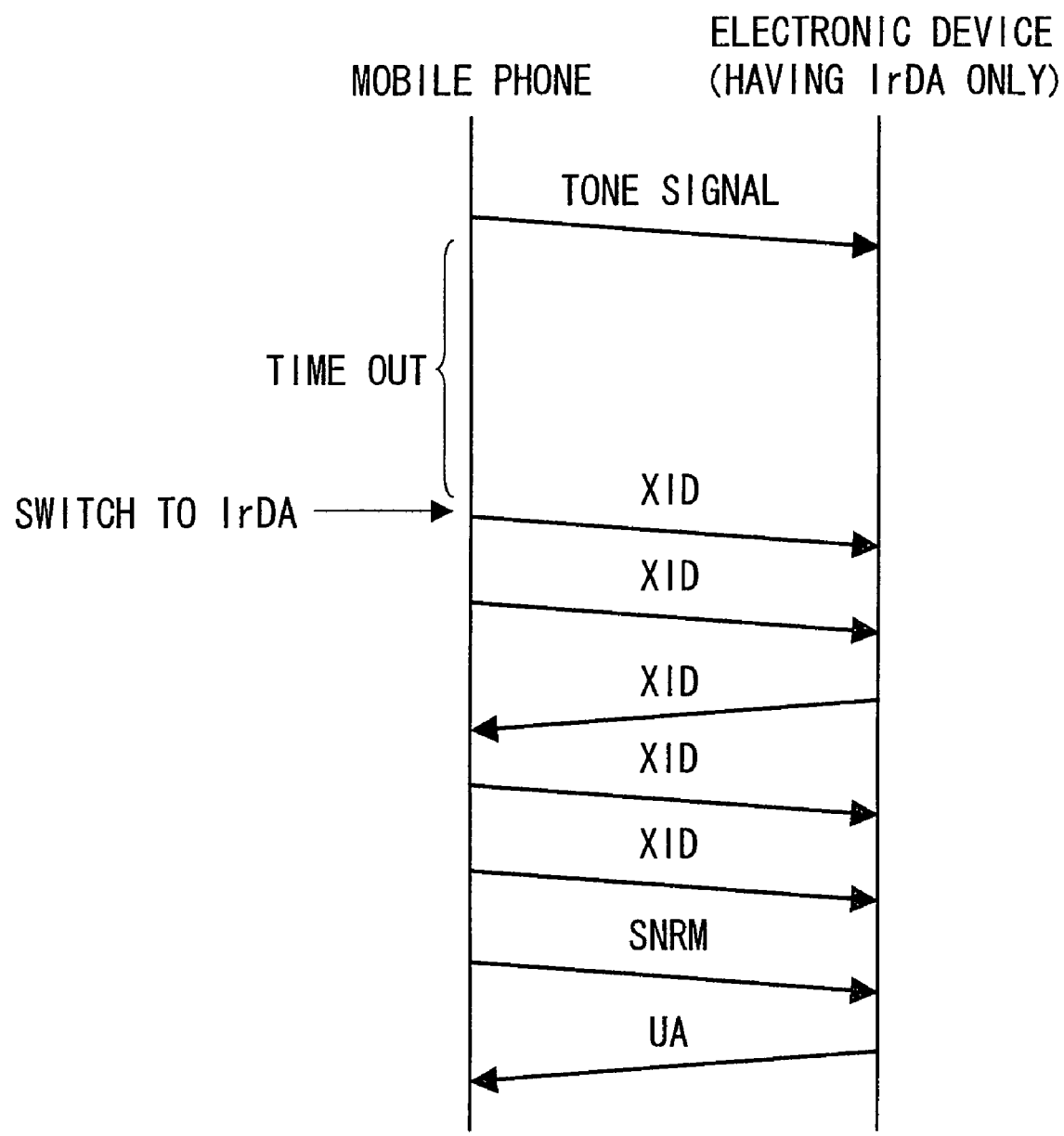
FIG. 12 is a sequence view showing a data transfer system and a data transfer method according to another embodiment of the present invention.

As shown in FIG. 12, on starting the communication, a device transmits "a tone signal", that is an identification signal, to the other end using the communication functions 1, 2, 4, 5, 7 and 8 described in First Embodiment with which the communication time can be reduced. When the device on the other end is equipped with one of the communication functions 1, 2, 4, 5, 7 and 8 described in First Embodiment, there will be response with respect to the tone signal, indicating that the communication is accepted.

However, when the device on the other end is only equipped with IrDA protocol, no response is made with respect to the tone signal. In this case, the sender waits for a response for a certain period, and then starts communication with IrDA protocol. With this arrangement, communication can be performed even when the device in the other end only includes the existing IrDA protocol.

Note that, in the present embodiment, the tone signal may be a connection packet for actually carrying out connection, or may be a signal dedicatedly used for confirming the communication mode of the receiver 2a.

The following describes a mechanism for generating the "tone signal".

As shown in FIG. 13, in comparison with the transmitter 1 above, the transmitter1a according to the present embodiment includes a CPU 11a instead of the CPU 11, a controller 13a instead of the controller 13, a transmission section 14a, serving as a wireless communication interface, instead of the transmission section 14, and a reception section 15a, serving as a wireless communication interface.

The CPU 11a carries out data transfer in response to user's input instruction through an operation section (not shown). After receiving the instruction for data transfer from the operation section, the CPU 11a transmits to the controller 13a a request for transmission of receiver detection tone signal, which is a request for transmission of tone signal for detecting as to whether the receiver is located within an area where data transfer is possible.

In response to this, a response tone signal with respect to the request for transmission of receiver detection tone signal is transmitted. Then, if the CPU 11a receives from the controller 13a a notification of reception of a response tone signal with respect to the tone signal for detecting the reception device, the CPU 11a carries out the same operation as that performed by the CPU 11. That is, the CPU 11a stores the target data into the memory 12, and transmits a request for data transfer to the controller 13a.

The reception section 15a detects a tone signal externally transmitted via an infrared communication path, and outputs a tone signal detection signal to the controller 13a.

The controller 13a includes a control section 131a, a data packet generation section 132, and an error detection correction code adding section 133, a tone signal generation section 134 serving as means for generating an identification signal, and a multiplexer 135.

The multiplexer 135 selects one of the plural terminals according to the switch signal supplied from the control section 131a, and outputs an input signal to the selected input terminal. Note that, in the present embodiment, the input terminals of the multiplexer are connected to the error detection correction code adding section 133 and the tone signal generation section 134.

The control section 131a controls the controller 13a in response to a request from the CPU 11a. As described above, the CPU 11a outputs two types of requests: the request for transmission of tone signal for receiver detection and the request for data transfer.

On receiving the request for transmission of tone signal for detecting the reception device, the control section 131a outputs a request for generation of tone signal for receiver detection to the tone signal generation section 134 as a request command for generation of a tone signal, and also outputs a switch signal to the multiplexer 135 so as to cause the multiplexer 135 to output the resulting tone signal generated by the tone signal generation section 134. On receiving the tone signal detection signal from the reception section 15a, the control section 131a transmits to the CPU 11a a notification of reception of response tone signal with respect to the tone signal for detecting the reception device.

As with the control section 131, the control section 131a reads out the transfer data from the memory 12 in response to the request for data transfer, and transmits the data to the data packet generation section 132. As well as this, the control section 131a outputs a switch signal to the multiplexer 135 so as to cause the multiplexer 135 to output the data packet generated by the data packet generation section 132. Further, when the transmission section 14 finishes transmission of all data packets corresponding to data items read out from the memory 12, the control section 131a detects this completion of transmission, and transmits to the CPU 11a a notification of completion of transmission.

On receiving the request for generation of tone signal, the tone signal generation section 134 generates a tone signal, and transmits the tone signal to the transmission section 14a via the multiplexer 135.

In addition to the functions of the transmission section 14, the transmission section 14a further has a function of transmitting tone signals.

Next, the following explains a receiver 2a according to the present embodiment with reference to FIG. 14.

As shown in the figure, in comparison with the receiver 2 above, the receiver 2a according to the present embodiment includes a controller 23a instead of the controller 23, a reception section 25a, serving as a wireless communication interface, instead of the reception section 25, and a transmission section 26a, serving as a wireless communication interface.

The reception section 25a serves to receive a packet or a tone signal externally supplied. When the packet arrives, the reception section 25a transfers the packet to the CDR 24; when the tone signal arrives, the reception section 25a outputs a tone signal detection signal, which indicates the reception of tone signal, to the controller 23a.

The controller 23a includes a control section 231a, a packet processing section 232, an error detection/correction circuit 233 and a tone signal generation section 234 serving as means for generating an identification signal.

The control section 231a carries out a predetermined operation according to either a result transmitted from the error detection/correction circuit 233 or the tone signal detection signal transmitted from the reception section 25a. More specifically, as with the control section 231 above, if it was found as a result of detection by the error detection/correction circuit 233 that there are no errors in the divided data, the control section 231a carries out writing of data into the memory 22, and informs the CPU 21 of completion of reception. On the other hand, when it was found as a result of detection by the error detection correction circuit 233 that there is an error in the divided data, the control section 231a abrogates the data, and informs the CPU 21 that the reception error occurs.

Further, on receiving the tone signal detection signal from the reception section 25a, the control section 231a transmits a request for generation of tone signal to the tone signal generation section 234 as a request command for generation of a tone signal. When the tone signal detection signal is transmitted, the control section 231a transmits a notification of reception of tone signal for detecting the reception device, which indicates reception of receiver detection tone signal, to the CPU 21 from the transmitter1a. Further, the control section 231a detects this transmission of the tone signal, which is generated from the tone signal generation section 234, from the transmission section 26a, and transmits to the CPU 21 a notification of completion of transmission of response tone signal for detecting the reception device, which indicates the transmission of a response tone signal with respect to the tone signal for detecting the reception device. On this account, the CPU 21 is informed of data transmission from the transmitter1a.

The tone signal generation section 234 generates a tone signal in response to the request for generation of tone signal from the control section 231a, and transmits the generated tone signal to the transmission section 26a.

The transmission section 26a carries out external transmission of the tone signal generated by the tone signal generation section 234.

Figure 15:
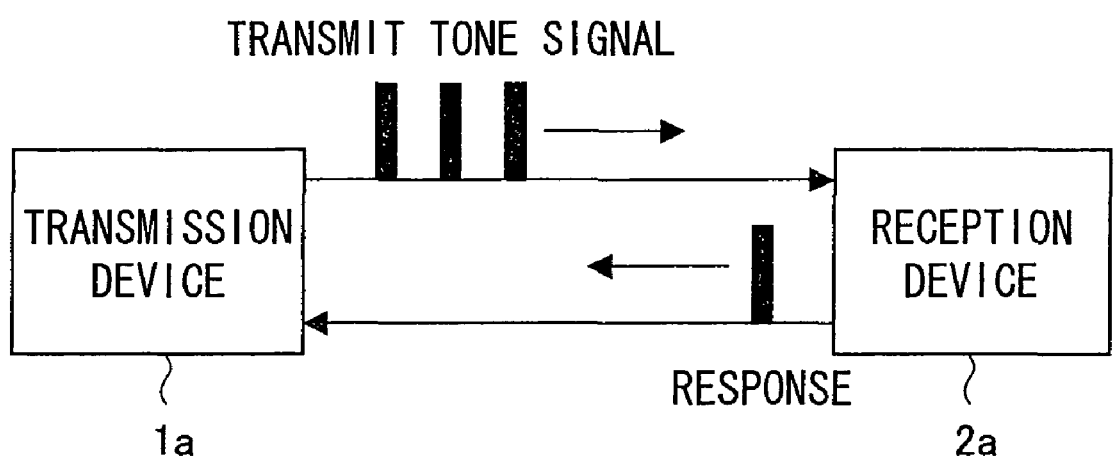
FIG. 15 is a drawing showing a pattern of tone signal exchanged between a transmitter and a reception device.
Figure 16:
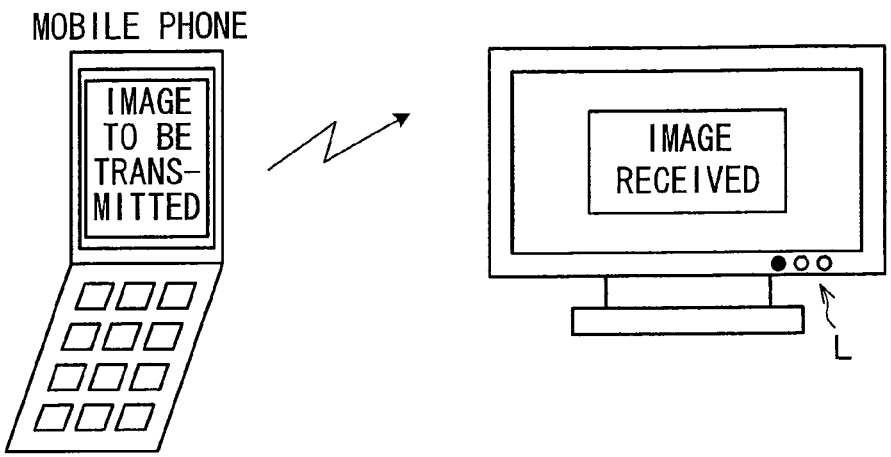
FIG. 16(a) is an explanatory view of another embodiment of data transfer system and data transfer method of the present invention, the figure showing condition of a receiver in a successful data transfer, when a display device is used as an electronic device.
FIG. 16(b) is an explanatory view of another embodiment of data transfer system and data transfer method of the present invention, the figure showing condition of a receiver in a failed data transfer, when a display device is used as an electronic device.
FIG. 16(c) is an explanatory view of another embodiment of data transfer system and data transfer method of the present invention, the figure showing a receiver which has succeeded/failed data transfer, when a display device is used as an electronic device.
Figure 16:
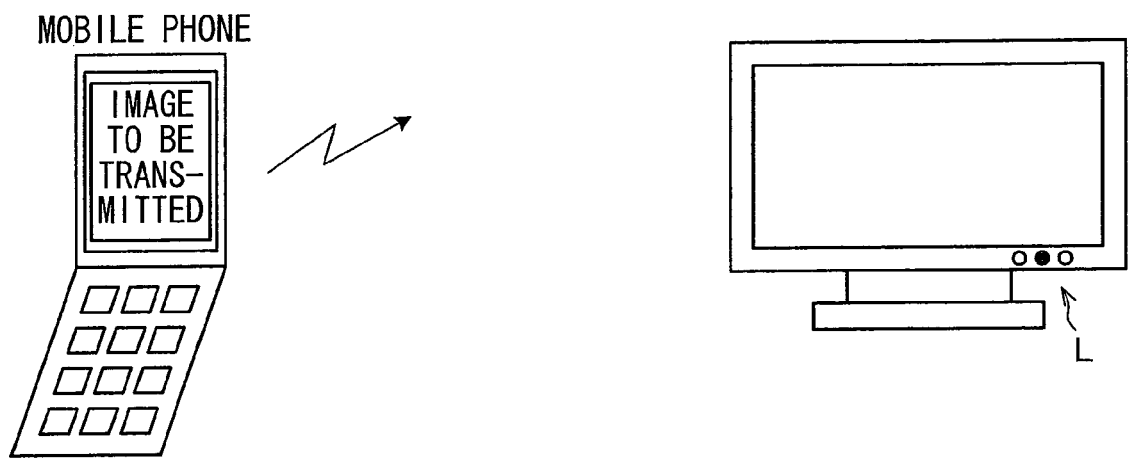
Figure 16:
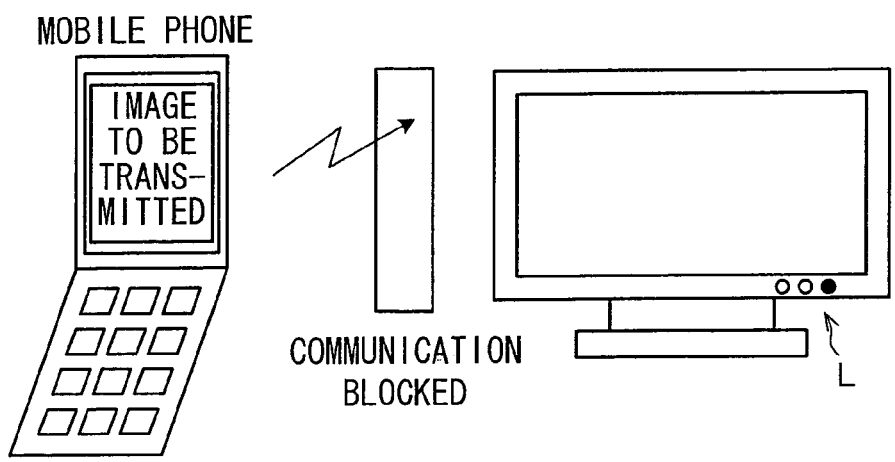
Figure 17:
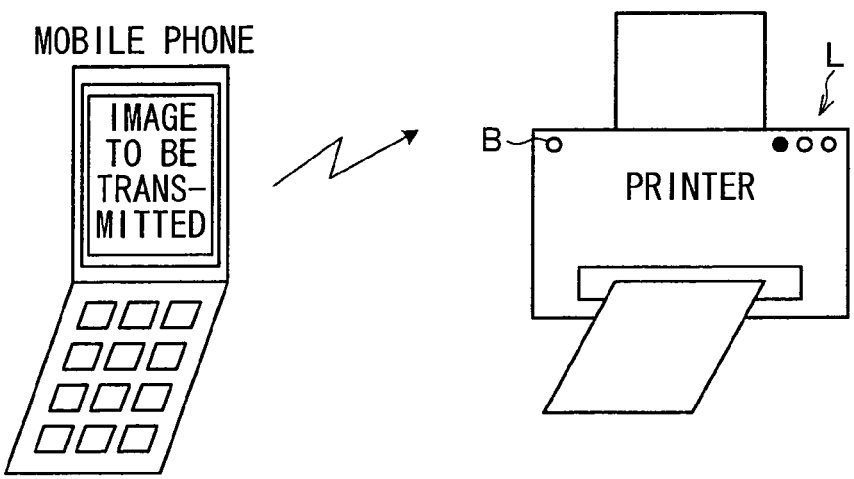
FIG. 17(a) is another explanatory view of the foregoing data transfer system and data transfer, the figure showing condition of a receiver in a successful data transfer, when a printing device is used as an electronic device.
FIG. 17(b) is another explanatory view of the foregoing data transfer system and data transfer method, the figure showing condition of a receiver in a failed data transfer, when a printing device is used as an electronic device.
FIG. 17(c) is another explanatory view of the foregoing data transfer system and data transfer method, the figure showing condition of a receiver which has failed data transfer, when a printing device is used as an electronic device.
Figure 17:
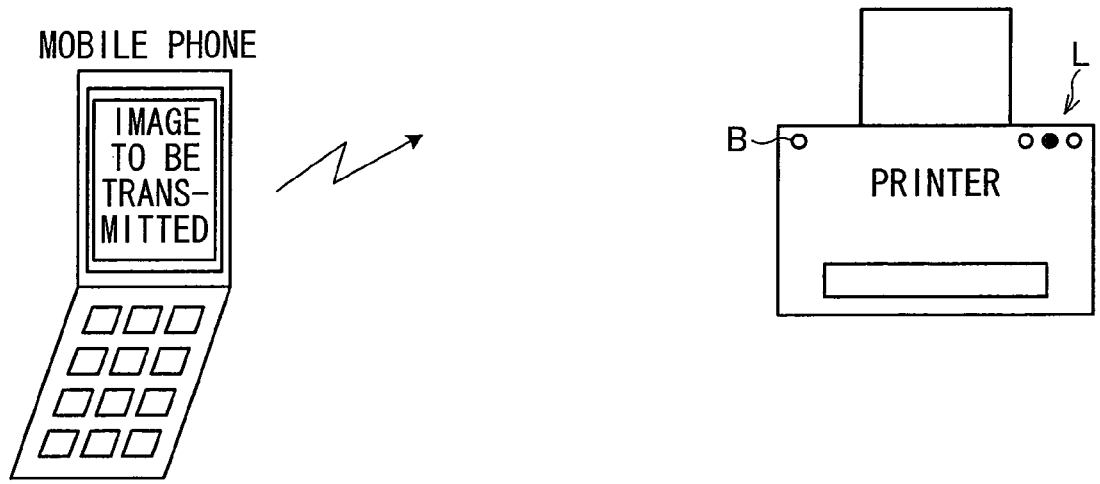
Figure 17:
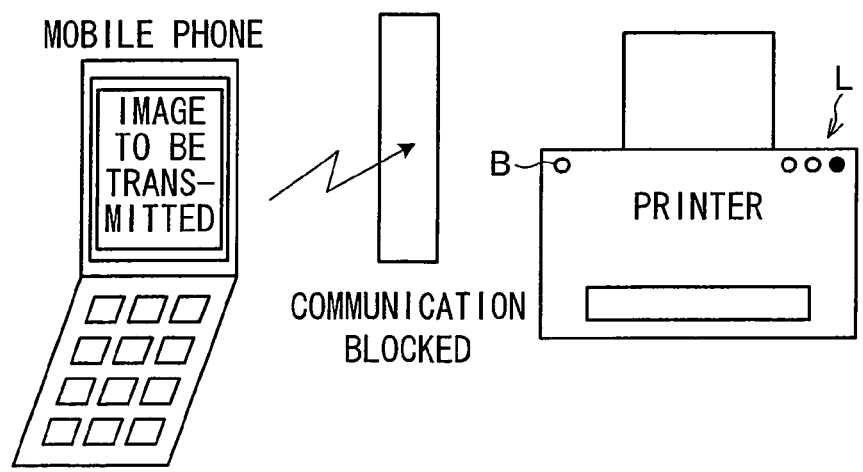
Figure 18:
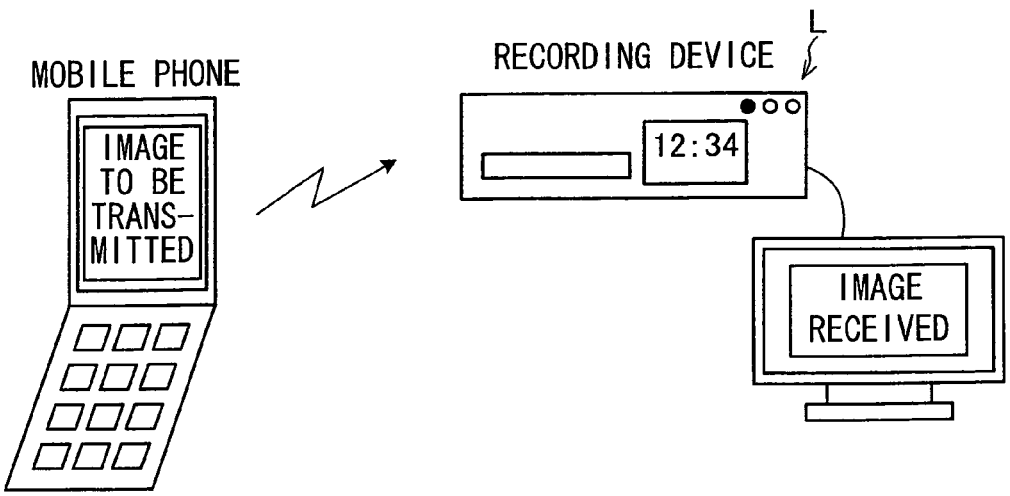
FIG. 18(a) is still another explanatory view of the foregoing data transfer system and data transfer, the figure showing condition of a receiver in a successful data transfer, when a recording device is used as an electronic device.
FIG. 18(b) is still another explanatory view of the foregoing data transfer system and data transfer method, the figure showing condition of a receiver in a failed data transfer, when a recording device is used as an electronic device.
FIG. 18(c) is still another explanatory view of the foregoing data transfer system and data transfer method, the figure showing condition of a receiver which has failed data transfer, when a recording device is used as an electronic device.
Figure 18:
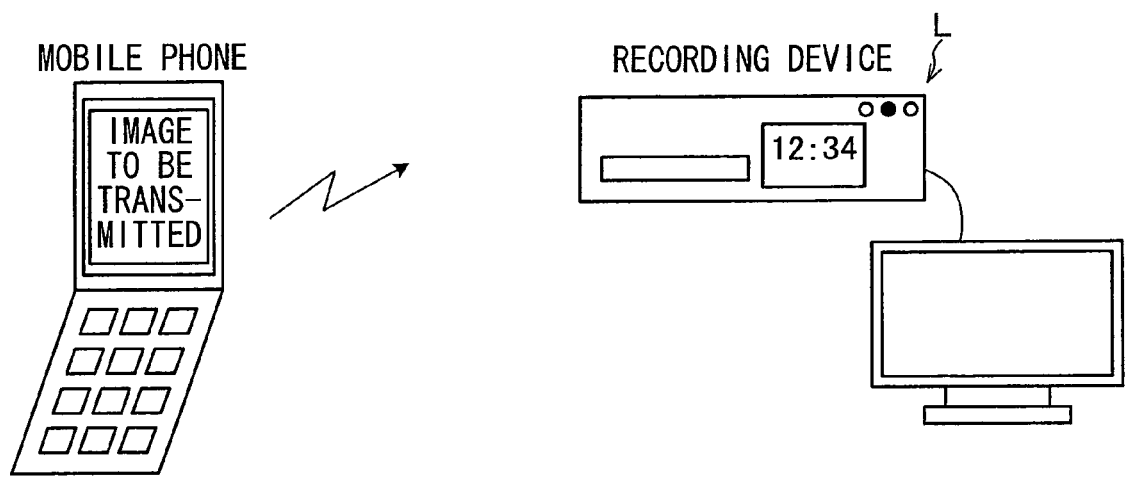
Figure 18:
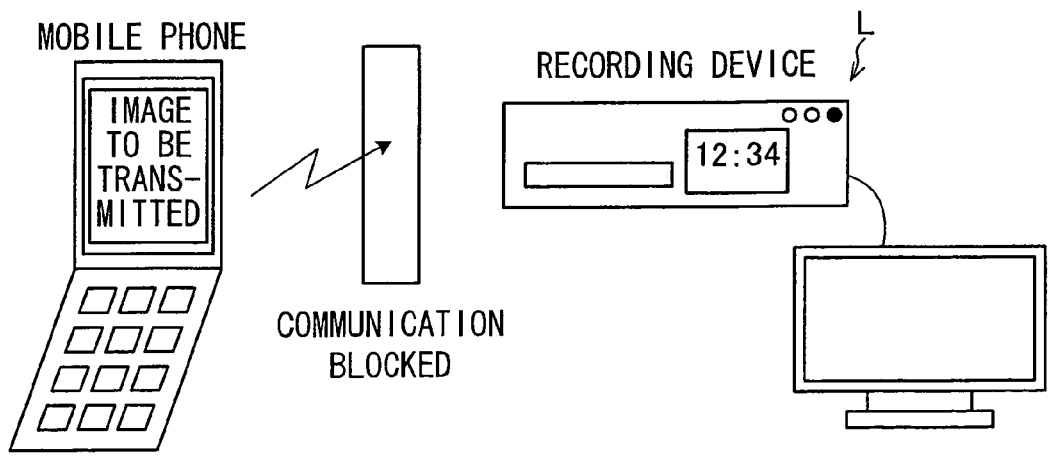
Figure 19:
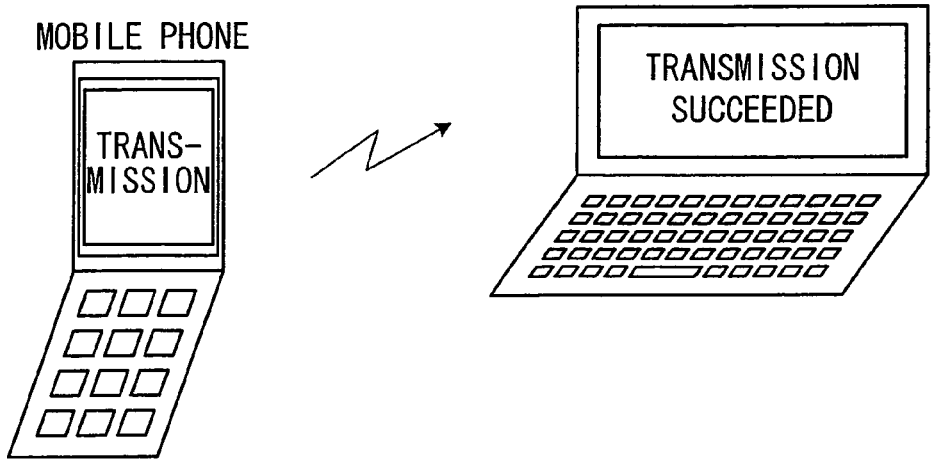
FIG. 19(a) is yet another explanatory view of the foregoing data transfer system and data transfer, the figure showing condition of a receiver in a successful data transfer, when a personal computer is used as an electronic device.
FIG. 19(b) is yet another explanatory view of the foregoing data transfer system and data transfer method, the figure showing condition of a receiver in a failed data transfer, when a personal computer is used as an electronic device.
FIG. 19(c) is yet another explanatory view of the foregoing data transfer system and data transfer method, the figure showing condition of a receiver which has failed data transfer, when a personal computer is used as an electronic device.
Figure 19:
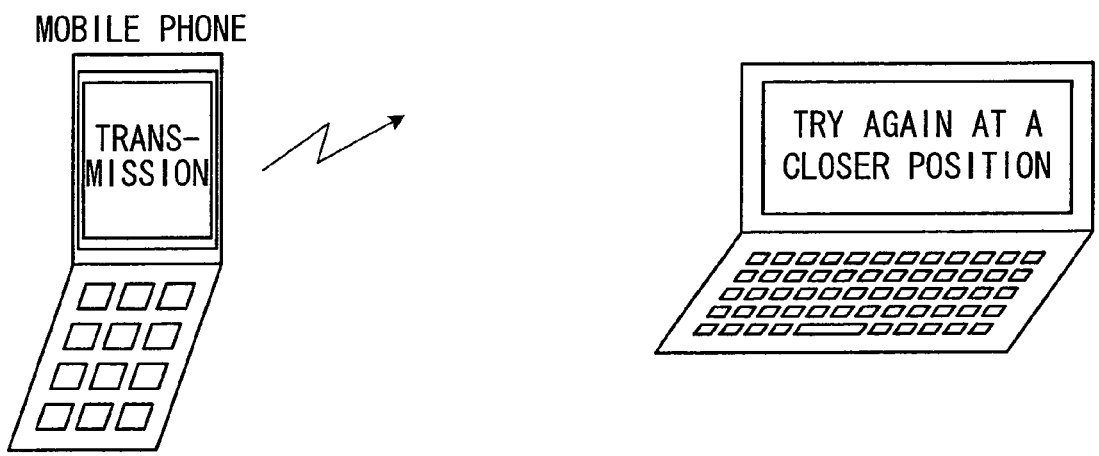
Figure 19:
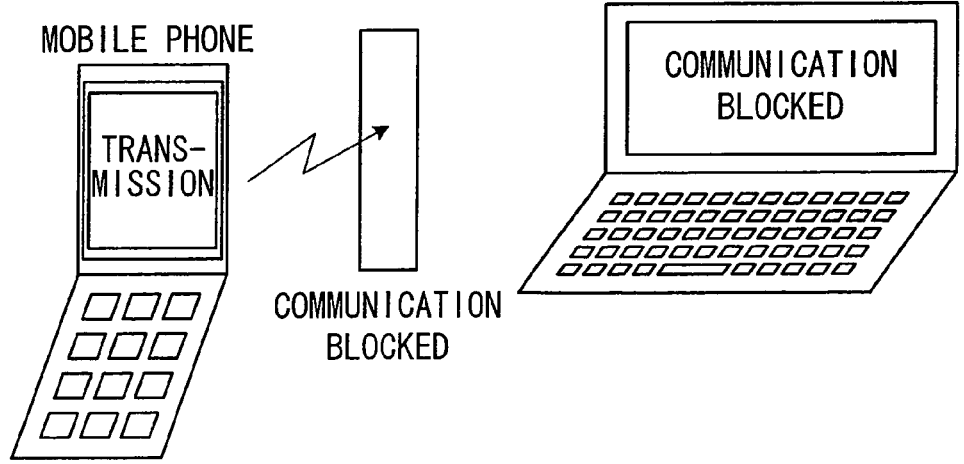
Figure 20:
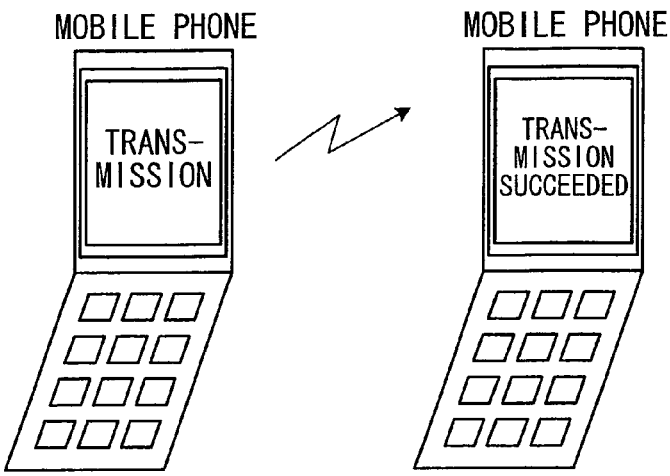
FIG. 20(a) is still another explanatory view of the foregoing data transfer system and data transfer, the figure showing condition of a receiver in a successful data transfer, when a different type of mobile device is used as an electronic device.
FIG. 20(b) is still another explanatory view of the foregoing data transfer system and data transfer method, the figure showing condition of a receiver in a failed data transfer, when a different type of mobile device is used as an electronic device.
FIG. 20(c) is still another explanatory view of the foregoing data transfer system and data transfer method, the figure showing condition of a receiver which has failed data transfer, when a different type of mobile device is used as an electronic device.
Figure 20:
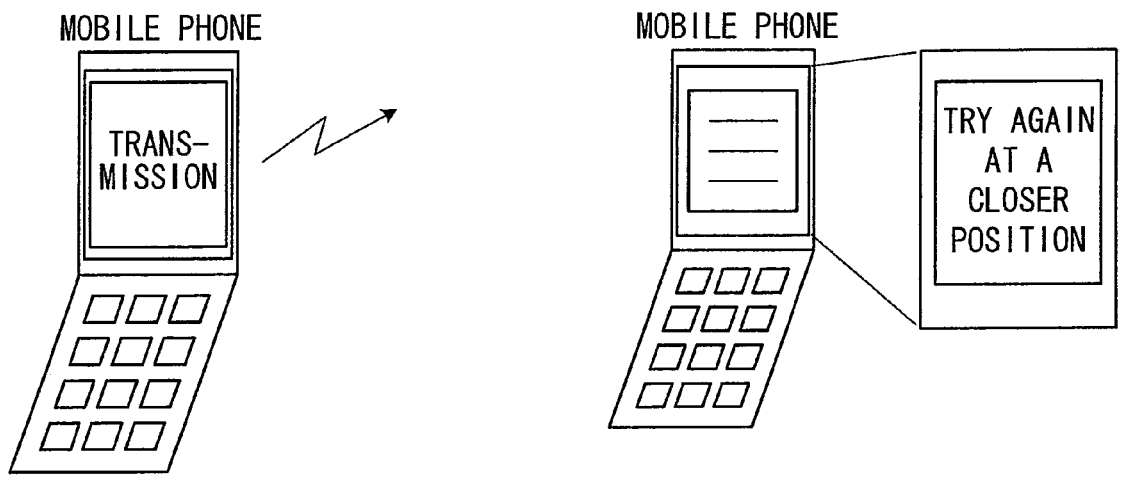
Figure 20:
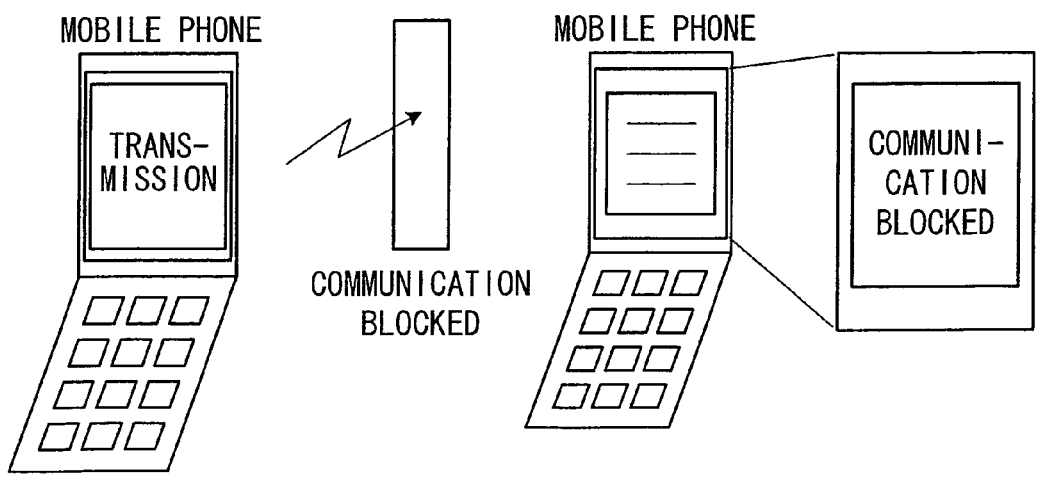

As shown in FIG. 15, in this mobile device, the transmitter1a exchanges tone signals with the receiver 2a so as to confirm, before starting data transfer, that the receiver 2a is located in an allowable area for communication. That is, the transmitter1a first transmits a tone signal to the reception section 2a, and the receiver 2a sends back a response tone signal to the transmitter1a. Here, it is both allowable to set the frequencies and periods of the tone signal generated by the tone signal generation section 134 of the transmitter1a and the tone signal generated by the tone signal generation section 234 of the reception section 2a to the same value or to different values. Further, the tone signal may be transmitted only once or plural times. When the transmission of tone signal is performed once, the time taken for detection of receiver can be further reduced, and power consumption is reduced. When the transmission is performed plural times, accuracy of detection of receiver increases.

Therefore, transmitter1a can be notified of the presence of the receiver 2a only through exchange of tone signals with the reception section 2a.

As described, in the data transfer system and the data transfer method used for the data transfer system according to the present embodiment, the mobile device and the electronic device each include storing means (memories 12 and 22) for storing the communication functions 3, 6 and 9 in which search of the other end is carried out before exchanging device information, and data retransmission is performed in case of an transmission error. In this arrangement, the controllers 13a and 23a serving as communication controlling means carry out data transfer between the mobile device and the electronic device using the communication functions 3, 6 and 9.

More specifically, the device on the sending end first tries to perform communication with one of the communication functions 1, 2, 4, 5, 7 and 8. However, when the device on the receiving end does not have the same communication function, the effect of reduction in communication time by the use of one of the communication functions 1, 2, 4, 5, 7 and 8 cannot be obtained.

However, in the present embodiment, the mobile phone and the electronic device are both equipped with the communication functions 3, 6 and 9. Therefore, when none of the communication functions 1, 2, 4, 5, 7 and 8 can be used, the communication is performed with the common communication functions 3, 6 and 9, that is IrDA or the like. Meanwhile, if any of the communication functions 1, 2, 4, 5, 7 and 8 is available, the communication can be performed in a shorter time.

Further, in the data transfer system and the data transfer method used for the data transfer system according to the present embodiment, the controller 13a of each mobile device transmits a request for communication using one of the communication functions 1, 2, 4, 5, 7 and 8 at the beginning of data transfer. When no reply is transmitted to this request, the controller 13a concludes that the device on the receiving end does not have the same communication function among the communication functions 1, 2, 4, 5, 7 and 8, and starts communication using the communication functions 3, 6 and 9.

More specifically, the device on the sending end first starts communication using one of the communication functions 1, 2, 4, 5, 7 and 8, and if no response is transmitted from the other end, the device on the sending end starts communication using other common communication function, such as the IrDA protocol.

With this function, it is possible to reduce communication time when the device in the other end has the same communication function among the communication functions 1, 2, 4, 5, 7 and 8, and when the device in the other end does not have the same communication function, communication is still possible by using the communication functions 3, 6 and 9 such as IrDA protocol. Therefore, communication can be established even when the device in the other end only has the communication functions 3, 6 and 9, such as IrDA protocol.

Further, in the data transfer system and the data transfer method used for the data transfer system according to the present embodiment, the controllers 13a and 23a respectively provided in the mobile device and the electronic device include tone signal generation sections 134 and 234, respectively. Also, the mobile device includes a CPU 11a as determining means for carrying out judgment as to whether the device in the other end has the same communication function among the communication functions 1 through 9. The CPU 11a transmits a tone signal generated by the tone signal generation section 134 to the other end as a request command for performing communication using the communication functions 1, 2, 4, 5, 7 and 8. Then, when a tone signal is sent back from the other end, the CPU 11a determines that the device in the other end has the same communication function among the communication functions 1, 2, 4, 5, 7 and 8.

In this arrangement, the sender becomes aware of the presence of receiver and that the receiver has the same communication function among the communication functions 1, 2, 4, 5, 7 and 8 only by exchange of tone signals with the reception device.

Further, in the data transfer system and the data transfer method used for the data transfer system according to the present embodiment, the communication functions 3, 6 and 9 is a communication function defined by IrDA (Infrared Data Association).

On this account, it is possible to reduce probability of communication failure when the angle or the distance between the communication devices exceeds a certain value in a device employing a general IrDA standard for data transfer using infrared light.

Further, if the communication functions 3, 6 and 9 are IrDA protocols, it is not necessary to change the physical layer when performing the communication functions 1, 2, 4, 5, 7 and 8, requiring only software modification. Therefore, the communication functions 1, 2, 4, 5, 7 and 8 can be easily established based on IrDA protocol.

To select one of the communication functions 1 through 9, the connection request is first made with a protocol having one of the communication functions 1, 2, 4, 5, 7 and 8, and if no response is sent, the request is carried out again with the common communication functions 3, 6 and 9. In this way, a suitable communication function can be selected according to the connection condition. The communication function may also be selected, for example, according to the type of application, or on user's demand.

When the communication function is selected according to the type of application, it may be arranged so that one of the communication functions 1, 3, 4, 6, 7 and 9 is used for an important item, such as an address list, e-mail etc., and transmission of a still picture is performed with the communication functions 2, 5 and 8. This is based on the order of communication speed: the communication functions 2, 5 and 8>the communication functions 1, 4 and 7>the communication functions 3, 6 and 9. The exactly inverse order is applied for reliability. Based on this, the communication mode can be selected according to the type of application.

Further, the communication mode may be selected according to the user. For example, for a distant user for whom data is always required to be retransmitted to ensure secure data transmission, a transmission function having a retransmission function is selected. On the other hand, a communication function with no retransmission function may be selected for a user relatively close.

Fifth Embodiment

The following will explain still another embodiment of the present invention with reference to FIGS. 16 through 20. Note that, the structure of the present invention is identical to those of First to Fourth Embodiments except for the differences explained below. For ease of explanation, materials having the equivalent functions as those shown in the drawings pertaining to First through Forth Embodiments above will be given the same reference symbols, and explanation thereof will be omitted here.

When a mobile device, such as a mobile phone, transmits data to an electronic device, the device on the receiving end examines data size and FCS so as to check integrity of data.

Here, in the present embodiment, the user is informed of this confirmation of completion of proper data transmission. This is performed by recording the received data, or, if a display section is provided in the reception device, displaying a message informing the completion of proper data transfer in the display section, or lighting an indicator lamp or the like when the data is properly received. FIGS. 16(a), 17(a), 18(a), 19(a) and 20(a) show the examples of these cases. With this arrangement, the user can confirm whether the data transfer is properly completed.

Meanwhile, when an error in data transfer is detected, the user of the receiver is notified of the error, for example, by a display message saying that the reception of data has failed, or a lighting indicator or the like which turns on when the reception has failed. When the reception is properly completed, the user subsequently carries out the next process (recording of data or transmission of different data); on the other hand, when an error occurs in the reception, the user tries communication again. For example, when using a lighting indicator, the completion and failure of data transfer are indicated by different colors.

Further, when an error occurs in data transfer, the distribution of error is detected subsequently. When an error is detected even though transmission is completed for all frames, an excessive distance of communication range or influence of external light is suggested as a cause of failure in the form of a display message in the display section or by a lighting indicator, as shown in FIGS. 16(b), 17(b), 18(b), 19(b), and 20(b). Further, when the transmission is cut off within a frame (when the size of the received data is smaller than the original data size), some kind of interference or change in orientation of device is suggested as a displayed message in the display section or by a lighting indicator, as shown in FIGS. 16(c), 17(c), 18(c), 19(c), and 20(c). With this function, the user is informed of possible causes of transmission failure, thereby suppressing repeated failures.

Further, when data transfer is properly completed, the received data may be recorded automatically, or may be recorded through user's instruction via a touch panel or a remote controller after the user confirms that the transfer is properly completed with a visible message (e.g., when the receiver is provided with a display section, a preview of the transmitted image or a display message saying that the transfer is properly completed, or a lighting indicator which turns on when the data is properly received). With this manual recording function, recording of wrong data is avoided even when an error occurs in the data transmission.

As described, in the data transfer system and the data transfer method used for the data transfer system according to the present embodiment, the controller 23a, which serves as communication controlling means of the electronic device, includes an error detection correction circuit 233 for detecting error in data transfer. With this error detection correction circuit 233, when the electronic device carries out data transfer using one of the communication functions 1 through 9, if the data transfer is properly completed, the electronic device at least carries out recording of the received data or display of a message saying that the data transfer is properly done. The electronic device in this system further includes a CPU 21 as display controlling means for displaying a message saying that the transfer is not properly completed when the data transfer has failed due to some kind of defect.

More specifically, when the receiver properly receives all data, the electronic device at least carries out recording of the received data or display of a message saying that the data transfer is properly done. On the other hand, when the data transfer has failed due to some kind of error, the electronic device displays a message saying that the transfer is not properly completed.

On this account, the user is immediately notified whether the data transfer is completed or it has been cut off by an error. That is, the user can immediately try transmission again when the transmission failed.

Further, in the data transfer system and the data transfer method used for the data transfer system according to the present embodiment, the CPU 21 serves also as communication interruption reason detecting means for checking the type of error when an error is detected during data communication using one of the communication functions 1 through 9. With this function, the detected error is classified into two cases: (i) transmission of all data is completed but an error is found in a single or a plurality of data items, or (ii) the data transfer is cut off in the halfway through of transmission of a series of packets. The CPU 21 displays a different message for each of those errors.

More specifically, when an error is found in the data received in the reception device, the disconnection reason detecting means determines, when an error is detected during data communication using one of the first through fourth communication protocols, whether the error is found in a single or a plurality of data items even though all the data items are properly transmitted, or the data transfer is cut off within a packet. Then, the respective errors are informed as separate messages.

With this arrangement, when an error is detected even though transmission is completed for all frames, an excessive distance of communication range or influence of external light, such as fluorescent lamp, sunlight, an incandescent lamp, is suggested as a cause of frequent failure in the form of a display message in the display section, and the user is told to bring the device closer to the other device. Meanwhile, when the transmission is cut off within a frame, change in orientation of device is suggested as a display message in the display section. This function allows the user to carry out transmission again in more adequate way, thereby suppressing repeated failures.

Further, in the data transfer system and the data transfer method used for the data transfer system according to the present embodiment, when it is found, as a result of detection by the error detection correction circuit 233, that all data items are properly transmitted using one of the communication functions 1 through 9, the CPU 21, serving as display controlling means, displays a message saying that the transfer is properly completed, and carries out recording of data in response to an externally-inputted command.

This method offers a function of displaying a message saying that the all data items are properly transmitted when the all data is properly transmitted to the reception device; and a function of carrying out recording of the data in response to pressing operation of an operation button or the like after confirming that the reception is properly completed. Alternatively, a remote controller may be used for the external input operation instead of the operation button.

This function allows the user to carry out recording of the transmitted data after he/she confirms that the target data is properly transmitted.

Sixth Embodiment

The following will explain yet another embodiment of the present invention with reference to FIGS. 2 through 7, and FIG. 13. Note that, the structure of the present invention is identical to those of First through Fifth Embodiments except for the differences explained below. For ease of explanation, materials having the equivalent functions as those shown in the drawings pertaining to First through Fifth Embodiments above will be given the same reference symbols, and explanation thereof will be omitted here.

The present embodiment relates to a processing method of image file in a mobile device.

For example, as shown in FIGS. 2 through 6, a general mobile device, such as a mobile phone, has a small display screen P. Therefore, conventionally, when an image file stored in a mobile phone or the like is linked to an image file of an electronic device, such as a display device, a printing device, a recording device, a personal computer, or other mobile devices, the transmission image file is reduced before it is displayed in the small display screen P. Because of this, the data transfer needed some time to be completed.

In this view, in the present embodiment, a small-sized image file for displaying thumbnail images is stored in advance, and this small image file is used when an image is viewed in a mobile phone. With this function of automatically producing a small-sized file, it takes a little longer when the images are viewed for the first time, but they will immediately appear from the second time.

Further, in this arrangement, when the image file is transmitted to an electronic device, it is enlarged and become superior in picture quality when displayed or recorded in the electronic device.

That is, due to its power and size, a mobile device cannot contain a high-functional CPU, thus taking a while to convert a large-sized file to a small-sized file. However, in terms of picture quality, it is preferable that a large image file is displayed or recorded in an electronic device.

Therefore, as in the present embodiment, a small-sized image file for displaying thumbnail images is stored in advance. With, this arrangement, when the user intends to transmit images stored in the mobile phone to the other devices, the user easily selects an arbitrary image from the thumbnail images.

For this function, as shown in FIGS. 2 through 6, the mobile device according to the present embodiment includes a display screen P serving as a display section for displaying images. Further, as shown in FIGS. 7 through 13, the mobile device further includes a memory 12 and CPU 11/11a. The memory 12 serves as storage means for storing image files for transmission, and image files for display. The image files for display respectively correspond to image files for transmission but are smaller in capacity than the image files for transmission. The CPU 11/11a serves as file transfer/display controlling means which, when transmitting the stored images via wireless communication, transmits the image files for transmission, and when displaying the images, causes the display screen P to display the image files for display.

Further, the CPU 11/11a also serves as storage/generation means for generating in advance the image files for display based on the image files for transmission.

Further, when the electronic device is a display device, the CPU11/11a also serves as size changing means for changing size of image file according to the display capacity of the display device, before transmitting the image file to the display device. With this function, even when transmission takes very long to send image files larger than the display capacity of the display device, it is possible to reduce communication error.

Further, when the electronic device is a printing device, the CPU11/11a also serves as size changing means for changing size of an image file according to the printing capacity of the printing device, before transmitting the image file to the printing device. With this function, even when transmission takes very long when sending image files larger than the display capacity of the display device, it is possible to reduce communication error.

Further, the CPU11/11a also serves as resizing/processing means for resizing or processing the data when the data is recorded.

With this CPU11/11a serving as resizing/processing means, the mobile device becomes capable of resizing or processing the data before storing the data into the memory 12. On this account, the data is reduced before transmitted to the electronic device, thus reducing transfer time.

Each block of the transmitter 1/1a and of the receiver 2/2a may be constituted of a hardware logic, or may be realized by software by using an operation device such as a CPU, as detailed below.

Specifically, the transmitter 1/1a or the receiver 2/2a includes, for example, a CPU (Central Processing Unit) for enforcing commands of a control program for activating the various functions, a ROM (Read Only Memory) for storing the program; a RAM (Random Access Memory) for developing the program; and a storage device (storage medium) such as a memory for storing the program and the various data items. Further, when the functions of the transmitter 1/1a or the receiver 2/2a are realized by software, the program code (execute form program, intermediate code program, source program) of the data transfer program is stored in a program medium readable by a computer, which medium is mounted to the transmitter 1/1a or the receiver 2/2a. In this way, the objective of the present invention may also be achieved by causing the computer (or CPU, MPU) to read out the program code from the storage medium, and enforce the program code to activate the functions.

The storage medium may be tape based, such as a magnetic tape or cassette tape; disc based, such as a magnetic disc like a Floppy Disc®, hard disk or an optical disc such as CD/MO/MD/DVD/CD-R; card based, such as an IC card (including a memory card), an optical card; or a semiconductor memory, such as a mask ROM, EPROM, EEPROM, and a flash ROM.

Further, the transmitter 1/1a or the receiver 2/2a may be constituted to be connectable to a communication network, so as to allow provision of the program code via a communication network. The communication network is not particularly limited, and it may be: the Internet, Intranet, Extranet, LAN, ISDN, VAN, CATV communication network, virtual private network, telecommunication network, mobile body communication network, satellite communication network etc. Further, a transmission medium for constituting the communication network is not particularly limited, and it may be wired based, such as IEEE1394, USB, power-line carrier, cable TV line, telephone line, ADSL line, or radio based, such as infrared medium such as IrDA, remote control, Bluetooth, 802.11 radio, HDR, mobile phone network, satellite communication line, ground wave digital network. Note that, the present invention may be realized in the form of a carrier wave, or a data signal line that realize the program code by electronic transmission.

As described, the data transfer program according to the present embodiment is a computer program for realizing the various functions of the data transfer system as computer operation. That is, the data transfer system is realized by causing the computer to enforce the functions of the data transfer system.

Further, the storage medium of the present invention is a computer readable storage medium storing the data transfer program for causing the computer to enforce the foregoing means of the data transfer system. That is, the data transfer system can be performed as computer operation by causing a computer to read out the data transfer program from the storage medium.

Seventh Embodiment

The following will explain still another embodiment of the present invention with reference to FIGS. 21 through 26. Note that, the structure of the present invention is identical to those of First through Sixth Embodiments except for the differences explained below. For ease of explanation, materials having the equivalent functions as those shown in the drawings pertaining to First through Sixth Embodiments above will be given the same reference symbols, and explanation thereof will be omitted here.

In the present embodiment, a recording device is used as the electronic device. The following describes processing of image files in the recording device.

Figure 21:
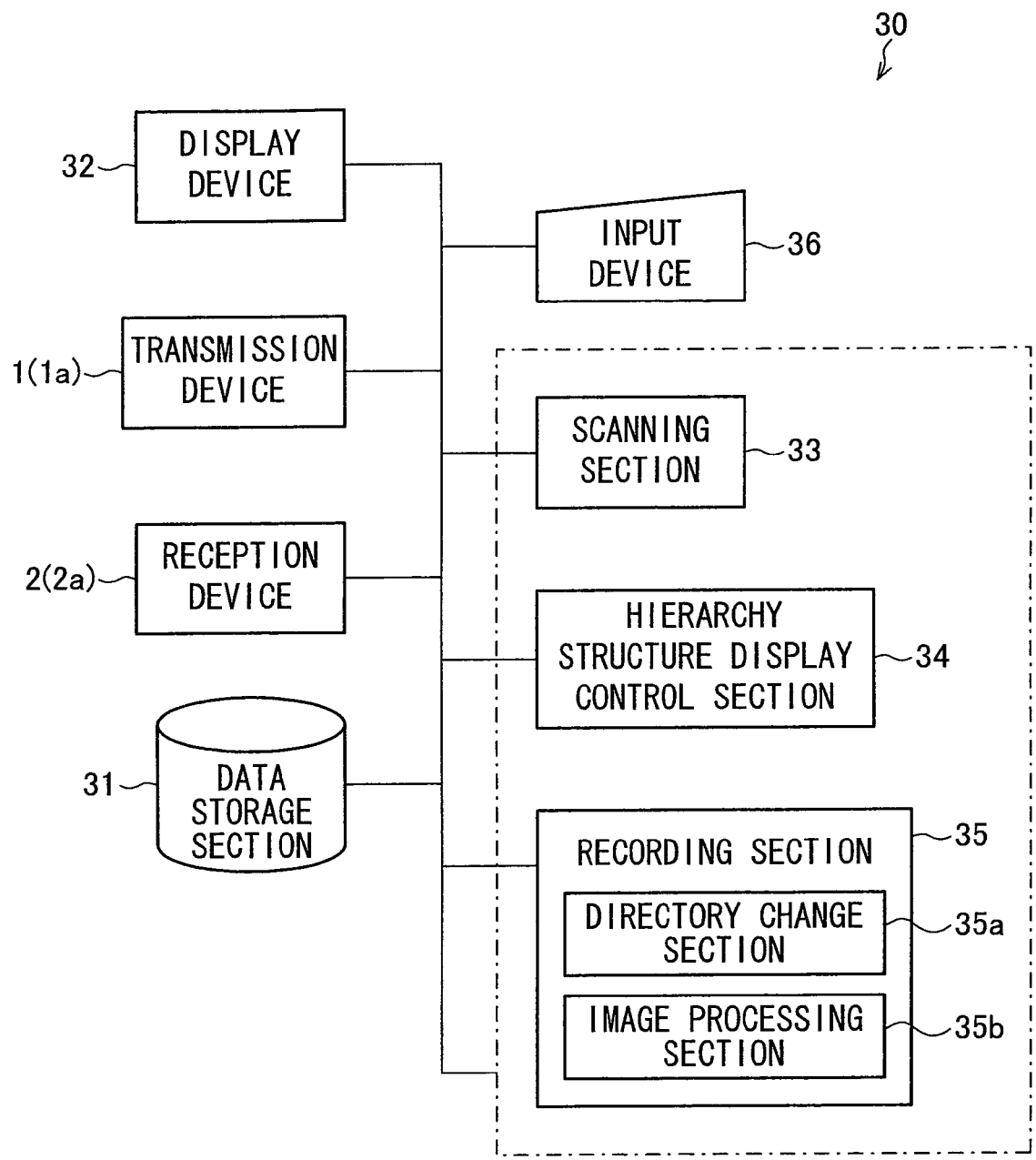
FIG. 21 is a block diagram illustrating a structure of a recording device according to yet another embodiment of the present invention.

As shown in FIG. 21, a recording device 30 serving as the electronic device of the present embodiment includes a data storage section 31 serving as a storage medium for storing data; a display section 32 serving as display means for displaying data stored in the data storage section 31; a reading section 33 for reading information data and the hierarchy structure of the data from the data storage section 31; and a hierarchy structure display control section 34 serving as hierarchy structure display control means for associating the information items with the hierarchy structure of the data when displaying them in the display section 32; and a recording section 35 serving as recording means for recording the data received from the mobile device as a new directory of the hierarchy structure. The reading section 33, the hierarchy structure display control section 34 and the recording section 35 are carried out by the CPU. The CPU also has a function of decoding and enforcing instruction inputted from an input device 36, as well as a function as operation inputting means for decoding/enforcing an operation command transmitted from a mobile phone 40.

The data storage section 31 is constituted of a data storage medium, such as a DVD (Digital Video Disk), a CD (Compact Disk), a HDD (Hard Disk Drive: Hard Disk), which is driven by a driving device (not shown) upon reading/writing of information.

Further, the recording section 35 includes a directory change section 35a serving as directory changing means for adding/modifying/deleting a directory of the hierarchy structure of the data; and an image processing section 35b serving as image processing means for processing image data. The image processing section 35b carries out various kinds of image processing, including rotation and resizing. This function may be realized either by software or by a hardware logic.

The recording device 30 of the present embodiment further includes an input device 36 serving as operation inputting means for causing the hierarchy structure display control section 34 and the recording section 35 or the directory change section 35a to carry out their operations.

The following describes operation of the foregoing data transfer system in the recording device 30.

In the recording device 30, the reading section 33 reads out target data and the hierarchy structure thereof stored in the data storage section 31, and the data and the hierarchy structure are then associated with each other so that the data items are classified based on the hierarchy as they appear in the display section 32.

Figure 22:
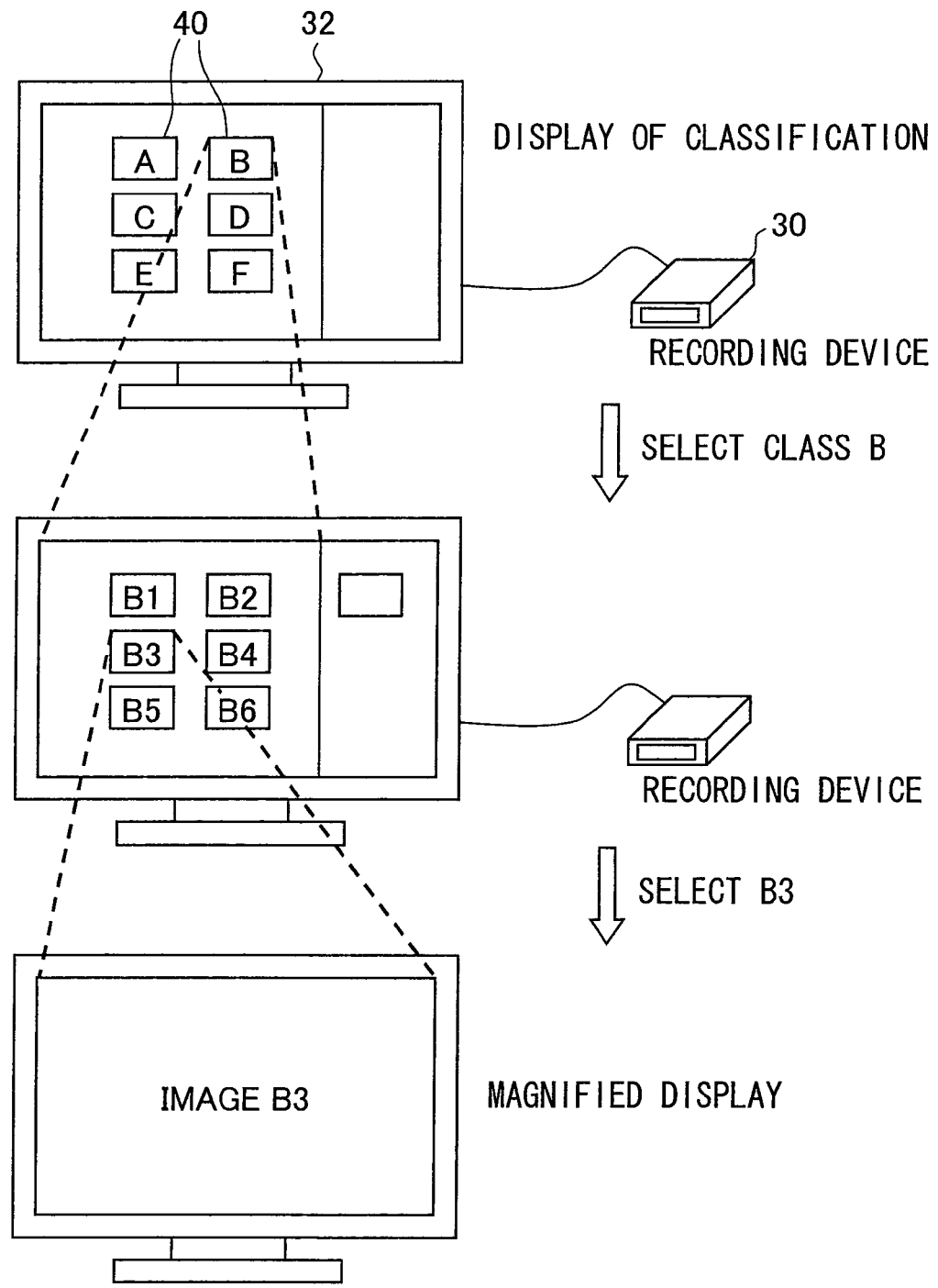
FIG. 22 is an explanatory view illustrating a display device of a recording device in the data transfer system, the figure showing a display state where information data and a data hierarchy structure are associated with each other.

More specifically, as shown in the upper view of FIG. 22, the display device 32 first displays folders A, B, . . . F, which are directories of the first layer of the hierarchy structure.

Then, if the user wishes to display an image B3, that is one of the information data items stored in the folder B, the user selects the folder B by pressing the enter key of the input device 36. As a result, as shown in the middle view of FIG. 22, the display section 32 secondly displays folders B1, B2, B3, . . . B6, which are directories of the second layer of the hierarchy structure. Further, as shown in the bottom view of FIG. 22, when the user selects the image B3, the image B3 is enlarged in the display.

Figure 23:
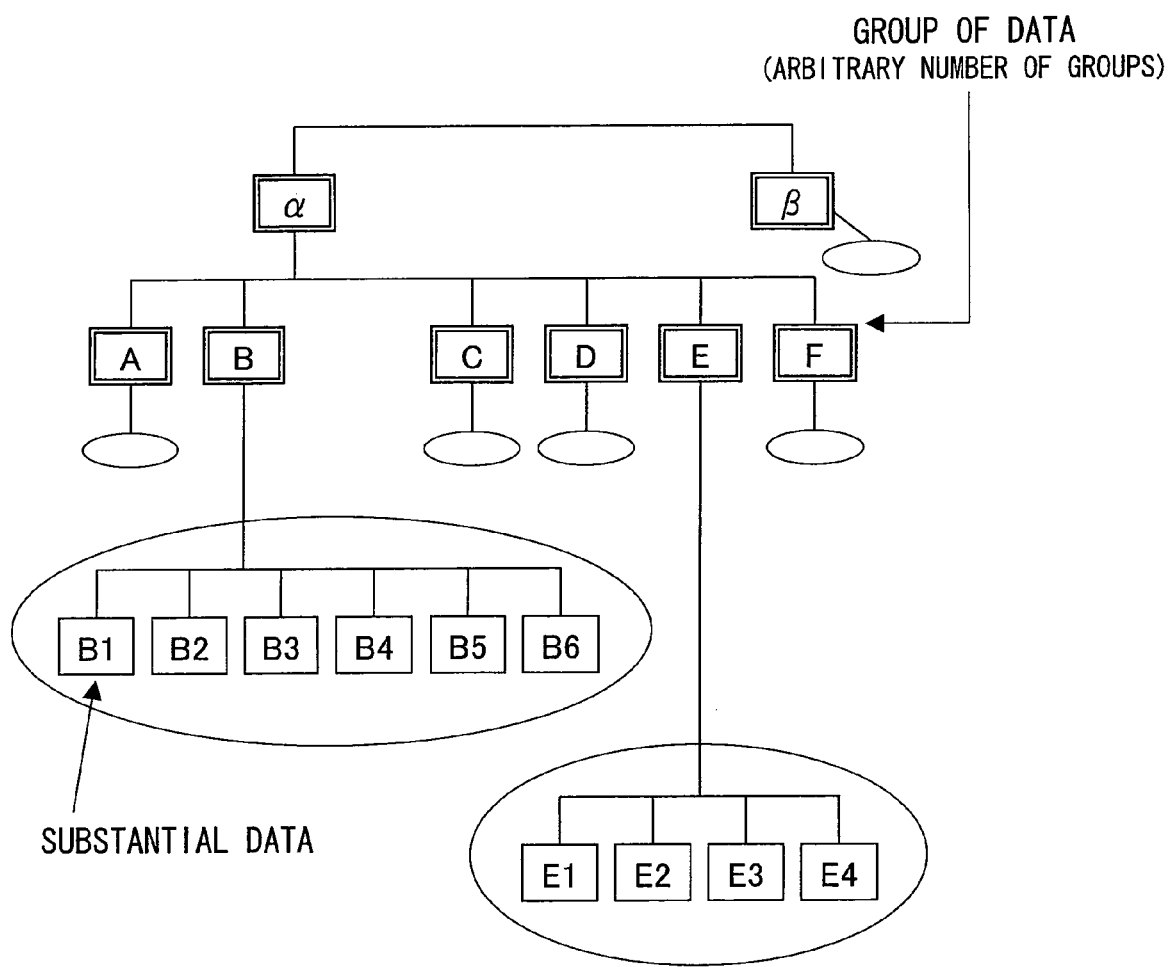
FIG. 23 is an explanatory view showing the data hierarchy structure.

More specifically, in the present embodiment, the information data items, such as the images B1, B2, B3, . . . B6, are stored in the hierarchy structure of the data storage section 31, as shown in FIG. 23. In the figure, a three-layered hierarchy is shown, but the structure is not limited to this, it may be a single-layered hierarchy, for example.

Figure 24:
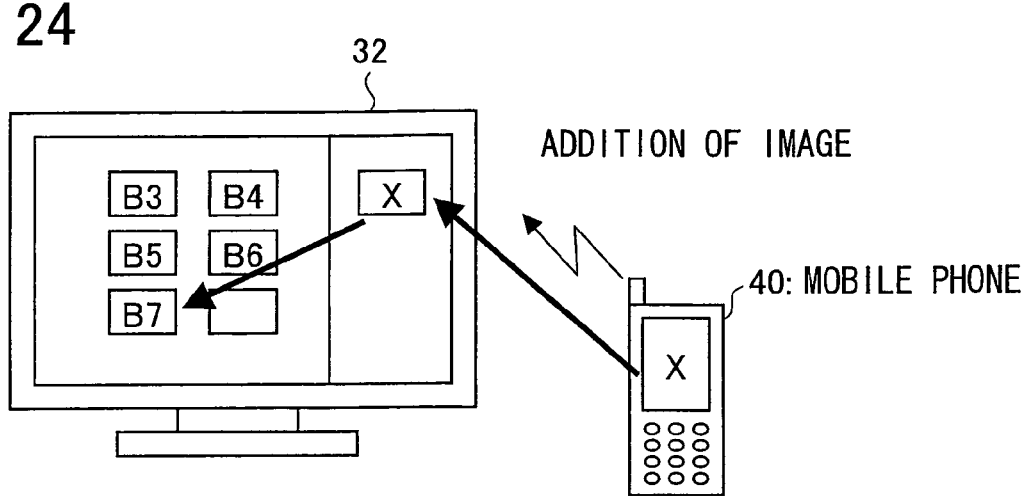
FIG. 24 is an explanatory view illustrating a state where an image transmitted from a mobile phone as information data is added to the hierarchy structure.

As shown in FIG. 24, in the foregoing hierarchy structure, when image data X is transmitted from the mobile device, that is the mobile phone 40, this new image data X can be added to the second layer as image data B7 by dragging the icon of the image data X into the second layer.

Figure 25:
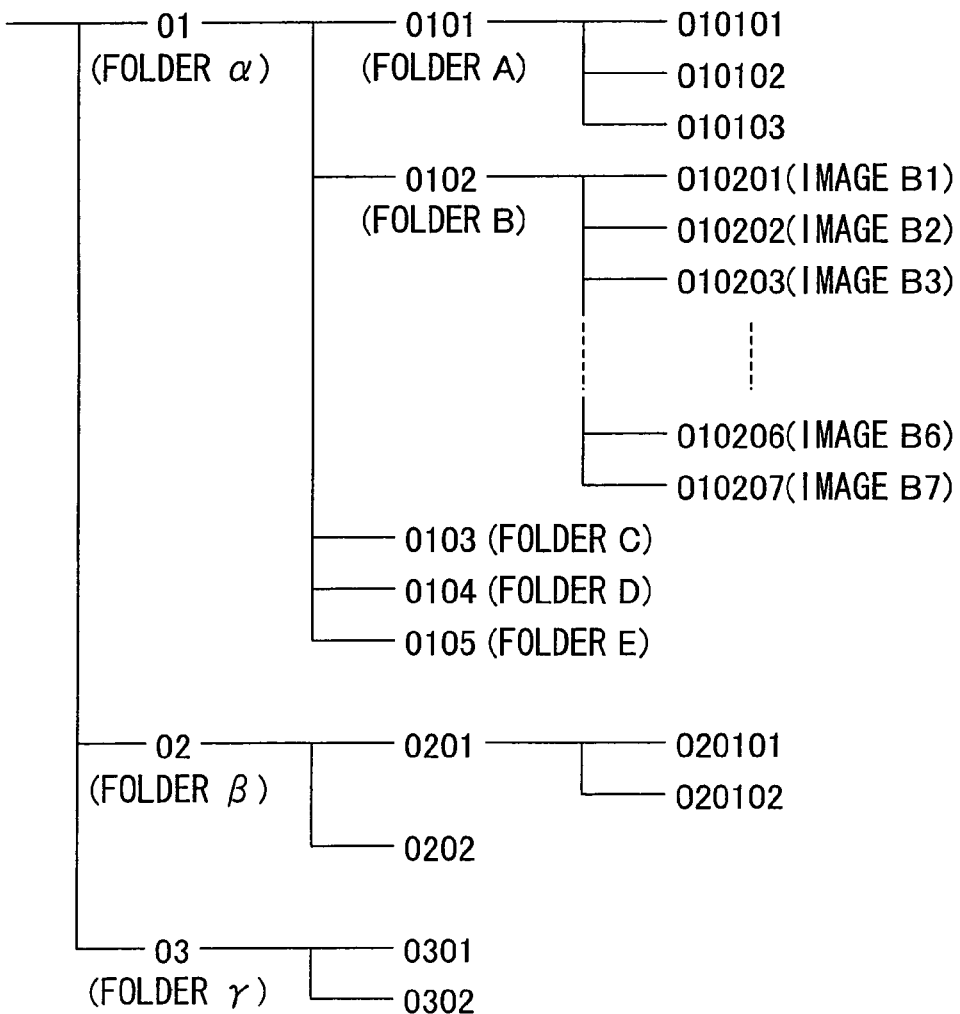
FIG. 25 is an explanatory view illustrating internal operation in the data hierarchy structure.

FIG. 25 shows internal operation for displaying the hierarchy structure, performed by the hierarchy structure display control section 34 and the recording section 35. As shown in the figure, digital values "01, 02, 03, . . . " are used for the first layer, "0101, 0102, 0103" for the second layer", and "010101, 010102, 010103, . . . " for the third layer. This allows easy classification, and easy association with the folder name. Further, when the image B7 is added, the addition becomes much easier if the image is stored with the digital value "010107", which corresponds to the image name.

Note that, in the present embodiment, the mobile device, that is the mobile phone 40, is capable of causing the recording device 30 to carry out at least one of the following operations. That are, reading out information data and a hierarchy structure of the data from the data storage section 31, associating the information data with the hierarchy structure of the data when displaying them in the display section 32, recording the data received from the mobile phone 40 as a new directory of the hierarchy structure, and adding/modifying/deleting a directory of the hierarchy structure of the data. In this case, the operation command transmitting means of the mobile phone 40, that is the transmitter 1/1a, transmits a corresponding operation command to the receiver 2/2a of the recording device 30. As a result, the directory change section 35 serving also as operation command directory changing means enables the foregoing operations.

In the present embodiment, as well as a wired communication interface, a wireless communication interface, that is a radio communication interface, may be used as the communication interface between the recording device 30 and the display section 32.

Figure 26:
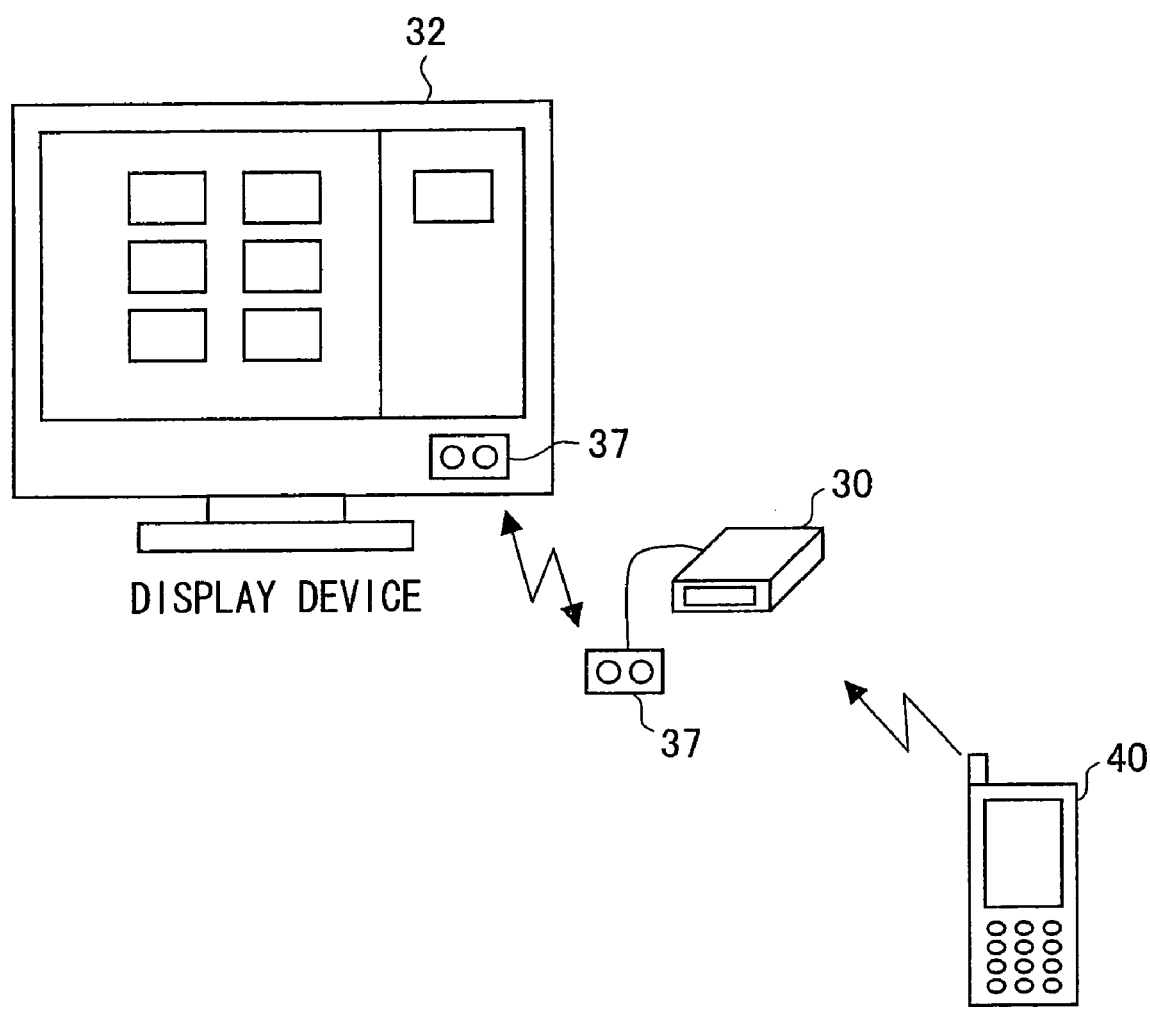
FIG. 26 is an explanatory view illustrating a state where a recording device and a display device are connected via wireless communication in the foregoing data system.

More specifically, as shown in FIG. 26, each of the recording device 30 and the display section 32 includes an optical transceiver 37 which serves as a wireless communication interface. On this account, the recording device 30 and the display section 32 carry out information exchange through wireless communication.

Further, the recording device 30 of the present embodiment includes the input device 36 serving as operation input means for performing control of the information data; however, the device can be replaced with a button (not shown).

With this arrangement, when the mobile device 40 writes information data into the data storage section 31 of the recording device 30, classification/writing of information data is performed by creating a data hierarchy structure in the data storage section 31 or using the data hierarchy structure stored in the data storage section, without using a personal computer.

Further, since this structure does not need a personal computer, a small-sized mobile recording device 30 is realized.

Further, the foregoing arrangement in which the information data is associated with the data hierarchy structure in the data storage section 31 of the recording device 30 when the data is displayed in the display section 32 allows the user to grasp the details of information data stored in the data storage section 31. This is particularly profitable when the information data is an image, a moving image or music data.

Further, the data transfer system according to the present embodiment may be applied to an album browser system. In this case, the storage medium, that is the data storage section 31, is constituted of a DVD to which the information data and the data hierarchy structure are written by the recording section 35, and the stored information data and the data hierarchy structure are displayed in the display section 32.

With this arrangement, the present embodiment can be employed as an album browser system in which the information data and the data hierarchy structure are stored in a DVD, and are read out from the DVD to be displayed in the display section 32, allowing the user to browse the information.

As described, the data transfer system according to the present invention includes a first device and a second device. The first device includes a wireless communication interface and a storage medium for storing data. The second device includes a wireless communication interface and one of: a display device for displaying data, a printing device for printing data, a recording device for recording data, a personal computer, and a storage medium. The first device and the second device each emit a packet (a group of data) for allowing a transmitter to search for a device in the other end at the beginning of communication, the packet including data required for setting of parameter (s) for data communication, data or a command required for connection of the upper layer. The first and second device each include storing means and communication controlling means. The storing means stores a program and data used for realizing a communication function 1 in which a receiver returns data required for setting of parameter(s) for data communication and data or a response required for connection of the upper layer in response to receipt of the packet. The communication controlling means controls communication, and transfers data to another communication device (from the communication controlling means of the first (second) device to the communication controlling means of the second (first) device) via the communication function 1.

With this invention, in order to reduce the communication time, the communication between the first device and the second device is carried out with the communication function 1, in which the packet including data required for connection also functions as a station search command (XID command in the case of IrDA protocol) for carrying out search for the device in the other end at the beginning of communication.

In this manner, station search and connection are carried out at the same time. On this account, the station search and connection from lower to upper layers (generally, the connection is sequentially performed from lower to upper layers) may be completed by exchanging a single packet or a group of packets. Consequently, the total data transfer time is reduced.

Accordingly, it is possible to reduce probability of communication failure when the angle or the distance between the first and second devices exceeds a certain value.

The data transfer system according to the present invention includes a first device and a second device. The first device includes a wireless communication interface and a storage medium for storing data. The second device includes a wireless communication interface and one of: a display device for displaying data, a printing device for printing data, a recording device for recording data, a personal computer, and a storage medium. The first and second device each include storing means and communication controlling means. The storing means stores a program and data used for realizing a communication function 2 in which, instead of transmission of the packet (a group of data) for allowing a transmitter to search for a receiver at the beginning of communication, the transmitter emits to the receiver (i) data required for setting of parameter(s) for data communication, (ii) (a) parameter(s) indicating that the response from the receiver is not required, and (iii) data or a command required for connection of the upper layer. The communication controlling means controls communication, and transfers data to another communication device (from the communication controlling means of the first (second) device to the communication controlling means of the second (first) device) via the communication function 2.

In the data transfer system according to the present invention, the first device and the second device each have default values for the data required for setting of parameter (s) for data communication, and for the data or the command required for connection of the upper layer. The default values are always applied if the packet emitted from the transmitter or the receiver is not containing any information about setting of values.

In the data transfer system according to the present invention, the first device and the second device each have default values for the data required for setting of parameter(s) for data communication, and for the data or the command required for connection of the upper layer. The default values are always applied if the packet emitted from the transmitter or the receiver is not containing any information about setting of values.

In the foregoing invention, the first and the second device may use fixed values for the packet for station search and connection.

More specifically, the transfer speed of packet used for station search and connection is often slower than the data transfer speed of general data. Therefore, a fixed value of a shorter length of packet period is set in advance. The total data transfer time is reduced by using the packet having the fixed value. Therefore, it is possible to reduce probability of communication failure when the angle or the distance between the first and second devices exceeds a certain value.

The data transfer system according to the present invention includes a first device and a second device. The first device includes a wireless communication interface and a storage medium for storing data. The second device includes a wireless communication interface and one of: a display device for displaying data, a printing device for printing data, a recording device for recording data, a personal computer, and a storage medium. The first and second device each include storing means and communication controlling means. The storing means stores a program and data used for realizing at least two of communication functions 1, 2 and 3. The communication function 1 is arranged so that the first device and the second device each emit a packet (a group of data) for allowing a transmitter to search for a device in the other end at the beginning of communication, the packet including data required for setting of parameter(s) for data communication, data or a command required for connection of the upper layer; and a receiver returns data required for setting of parameter(s) for data communication and data or a response required for connection of the upper layer in response to receipt of the packet. The communication function 2 is arranged so that, instead of transmission of the packet (a group of data) for allowing a transmitter to search for a receiver at the beginning of communication, the transmitter emits to the receiver (1) data required for setting of parameter(s) for data communication, (2) (a) parameter(s) indicating that the response from the receiver is not required, and (3) data or a command required for connection of the upper layer, through which data exchange of the packet the transmitter and the receiver complete connection. The communication function 3 is arranged so that the device in the other end is searched and found first, and then connection is established from lower to upper layers by exchanging the required data. The communication controlling means controls communication, and transfers data to another communication device (from the communication controlling means of the first (second) device to the communication controlling means of the second (first) device) via one of the equipped communication functions 1 through 3, according to the conditions of the first and second devices.

With this arrangement, the transmitter attempts communication by using one of communication functions 1 through 3. If the receiver is equipped with neither of the communication functions 1 and 2, the effect for reduction of communication time cannot be achieved. However, in the present invention, the first device and the second device in the present invention are each equipped with a common communication function 3. Therefore, even when neither of the communication functions 1 and 2 can be used, the communication is still possible by using the communication function 3, and if one of the communication functions 1 and 2 can be used, the effect of reduction of communication time is obtained.

The data transfer system according to the present invention includes a first device and a second device. The first device includes a wireless communication interface and a storage medium for storing data. The second device includes a wireless communication interface and one of: a display device for displaying data, a printing device for printing data, a recording device for recording data, a personal computer, and a storage medium. The first and second device each include storing means and communication controlling means. The storing means stores a program and data used for realizing a communication function 4 in which a single response packet is used as a notification as to whether an error occurs or whether retransmission of data is required during the data communication. The communication controlling means controls communication, and transfers data to another communication device (from the communication controlling means of the first (second) device to the communication controlling means of the second (first) device) via the communication function 4.

With this invention, communication between the first device and the second device is carried out with the communication function 4 which transmits a large number of sequential packets. This offers an effect of reduction in transmission time.

In this manner, packet exchange of response packet, which is usually required for each packet or for each group of a few packets, becomes much less frequent. Consequently, the processing operation by the CPU is reduced, and the entire transfer time is reduced. Therefore, it is possible to reduce probability of communication failure when the angle or the distance between the first and second devices exceeds a certain value.

The data transfer system according to the present invention includes a first device and a second device. The first device includes a wireless communication interface and a storage medium for storing data. The second device includes a wireless communication interface and one of: a display device for displaying data, a printing device for printing data, a recording device for recording data, a personal computer, and a storage medium. The first and second device each include storing means and communication controlling means. The storing means stores a program and data used for realizing a communication function 5 which carries out data transmission only one time regardless of occurrence of error in the receiver. The communication controlling means controls communication, and transfers data to another communication device (from the communication controlling means of the first (second) device to the communication controlling means of the second (first) device) via the communication function 5.

The data transfer system according to the present invention includes a first device and a second device. The first device includes a wireless communication interface and a storage medium for storing data. The second device includes a wireless communication interface and one of: a display device for displaying data, a printing device for printing data, a recording device for recording data, a personal computer, and a storage medium. The first and second device each include storing means and communication controlling means. The storing means stores a program and data used for realizing at least two of communication functions 4, 5 and 6. The communication function 4 uses a single response packet as a notification as to whether an error occurs or whether retransmission of data is required during the data communication. The communication function 5 carries out data transmission only one time regardless of occurrence of error in the receiver. The communication function 6 uses plural response packets as a notification whether an error occurs or whether retransmission of data is required during the data communication. The communication controlling means controls communication, and transfers data to another communication device (from the communication controlling means of the first (second) device to the communication controlling means of the second (first) device) via one of the equipped communication functions 4 through 6, according to the conditions of the first and second devices.

The data transfer system according to the present invention includes a first device and a second device. The first device includes a wireless communication interface and a storage medium for storing data. The second device includes a wireless communication interface and one of: a display device for displaying data, a printing device for printing data, a recording device for recording data, a personal computer, and a storage medium. The first and second device each include storing means and communication controlling means. The storing means stores a program and data used for realizing a communication function 7. The communication function 7 has the function of (i) the communication function 1 in which the first device and the second device each emit a packet (a group of data) for allowing a transmitter to search for a device in the other end at the beginning of communication, the packet including data required for setting of parameter(s) for data communication, data or a command required for connection of the upper layer; and a receiver returns data required for setting of parameter(s) for data communication and data or a response required for connection of the upper layer in response to receipt of the packet, and the function of (ii) the communication function 4 in which a single response packet is used as a notification as to whether an error occurs or whether retransmission of data is required during the data communication. The communication controlling means controls communication, and transfers data to another communication device (from the communication controlling means of the first (second) device to the communication controlling means of the second (first) device) via the communication function 7, according to the conditions of the first and second devices.

With this invention using the communication function 7 having the benefits of the communication functions 1 and 4, the data transfer time is further reduced. Therefore, it is possible to reduce probability of communication failure when the angle or the distance between the first and second devices exceeds a certain value.

The data transfer system according to the present invention includes a first device and a second device. The first device includes a wireless communication interface and a storage medium for storing data. The second device includes a wireless communication interface and one of: a display device for displaying data, a printing device for printing data, a recording device for recording data, a personal computer, and a storage medium. The first and second device each include storing means and communication controlling means. The storing means stores a program and data used for realizing a communication function 8. The communication function 8 has the function of (i) the communication function 2 which is arranged so that, instead of transmission of the packet (a group of data) for allowing a transmitter to search for a receiver at the beginning of communication, the transmitter emits to the receiver (1) data required for setting of parameter(s) for data communication, (2) (a) parameter(s) indicating that the response from the receiver is not required, and (3) data or a command required for connection of the upper layer, through which data exchange of the packet the transmitter and the receiver complete connection, and (ii) the communication function 5 which carries out data transmission only one time regardless of occurrence of error in the receiver. The communication controlling means controls communication, and transfers data to another communication device (from the communication controlling means of the first (second) device to the communication controlling means of the second (first) device) via the communication function 8, according to the conditions of the first and second devices.

The data transfer system according to the present invention includes a first device and a second device. The first device includes a wireless communication interface and a storage medium for storing data. The second device includes a wireless communication interface and one of: a display device for displaying data, a printing device for printing data, a recording device for recording data, a personal computer, and a storage medium. The first and second device each include storing means and communication controlling means. The storing means stores a program and data used for realizing at least two of communication functions 7, 8 and 9. The communication function 7 has the function of (i) the communication function 1 in which the first device and the second device each emit a packet (a group of data) for allowing a transmitter to search for a device in the other end at the beginning of communication, the packet including data required for setting of parameter(s) for data communication, data or a command required for connection of the upper layer; and a receiver returns data required for setting of parameter(s) for data communication and data or a response required for connection of the upper layer in response to receipt of the packet, and the function of (ii) the communication function 4 in which a single response packet is used as a notification as to whether an error occurs or whether retransmission of data is required during the data communication. The communication function 8 has the function of (i) the communication function 2 which is arranged so that, instead of transmission of the packet (a group of data) for allowing a transmitter to search for a receiver at the beginning of communication, the transmitter emits to the receiver (1) data required for setting of parameter(s) for data communication, (2) (a) parameter(s) indicating that the response from the receiver is not required, and (3) data or a command required for connection of the upper layer, through which data exchange of the packet the transmitter and the receiver complete connection, and (ii) the communication function 5 which carries out data transmission only one time regardless of occurrence of error in the receiver. The communication function 9 has the function of (i) the communication function 3 which is arranged so that the device in the other end is searched and found first, and then connection is established from lower to upper layers by exchanging the required data, and the function of (ii) the communication function 6 which uses plural response packets as a notification whether an error occurs or whether retransmission of data is required during the data communication. The communication controlling means controls communication, and transfers data to another communication device (from the communication controlling means of the first (second) device to the communication controlling means of the second (first) device) via one of the equipped communication functions 7 through 9, according to the conditions of the first and second devices.

Further, in the data transfer system according to the present invention, the communication controlling means of the mobile device and the communication controlling means of the display device each include an identification signal generating means for generating an identification signal, and the mobile device includes a determining means for determining whether or not the device on the receiving end has the same communication function among the communication functions 1 through 9, the determining means transmitting the identification signal generated by the identification signal generating means so as to request communication using one of the communication functions 1 through 9, and determining that the device in the receiving end has the same communication function through the communication functions 1 through 9 when an identification signal is transmitted from the device in the receiving end.

Further, the image transfer system of the present invention employs the same data transfer method of the foregoing data transfer system; however this method is additionally arranged such that the mobile device transmits an identification signal at the beginning of the communication so as to makes a request for communication using one of the communication functions 1 through 9, the mobile device determining that the device in the receiving end has the same communication function among the communication functions 1 through 9 when an identification signal is transmitted from the device in the receiving end.

With this arrangement, it is possible to detect the existence of the receiver which has the same communication function among the communication functions 1 through 9, only through exchange of identification signals with the reception device.

Further, the data transfer system of the present invention employs the foregoing data transfer system, however is additionally arranged such that the communication controlling means of the display device includes error detecting means for detecting error of the received data. When the display device carries out data transfer using one of the communication functions 1, 2, 4, 5, 7 and 8, and if the data transfer is properly completed, the display device at least carries out display of the received data or display of a message saying that the data transfer is properly done. The display device in this system also includes display controlling means for displaying a message saying that the transfer is not properly completed when the error detecting means detects that the data transfer has failed due to some kind of defect.

Further, the data transfer system of the present invention employs the foregoing data transfer system, however is additionally arranged such that, when the display device carries out data transfer using one of the communication functions 1, 2, 4, 5, 7 and 8, and if the data transfer is properly completed, the display device at least carries out display of the received data or display of a message saying that the data transfer is properly done. The display device in this system also displays a message saying that the transfer is not properly completed when the error detecting means detects that the data transfer has failed due to some kind of defect.

With this arrangement, when the data transfer is properly completed in the reception device, the receiver carries out display of the received data and/or display of a message saying that the data transfer is properly done. On the other hand, when the data transfer has failed due to some kind of defect, the receiver displays a message saying that the transfer is not properly completed.

On this account, the user is immediately notified whether the data transfer is completed or it has been cut off by an error. That is, the user can immediately try transmission again when the transmission failed.

Further, the data transfer system of the present invention employs the foregoing data transfer system, however is additionally arranged such that the display controlling means includes determining means. When an error is detected during data communication using a common function among the communication functions 5 and 8, the determining means classifies the error into the following two cases: (i) the data items are all properly transmitted but an error is found in a single or a plurality of data items, or (ii) the data transfer is cut off within a packet. The determining means displays a different message for each of those cases.

Further, the data transfer system of the present invention employs the same image transfer method of the foregoing data transfer system; however this method is additionally arranged such that, when an error is detected during data communication using the same protocol among the communication functions 5 and 8, the display device classifies the error into the following two cases: (i) the data items are all properly transmitted but an error is found in a single or a plurality of data items, or (ii) the data transfer is cut off within a packet. The display device displays a different message for each of those cases.

With this arrangement, when an error is detected in the receiver during data communication using a common protocol among the first through fourth communication protocols, the image transfer system has a function of classifying the error into the following two cases: (i) the data items are all properly transmitted but an error is found in a single or a plurality of data items, or (ii) the data transfer is cut off within a packet. The data transfer system also has a function of displaying the error separately for each case.

With this arrangement, when an error is detected even though all frames are transmitted, an excessive distance of communication range or influence of external light, such as fluorescent lamp, sunlight, an incandescent lamp, is suggested as a cause of frequent failure in the form of a display message in the display section, and the user is told to bring the device closer to the other device. Meanwhile, when the transmission is cut off within a frame, change in orientation of device is suggested as a display message in the display section. This function allows the user to carry out transmission again in more adequate way, thereby suppressing repeated failures.

Further, the data transfer system of the present invention employs the foregoing data transfer system, however is additionally arranged such that the mobile device further includes a display section, storing means and file transfer/display controlling means. The display section carries out display of images. The storage means stores image files for transmission, and image files for display. The image files for display respectively correspond to image files for transmission but are smaller in capacity than the image files for transmission. The file transfer/display controlling means, when transmitting the stored images via wireless communication, transmits the image files for transmission, and when displaying the images, causes the display screen to display the image files for display.

Further, the data transfer system of the present invention employs the same data transfer method of the foregoing data transfer system; however this method is additionally arranged such that the mobile device, when transmitting the stored images via wireless communication, transmits the image files for transmission, and when displaying the images, causes the display screen to display the image files for display.

With this arrangement, when the mobile device has a tiny display section, the mobile device stores two image files: image files for transmission, and image files for display. The image files for display respectively correspond to image files for transmission but are smaller in capacity than the image files for transmission. When transmitting the stored images via wireless communication, the mobile device transmits the image files for transmission, and when displaying the images in its own display section, the mobile device uses the image files for display.

More specifically, a mobile device is usually small and is difficult to contain a high-speed CPU; in addition to this, a mobile device usually has a tiny display section, requiring a large image file for transmission to be reduced when displayed. On the other hand, a display device with a high-resolution requires a large image file to display a sufficiently-large and high quality image.

In view of this, the foregoing mobile device stores small image files respectively corresponding to the large files, allowing quick preview of the target files for transmission, thereby allowing the user to immediately transmit the requested image. Then, the transmitted image is displayed in the display device with high picture quality.

Further, the data transfer system of the present invention employs the foregoing data transfer system, however is additionally arranged such that the mobile device includes display image storage/generation means for generating in advance the image files for display based on the image files for transmission and storing the image files.

The data transfer system of the present invention employs the same data transfer method of the foregoing data transfer system; however this method is additionally arranged such that the mobile device generates in advance the image files for display based on the image files for transmission and stores the image files.

This arrangement provides a function of automatically generating the image files for display.

Conventionally, a mobile device creates the image file for display each time the device carries out display of image file in the display section, thus it takes a while until the image appear on the screen. In contrast, in the present invention, the file for display is created and stored in advance, and it takes time only at the first time. The image appears at once from the second time, enabling the user to quickly select a target image for transmission.

Further, the data transfer system of the present invention employs the foregoing data transfer system, however is additionally arranged such that the mobile device includes size changing means for changing size of an image file according to the display capacity of the display device, before transmitting the image file to the display device.

Further, the data transfer system of the present invention employs the same data transfer method of the foregoing data transfer system; however this method is additionally arranged such that the mobile device has a function of changing size of image file according to the display capacity of the display device, before transmitting the image file to the display device.

With the foregoing arrangement, even when transmission takes very long to send image files larger than the display capacity of the display device, it is possible to reduce communication error.

Further, the data transfer system of the present invention employs the foregoing data transfer system, however is additionally arranged such that the mobile device includes resizing/processing means for resizing or processing the image data when the data is recorded.

Further, the data transfer system of the present invention employs the same data transfer method of the foregoing image transfer system; however this method is additionally arranged such that the mobile device has a function of resizing or processing the image data when the data is recorded.

With this function, the mobile device becomes capable of resizing or processing the data before storing data. On this account, the data can be reduced before transmitted to the display device, thus reducing transfer time.

Further, the data transfer system of the present invention employs the foregoing data transfer system, however is additionally arranged such that the communication controlling means of the mobile device and the communication controlling means of the printing device each include an identification signal generating means for generating an identification signal, and the mobile device includes a determining means for determining whether or not the device on the receiving end has the same communication function among the communication functions 1 through 9, the determining means transmitting the identification signal generated by the identification signal generating means so as to request communication using one of the communication functions 1 through 9, and determining that the device in the receiving end has the same communication function the communication functions 1 through 9 when an identification signal is transmitted from the device in the receiving end.

Further, the data transfer system of the present invention employs the same data transfer method of the foregoing data transfer system; however this method is additionally arranged such that the mobile device transmits an identification signal at the beginning of the communication so as to makes a request for communication using one of the communication functions 1 through 9, the mobile device determining that the device in the receiving end has the same communication function among the communication functions 1 through 9 when an identification signal is transmitted from the device in the receiving end.

With this arrangement, it is possible to detect the existence of the receiver which has the same communication function among the communication functions 1 through 9, only through exchange of identification signals with the reception device.

Further, the data transfer system of the present invention employs the foregoing data transfer system, however is additionally arranged such that the communication controlling means of the printing device includes error detecting means for detecting error of the received data. When the printing device carries out data transfer using one of the communication functions 1, 2, 4, 5, 7 and 8, and if the data transfer is properly completed, the printing device at least carries out printing of the received image or display of a message saying that the data transfer is properly done. The printing device in this system also includes display controlling means for displaying a message saying that the transfer is not properly completed when the error detecting means detects that the data transfer has failed due to some kind of defect.

Further, the data transfer system of the present invention employs the foregoing data transfer system, however is additionally arranged such that, when the printing device carries out data transfer using one of the communication functions 1, 2, 4, 5, 7 and 8, and if the data transfer is properly completed, the printing device at least carries out printing of the received image or display of a message saying that the data transfer is properly done. The printing device in this system also displays a message saying that the transfer is not properly completed when the error detecting means detects that the data transfer has failed due to some kind of defect.

With this arrangement, when the data transfer is properly completed in the reception device, the receiver carries out printing of the received image and/or display of a message saying that the data transfer is properly done. On the other hand, when the data transfer has failed due to some kind of defect, the receiver displays a message saying that the transfer is not properly completed.

On this account, the user is immediately notified whether the data transfer is completed or it has been cut off by an error. That is, the user can immediately try transmission again when the transmission failed.

Further, the data transfer system of the present invention employs the foregoing data transfer system, however is additionally arranged such that the display controlling means includes determining means. When an error is detected during data communication using a common communication function selected from the communication functions 5 and 8, the determining means classifies the error into the following two cases: (i) the data items are all properly transmitted but an error is found in a single or a plurality of data items, or (ii) the data transfer is cut off within a packet. The determining means displays a different message for each of those cases.

Further, the data transfer system of the present invention employs the same data transfer method of the foregoing data transfer system; however this method is additionally arranged such that, when an error is detected during data communication using a common communication function selected from the communication functions 5 and 8, the printing device classifies the error into the following two cases: (i) the data items are all properly transmitted but an error is found in a single or a plurality of data items, or (ii) the data transfer is cut off within a packet. The printing device displays a different message for each of those cases.

With this arrangement, when an error is detected in the receiver during data communication using a common protocol among the first through fourth communication protocols, the data transfer system has a function of classifying the error into the following two cases: (i) the data items are all properly transmitted but an error is found in a single or a plurality of data items, or (ii) the data transfer is cut off within a packet. The data transfer system also has a function of displaying the error separately for each case.

With this arrangement, when an error is detected even though all frames are transmitted, an excessive distance of communication range or influence of external light, such as fluorescent lamp, sunlight, an incandescent lamp, is suggested as a cause of frequent failure in the form of a display message in the display section, and the user is told to bring the device closer to the other device. Meanwhile, when the transmission is cut off within a frame, change in orientation of device is suggested as a display message in the display section. This function allows the user to carry out transmission again in more adequate way, thereby suppressing repeated failures.

Further, the data transfer system of the present invention employs the foregoing data transfer system, however is additionally arranged such that, when it is found, as a result of detection by the error detection correction circuit, that all data items are properly transmitted using one of the communication functions 1, 2, 4, 5, 7 and 8, the display controlling means displays a message saying that the transfer is properly completed, and carries out recording of data in response to an externally-inputted command.

Further, the data transfer system of the present invention employs the same data transfer method of the foregoing data transfer system; however this method is additionally arranged such that, when all data items are properly transmitted using one of the communication functions 1, 2, 4, 5, 7 and 8, the printing device displays a message saying that the transfer is properly completed, and carries out printing of data in response to an externally-inputted command.

This method offers a function of displaying a message saying that the data transfer is properly completed when the all data is properly transmitted to the reception device; and a function for recording the transmitted data in response to an externally-inputted command after confirming that the reception is properly completed.

This function allows the user to carry out printing of the transmitted data after he/she confirms that the target data is properly transmitted.

Further, the data transfer system of the present invention employs the foregoing data transfer system, however is additionally arranged such that the mobile device further includes a display section, storing means and file transfer/display controlling means. The display section carries out display of images. The storage means stores image files for transmission, and image files for display. The image files for display respectively correspond to image files for transmission but are smaller in capacity than the image files for transmission. The file transfer/display controlling means, when transmitting the stored images via wireless communication, transmits the image files for transmission, and when displaying the images, causes the display screen to display the image files for display.

Further, the data transfer system of the present invention employs the same data transfer method of the foregoing data transfer system; however this method is additionally arranged such that the mobile device, when transmitting the stored images via wireless communication, transmits the image files for transmission, and when displaying the images, causes the display screen to display the image files for display.

With this arrangement, when the mobile device has a tiny display section, the mobile device stores two image files: image files for transmission, and image files for display. The image files for display respectively correspond to image files for transmission but are smaller in capacity than the image files for transmission. When transmitting the stored images via wireless communication, the mobile device transmits the image files for transmission, and when displaying the images in its own display section, the mobile device uses the image files for display.

More specifically, a mobile device is usually small and is difficult to contain a high-speed CPU; in addition to this, a mobile device usually has a tiny display section, requiring a large image file for transmission to be reduced when displayed. On the other hand, a printing device with a high-resolution requires a large image file to display a sufficiently-large and high quality image.

In view of this, the foregoing mobile device stores small image files respectively corresponding to the large files, allowing quick preview of the target files for transmission, thereby allowing the user to immediately transmit the requested image. Then, the transmitted image is displayed in the printing device with high picture quality.

Further, the data transfer system of the present invention employs the foregoing data transfer system, however is additionally arranged such that the mobile device includes display image storage/generation means for generating in advance the image files for display based on the image files for transmission and storing the image files.

The data transfer system of the present invention employs the same data transfer method of the foregoing data transfer system; however this method is additionally arranged such that the mobile device generates in advance the image files for display based on the image files for transmission and stores the image files.

This arrangement provides a function of automatically generating the image files for display.

Conventionally, a mobile device creates the image file for display each time the device carries out display of image file in the display section, thus it takes a while until the image appear on the screen. In contrast, in the present invention, the file for display is created and stored in advance, and it takes time only at the first time. The image appears at once from the second time, enabling the user to quickly select a target image for transmission.

With this function, the mobile device becomes capable of resizing or processing the data before storing data. On this account, the data can be reduced before transmitted to the printing device, thus reducing transfer time.

Further, the data transfer system of the present invention employs the same data transfer method of the foregoing image transfer system; however this method is additionally arranged such that the mobile device has a function of changing size of image file according to the printing capability of the printing device, before transmitting the image file to the printing device.

With the foregoing arrangement, even when transmission takes very long to send image files larger than the printing capability of the printing device, it is possible to reduce communication error.

Further, the data transfer system of the present invention employs the foregoing data transfer system, and is additionally arranged such that the mobile device includes resizing/processing means for resizing or processing the data when the data is recorded.

Further, the data transfer method of the data transfer system of the present invention employs the same data transfer method of the foregoing data transfer system; however this method is additionally arranged such that the mobile device has a function of resizing or processing the data when the data is recorded.

With this function, the mobile device becomes capable of resizing or processing the data before storing data. On this account, the data can be reduced before transmitted to the printing device, thus reducing transfer time.

Further, the data transfer system of the present invention employs the foregoing data transfer system, however is additionally arranged such that the communication controlling means of the mobile device and the communication controlling means of the recording device each include an identification signal generating means for generating an identification signal, and the mobile device includes a determining means for determining whether or not the device on the receiving end has the same communication function among the communication functions 1 through 9, the determining means transmitting the identification signal generated by the identification signal generating means so as to request communication using one of the first through fourth communication protocols, and determining that the device in the receiving end has the same communication function through the communication functions 1 through 9 when an identification signal is transmitted from the device in the receiving end.

Further, the data transfer system of the present invention employs the same data transfer method of the foregoing data transfer system; however this method is additionally arranged such that the mobile device transmits an identification signal at the beginning of the communication so as to makes a request for communication using one of the communication functions 1 through 9, the mobile device determining that the device in the receiving end has the same communication function among the communication functions 1, 2, 4, 5, 7 and 8 when an identification signal is transmitted from the device in the receiving end.

With this arrangement, it is possible to detect the existence of the receiver which has the same communication function among the communication functions 1 through 9, only through exchange of identification signals with the reception device.

Further, the data transfer system of the present invention employs the foregoing data transfer system, however is additionally arranged such that the communication controlling means of the recording device includes error detecting means for detecting error of the received data. When the recording device carries out data transfer using one of the communication functions 1, 2, 4, 5, 7 and 8, and if the data transfer is properly completed, the recording device at least carries out recording of the received image or display of a message saying that the data transfer is properly done. The recording device in this system also includes display controlling means for displaying a message saying that the transfer is not properly completed when the error detecting means detects that the data transfer has failed due to some kind of defect.

Further, the data transfer system of the present invention employs the foregoing data transfer system, however is additionally arranged such that, when the recording device carries out data transfer using one of the communication functions 1, 2, 4, 5, 7 and 8, and if the data transfer is properly completed, the recording device at least carries out recording of the received image or display of a message saying that the data transfer is properly done. The recording device in this system also displays a message saying that the transfer is not properly completed when the error detecting means detects that the data transfer has failed due to some kind of defect.

With this arrangement, when the data transfer is properly completed in the reception device, the receiver carries out recording of the received image and/or display of a message saying that the data transfer is properly done. On the other hand, when the data transfer has failed due to some kind of defect, the receiver displays a message saying that the transfer is not properly completed.

On this account, the user is immediately notified whether the data transfer is completed or it has been cut off by an error. That is, the user can immediately try transmission again when the transmission failed.

Further, the data transfer system of the present invention employs the foregoing data transfer system, however is additionally arranged such that the display controlling means includes determining means. When an error is detected during data communication using a common communication function selected from the communication functions 5 and 8, the determining means classifies the error into the following two cases: (i) the data items are all properly transmitted but an error is found in a single or a plurality of data items, or (ii) the data transfer is cut off within a packet. The determining means displays a different message for each of those cases.

Further, the data transfer system of the present invention employs the same data transfer method of the foregoing data transfer system; however this method is additionally arranged such that, when an error is detected during data communication using a common communication function among the communication functions 1 through 9, the recording device classifies the error into the following two cases: (i) the data items are all properly transmitted but an error is found in a single or a plurality of data items, or (ii) the data transfer is cut off within a packet. The recording device displays a different message for each of those cases.

With this arrangement, when an error is detected in the receiver during data communication using a common protocol among the first through fourth communication protocols, the data transfer system has a function of classifying the error into the following two cases: (i) the data items are all properly transmitted but an error is found in a single or a plurality of data items, or (ii) the data transfer is cut off within a packet. The data transfer system also has a function of displaying the error separately for each case.

With this arrangement, when an error is detected even though all frames are transmitted, an excessive distance of communication range or influence of external light, such as fluorescent lamp, sunlight, an incandescent lamp, is suggested as a cause of frequent failure in the form of a display message in the display section, and the user is told to bring the device closer to the other device. Meanwhile, when the transmission is cut off within a frame, change in orientation of device is suggested as a display message in the display section. This function allows the user to carry out transmission again in more adequate way, thereby suppressing repeated failures.

Further, the data transfer system of the present invention employs the foregoing data transfer system, however is additionally arranged such that, when it is found, as a result of detection by the error detection correction circuit, that all data items are properly transmitted using one of the communication functions 1, 2, 4, 5, 7 and 8, the display controlling means displays a message saying that the transfer is properly completed, and carries out recording of data in response to an externally-inputted command.

Further, the data transfer system of the present invention employs the same data transfer method of the foregoing data transfer system; however this method is additionally arranged such that, when all data items are properly transmitted using one of 1, 2, 4, 5, 7 and 8 communication protocols, the recording device displays a message saying that the transfer is properly completed, and carries out recording of data in response to an externally-inputted command.

This method offers a function of displaying a message saying that the data transfer is properly completed when the all data is properly transmitted to the reception device; and a function for recording the transmitted data in response to an externally-inputted command after confirming that the reception is properly completed.

This function allows the user to carry out recording of the transmitted data after he/she confirms that the target data is properly transmitted.

Further, the data transfer system of the present invention employs the foregoing data transfer system, however is additionally arranged such that the mobile device further includes a display section, storing means and file transfer/display controlling means. The display section carries out display of images. The storage means stores image files for transmission, and image files for display. The image files for display respectively correspond to image files for transmission but are smaller in capacity than the image files for transmission. The file transfer/display controlling means, when transmitting the stored images via wireless communication, transmits the image files for transmission, and when displaying the images, causes the display screen to display the image files for display.

Further, the data transfer system of the present invention employs the same data transfer method of the foregoing data transfer system; however this method is additionally arranged such that the mobile device, when transmitting the stored images via wireless communication, transmits the image files for transmission, and when displaying the images, causes the display screen to display the image files for display.

With this arrangement, when the mobile device has a tiny display section, the mobile device stores two image files: image files for transmission, and image files for display. The image files for display respectively correspond to image files for transmission but are smaller in capacity than the image files for transmission. When transmitting the stored images via wireless communication, the mobile device transmits the image files for transmission, and when displaying the images in its own display section, the mobile device uses the image files for display.

More specifically, a mobile device is usually small and is difficult to contain a high-speed CPU; in addition to this, a mobile device usually has a tiny display section, requiring a large image file for transmission to be reduced when displayed. On the other hand, a recording device with a high-resolution requires a large image file to record a sufficiently-large and high quality image.

In view of this, the foregoing mobile device stores small image files respectively corresponding to the large files, allowing quick preview of the target files for transmission, thereby allowing the user to immediately transmit the requested image. Then, the transmitted image is displayed in the recording device with high picture quality.

Further, the data transfer system of the present invention employs the foregoing data transfer system, however is additionally arranged such that the mobile device includes display image storage/generation means for generating in advance the image files for display based on the image files for transmission and storing the image files.

The data transfer system of the present invention employs the same data transfer method of the foregoing data transfer system; however this method is additionally arranged such that the mobile device generates in advance the image files for display based on the image files for transmission and stores the image files.

This arrangement provides a function of automatically generating the image files for display.

Conventionally, a mobile device creates the image file for display each time the device carries out display of image file in the display section, thus it takes a while until the image appear on the screen. In contrast, in the present invention, the file for display is created and stored in advance, and it takes time only at the first time. The image appears at once from the second time, enabling the user to quickly select a target image for transmission.

Further, the data transfer system of the present invention employs the foregoing data transfer system, however is additionally arranged such that the mobile device includes resizing/processing means for resizing or processing the data when the data is recorded.

Further, the data transfer system of the present invention employs the same data transfer method of the foregoing data transfer system; however this method is additionally arranged such that the mobile device has a function of resizing or processing the data when the data is recorded.

With this function, the mobile device becomes capable of resizing or processing the data before storing data. On this account, the data can be reduced before transmitted to the recording device, thus reducing transfer time.

Further, the data transfer system of the present invention employs the foregoing data transfer system, however is additionally arranged such that the recording device includes a storage medium for storing data; display means for displaying data stored in the storage medium; reading means for reading information data and the hierarchy structure of the data from the storage medium; and hierarchy structure display control means for associating the information items with the hierarchy structure of the data when displaying them in the display means. The hierarchy structure of the data stored in the storage medium may have plural layers or a single layer.

Further, the data transfer system of the present invention employs the same data transfer method of the foregoing data transfer system; however this method is additionally arranged such that the recording device includes a storage medium for storing data; reading means for reading information data and the hierarchy structure of the data from the storage medium; and recording means for recording the data received from the mobile device as a new directory of the hierarchy structure.

Further, the data transfer system of the present invention employs the foregoing data transfer system, however is additionally arranged such that the recording device includes a storage medium for storing data; reading means for reading information data and the hierarchy structure of the data from the storage medium; and directory changing means for adding/modifying/deleting a directory of the hierarchy structure of the data.

Further, the data transfer system of the present invention employs the foregoing data transfer system, however is additionally arranged such that the recording device includes operation inputting means for causing the hierarchy structure display control means, and the recording means or the directory change means to carry out their operations.

Further, the data transfer system of the present invention employs the foregoing data transfer system, however is additionally arranged such that the mobile device includes operation command transmitting means for transmitting to the recording means an operation command for causing the hierarchy structure display control means, and the recording means or the directory change means to carry out their operations. In this case, the operation inputting means of the recording means receives the operation command from the mobile device and causes the respective means to carry out their operations.

Further, the data transfer system of the present invention employs the foregoing data transfer system, however is additionally arranged such that the recording device includes image processing means for processing image data.

Further, the data transfer system of the present invention employs the foregoing data transfer system, however is additionally arranged such that the recording device includes the display means and a wireless communication interface for carrying out wireless transmission.

This arrangement offers a function of reading the information data and the data hierarchy structure from the storage medium in the recording device; and a function of processing the information data or the hierarchy structure of the data, such as addition, modification, or deletion. These functions may be realized by either of software or hardware.

Further, when the information data is an image, image rotation or image resizing function is particularly desirable.

Further, the foregoing system also includes display means for display these information items, or other optional display means. The information data and the data hierarchy structure stored in the storage medium are displayed in this display means.

In the present embodiment, as well as a wired communication interface, a wireless communication interface, that is a radio communication interface, may be used as the communication interface between the recording device and the display means.

Further, the operation inputting means for carrying out various controls of the information data may be provided as a button inside the recording device. In addition to this, the operation command for carrying out the data operation may be transmitted from the mobile device.

With this arrangement, when the mobile device writes information data into the storage of the recording device, classification/writing of information data is performed by creating a data hierarchy structure in the storage medium or using the data hierarchy structure stored in the storage medium, without using a personal computer.

Further, since this structure does not need a personal computer, a small-sized mobile recording device is realized.

Further, the foregoing arrangement in which the information data is associated with the data hierarchy structure in the storage medium of the recording device when the data is displayed in the display section allows the user to grasp the details of information data stored in the storage medium. This is particularly profitable when the information data is an image, a moving image or music data.

Further, in order to solve the foregoing problem, an album browser system according to the present embodiment employs the foregoing data transfer system. In this case, the storage medium is constituted of a DVD to which the information data and the data hierarchy structure are written, and the stored information data and the data hierarchy structure are displayed in the display means.

With this arrangement, it is possible to provide an album browser system in which the information data and the data hierarchy structure are stored in a DVD, and are read out from the DVD to be displayed in the display means, allowing the user to browse the information.

Further, the data transfer system of the present invention employs the foregoing data transfer system, however is additionally arranged such that the communication controlling means of each mobile device include an identification signal generating means for generating an identification signal, and each mobile device includes a determining means for determining whether or not the device on the receiving end has the same communication function among the communication functions 1 through 9, the determining means transmitting the identification signal generated by the identification signal generating means so as to request communication using one of the communication functions 1 through 9, and determining that the device in the receiving end has the same communication function through the communication functions 1 through 9 when an identification signal is transmitted from the device in the receiving end.

Further, the data transfer system of the present invention employs the same data transfer method of the foregoing data transfer system; however this method is additionally arranged such that the each one of the mobile devices transmits an identification signal at the beginning of the communication so as to makes a request for communication using one of the communication functions 1 through 9, the mobile device determining that the device in the receiving end has the same communication function among the communication functions 1 through 9 when an identification signal is transmitted from the device in the receiving end.

With this arrangement, it is possible to detect the existence of the receiver which has the same communication function among the communication functions 1 through 9, only through exchange of identification signals with the reception device.

Further, the data transfer system of the present invention employs the foregoing data transfer system, however is additionally arranged such that the communication controlling means of one of the mobile devices includes error detecting means for detecting error of the received data. When the mobile device carries out data transfer using one of the communication functions 1, 2, 4, 5, 7 and 8 and if the data transfer is properly completed, the mobile device containing the communication controlling means at least carries out recording of the received image or display of a message saying that the data transfer is properly done. The mobile device in this system also includes display controlling means for displaying a message saying that the transfer is not properly completed when the error detecting means detects that the data transfer has failed due to some kind of defect.

Further, the data transfer system of the present invention employs the foregoing data transfer system, however is additionally arranged such that, when one or both of the mobile devices carries out data transfer using one of the communication functions 1, 2, 4, 5, 7 and 8, and if the data transfer is properly completed, the mobile device at least carries out recording of the received image or display of a message saying that the data transfer is properly done. The mobile device in this system also displays a message saying that the transfer is not properly completed when the error detecting means detects that the data transfer has failed due to some kind of defect.

With this arrangement, when the data transfer is properly completed in the reception device, the receiver carries out recording of the received image and/or display of a message saying that the data transfer is properly done. On the other hand, when the data transfer has failed due to some kind of defect, the receiver displays a message saying that the transfer is not properly completed.

On this account, the user is immediately notified whether the data transfer is completed or it has been cut off by an error. That is, the user can immediately try transmission again when the transmission failed.

Further, the data transfer system of the present invention employs the foregoing data transfer system, however is additionally arranged such that the display controlling means includes determining means. When an error is detected during data communication using a common communication function selected from the communication functions 5 and 8, the determining means classifies the error into the following two cases: (i) the data items are all properly transmitted but an error is found in a single or a plurality of data items, or (ii) the data transfer is cut off within a packet. The determining means displays a different message for each of those cases.

Further, the data transfer system of the present invention employs the same data transfer method of the foregoing data transfer system; however this method is additionally arranged such that, when an error is detected during data communication using a common communication function selected from the communication functions 5 and 8, the one or both of the mobile devices classifies the error into the following two cases: (i) the data items are all properly transmitted but an error is found in a single or a plurality of data items, or (ii) the data transfer is cut off within a packet. The mobile device displays a different message for each of those cases.

With this arrangement, when an error is detected in the receiver during data communication using a common protocol among the first through fourth communication protocols, the data transfer system has a function of classifying the error into the following two cases: (i) the data items are all properly transmitted but an error is found in a single or a plurality of data items, or (ii) the data transfer is cut off within a packet. The data transfer system also has a function of displaying the error separately for each case.

With this arrangement, when an error is detected even though all frames are transmitted, an excessive distance of communication range or influence of external light, such as fluorescent lamp, sunlight, an incandescent lamp, is suggested as a cause of frequent failure in the form of a display message in the display section, and the user is told to bring the device closer to the other device. Meanwhile, when the transmission is cut off within a frame, change in orientation of device is suggested as a display message in the display section. This function allows the user to carry out transmission again in more adequate way, thereby suppressing repeated failures.

Further, the data transfer system of the present invention employs the foregoing data transfer system, however is additionally arranged such that, when it is found, as a result of detection by the error detection correction circuit, that all data items are properly transmitted using one of the communication functions 1, 2, 4, 5, 7 and 8, the display controlling means displays a message saying that the transfer is properly completed, and carries out recording of data in response to an externally-inputted command.

Further, the data transfer system of the present invention employs the same data transfer method of the foregoing data transfer system; however this method is additionally arranged such that, when all data items are properly transmitted using one of the communication functions 1, 2, 4, 5, 7 and 8, one or both of the mobile device displays a message saying that the transfer is properly completed, and carries out recording of data in response to an externally-inputted command.

This method offers a function of displaying a message saying that the data transfer is properly completed when the all data is properly transmitted to the reception device; and a function for recording the transmitted data in response to an externally-inputted command after confirming that the reception is properly completed.

This function allows the user to carry out recording of the transmitted data after he/she confirms that the target data is properly transmitted.

Further, the data transfer system of the present invention employs the foregoing data transfer system, however is additionally arranged such that the communication controlling means of the mobile device and the communication controlling means of the personal computer each include an identification signal generating means for generating an identification signal, and the mobile device and the personal computer each include a determining means for determining whether or not the device on the receiving end has the same communication function among the communication functions 1 through 9, the determining means transmitting the identification signal generated by the identification signal generating means so as to request communication using one of the communication functions 1 through 9, and determining that the device in the receiving end has the same communication function through the communication functions 1 through 9 when an identification signal is transmitted from the device in the receiving end.

Further, the data transfer system of the present invention employs the same data transfer method of the foregoing data transfer system; however this method is additionally arranged such that each mobile device transmits an identification signal at the beginning of the communication so as to makes a request for communication using one of the communication functions 1 through 9, the mobile device or the personal computer determining that the device in the receiving end has the same communication function among the communication functions 1 through 9 when an identification signal is transmitted from the device in the receiving end.

With this arrangement, it is possible to detect the existence of the receiver which has the same communication function among the communication functions 1 through 9, only through exchange of identification signals with the reception device.

Further, the data transfer system of the present invention employs the foregoing data transfer system, however is additionally arranged such that the communication controlling means of the mobile device and/or the communication controlling means of the personal computer includes error detecting means for detecting error of the received data. When the mobile device or the personal computer carries out data transfer using one of the communication functions 1, 2, 4, 5, 7 and 8, and if the data transfer is properly completed, the mobile device or the personal computer at least carries out recording of the received image or display of a message saying that the data transfer is properly done. Each of the mobile device and the personal computer in this system also includes display controlling means for displaying a message saying that the transfer is not properly completed when the error detecting means detects that the data transfer has failed due to some kind of defect.

Further, the data transfer system of the present invention employs the foregoing data transfer system, however is additionally arranged such that, when data transfer is carried out using one of the communication functions 1, 2, 4, 5, 7 and 8, and if the data transfer is properly completed, the mobile device and/or the personal computer at least carries out recording of the received image or display of a message saying that the data transfer is properly done. The mobile device and/or the personal computer in this system also displays a message saying that the transfer is not properly completed when the error detecting means detects that the data transfer has failed due to some kind of defect.

With this arrangement, when the data transfer is properly completed in the reception device, the receiver carries out recording of the received image and/or display of a message saying that the data transfer is properly done. On the other hand, when the data transfer has failed due to some kind of defect, the receiver displays a message saying that the transfer is not properly completed.

On this account, the user is immediately notified whether the data transfer is completed or it has been cut off by an error. That is, the user can immediately try transmission again when the transmission failed.

Further, the data transfer system of the present invention employs the foregoing data transfer system, however is additionally arranged such that the display controlling means includes determining means. When an error is detected during data communication using a common communication function selected from the communication functions 5 and 8, the determining means classifies the error into the following two cases: (i) the data items are all properly transmitted but an error is found in a single or a plurality of data items, or (ii) the data transfer is cut off within a packet. The determining means displays a different message for each of those cases.

Further, the data transfer system of the present invention employs the same data transfer method of the foregoing data transfer system; however this method is additionally arranged such that, when an error is detected during data communication using a common communication function selected from the communication functions 5 and 8, the mobile device and/or the personal computer classifies the error into the following two cases: (i) the data items are all properly transmitted but an error is found in a single or a plurality of data items, or (ii) the data transfer is cut off within a packet. The mobile device/personal computer displays a different message for each of those cases.

With this arrangement, when an error is detected in the receiver during data communication using a common protocol among the first through fourth communication protocols, the data transfer system has a function of classifying the error into the following two cases: (i) the data items are all properly transmitted but an error is found in a single or a plurality of data items, or (ii) the data transfer is cut off within a packet. The data transfer system also has a function of displaying the error separately for each case.

With this arrangement, when an error is detected even though all frames are transmitted, an excessive distance of communication range or influence of external light, such as fluorescent lamp, sunlight, an incandescent lamp, is suggested as a cause of frequent failure in the form of a display message in the display section, and the user is told to bring the device closer to the other device. Meanwhile, when the transmission is cut off within a frame, change in orientation of device is suggested as a display message in the display section. This function allows the user to carry out transmission again in more adequate way, thereby suppressing repeated failures.

Further, the data transfer system of the present invention employs the foregoing data transfer system, however is additionally arranged such that, when it is found, as a result of detection by the error detection correction circuit, that all data items are properly transmitted using one of the communication functions 1, 2, 4, 5, 7 and 8, the display controlling means displays a message saying that the transfer is properly completed, and carries out recording of data in response to an externally-inputted command.

Further, the data transfer system of the present invention employs the same data transfer method of the foregoing data transfer system; however this method is additionally arranged such that, when all data items are properly transmitted using one of the communication functions 1, 2, 4, 5, 7 and 8, the mobile device and/or the personal computer displays a message saying that the transfer is properly completed, and carries out recording of data in response to an externally-inputted command.

This method offers a function of displaying a message saying that the data transfer is properly completed when the all data is properly transmitted to the reception device; and a function for recording the transmitted data in response to an externally-inputted command after confirming that the reception is properly completed.

This function allows the user to carry out recording of the transmitted data after he/she confirms that the target data is properly transmitted.

Further, the data transfer system of the present invention employs the foregoing data transfer system, however is additionally arranged such that the wireless communication is infrared (IR) communication.

Further, the data transfer system of the present invention employs the same data transfer method of the foregoing data transfer system; however this method is additionally arranged such that the wireless communication is infrared (IR) communication.

As described above, one of the data transfer methods using infrared light is IrDA standard. By using the foregoing structure, for example, to each device in an IrDA data transfer system, it is possible to reduce probability of communication failure when the angle or the distance between the communication devices exceeds a certain value.

Further, the data transfer system of the present invention employs the foregoing data transfer system, however is additionally arranged such that the communication functions 3, 6 and 9 are protocols defined by IrDA (Infrared Data Association).

Further, the data transfer system of the present invention employs the same data transfer method of the foregoing data transfer system; however this method is additionally arranged such that the communication functions 3, 6 and 9 are protocols defined by IrDA (Infrared Data Association).

On this account, since the communication functions 3, 6 and 9 are protocols defined by IrDA (Infrared Data Association), it is possible to reduce probability of communication failure when the angle or the distance between the communication devices exceeds a certain value in a device employing a general IrDA standard for data transfer using infrared light.

Further, if the communication functions 3, 6 and 9 are IrDA communication protocols, it is not necessary to change the physical layer when performing the communication functions 1, 2, 4, 5, 7 and 8, requiring only software modification. Therefore, the communication functions 1, 2, 4, 5, 7 and 8 can be easily established based on IrDA protocol.

Further, a data transfer program of the present invention causes a computer to execute the foregoing means of the data transfer system so as to achieve the object of the present invention.

With this program, the foregoing data transfer system is realized by enforcing the respective means of the data transfer system by a computer.

Further, a storage medium of the present invention is a computer-readable storage medium storing the foregoing data transfer program for causing a computer to execute the foregoing means of the data transfer system.

With this invention, the data transfer system can be developed in a computer by reading out the data transfer program from the storage medium.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention provides a transmitter, a receiver, a communication system, a communication method, and a communication program, which allow quick establishment of connection. With this advantage, the present invention is typically suitable for data exchange of an AV device (recording device), for example, between plural mobile phones, from a mobile phone to a printer, from a mobile phone to a display device, from a mobile phone to a DVD recorder etc.

The invention claimed is:

1. A transmitter which carries out communication with a receiver by establishing connection of their plurality of communication layers,
the transmitter comprising:
connection request generating means for generating a single connection request containing a command and data required for connecting a number of contiguously adjacent layers among the plurality of communication layers; and
connection request transmitting means for transmitting the single connection request to the receiver so as to establish connection of the plurality of communication layers,
the single connection request containing the command and the data required for connection with the receiver for each of at least three of the contiguously adjacent layers except for communication layers which do not require transmission of the command and the data required for connection with the receiver.

2. The transmitter as set forth in claim 1, wherein:
the connection request generating means includes in the connection request a command for requesting the receiver to transmit a response with respect to the connection request.

3. The transmitter as set forth in claim 2, further comprising:
connection setting means for carrying out setting for each of the plurality of communication layers according to the response, which is received from the receiver as a response to the connection request.

4. The transmitter as set forth in claim 1, further comprising:
connection setting means for carrying out setting for each of the plurality of communication layers, according to the connection request, without receiving a response from the receiver.

5. The transmitter as set forth in claim 1, wherein:
the connection request generating means includes in the connection request a command for requesting the receiver to transmit a response during data exchange.

6. A transmitter which carries out communication with a receiver by establishing connection of their plurality of communication layers,
the transmitter comprising:
disconnection request generating means for generating a single disconnection request containing a command and data required for disconnecting a number of contiguously adjacent layers among the plurality of communication layers; and
disconnection request transmitting means for transmitting the single disconnection request to the receiver so as to disconnect the plurality of communication layers,
the single disconnection request containing the command and the data which are required for disconnection from the receiver for each of at least three of the contiguously adjacent layers except for communication layers which do not require transmission of the command and the data required for disconnection from the receiver.

7. A transmitter which carries out communication with a receiver by establishing connection of their plurality of communication layers,
the transmitter comprising:
first connection request generating means for generating a single connection request containing a command and data required for connecting a number of contiguously adjacent layers among the plurality of communication layers;
second connection request generating means for generating a connection request containing a command and data required for connection of one of the plurality of communication layers;
selecting means for selecting either of the first connection request generating means and the second connection request generating means so as to generate the connection request; and
connection request transmitting means for transmitting to the receiver the connection request generated by the first or second connection request generating means selected by the selecting means so as to establish connection of the plurality of communication layers,
the single connection request generated by the first connection request generating means containing the command and the data which are required for connection with the receiver for each of at least three of the contiguously adjacent layers except for communication layers which do not require transmission of the command and the data required for connection with the receiver.

8. The transmitter as set forth in claim 1, wherein:
the communication is performed by infrared communication.

9. The transmitter as set forth in claim 1, wherein:
the transmitter is a mobile phone.

10. The transmitter as set forth in claim 1, wherein:
the transmitter is an image-capturing device which transmits a captured-image to the receiver.

11. A non-transitory computer readable medium storing a communication program for operating the transmitter as set forth in claim 1, the communication program when executed by a processor causing a computer to function as the respective means of the transmitter.

12. A communication method for a transmitter which carries out communication with a receiver by establishing connection of their plurality of communication layers,
the communication method comprising the steps of:
generating, by connection request generating means, a single connection request containing a command and data required for connecting a number of contiguously adjacent layers among the plurality of communication layers; and
transmitting, by connection request transmitting means, the single connection request to the receiver so as to establish connection of the plurality of communication layers,
the single connection request containing the command and the data which are required for connection with the receiver for each of at least three of the contiguously adjacent layers except for communication layers which do not require transmission of the command and the data required for connection with the receiver.

13. A receiver which carries out communication with a transmitter by establishing connection of their plurality of communication layers, the receiver comprising:

connection request receiving means for receiving a single connection request containing a command and data required for connecting a number of contiguously adjacent layers among the plurality of communication layers; and connection establishing means for extracting the command and data from the single connection request, and establishing connection for each of the plurality of communication layers based on the command and data, the single connection request containing the command and the data which are required for connection with the transmitter for each of at least three of the contiguously adjacent layers except for communication layers which do not require reception of the command and the data required for connection with the transmitter.

14. The receiver as set forth in claim 13, further comprising:

response transmitting means for transmitting a response in a case where the connection request contains a command for requesting transmission of response to the connection request.

15. The receiver as set forth in claim 13, further comprising:

response transmitting means for transmitting a response in a case where the connection request contains a command for requesting transmission of response during data exchange.

16. A receiver which carries out communication with a transmitter by establishing connection of their plurality of communication layers, the receiver comprising:

disconnection request receiving means for receiving a single disconnection request containing a command and data required for disconnecting a number of contiguously adjacent layers among the plurality of communication layers; and disconnecting means for extracting the command and data from the single disconnection request, and carrying out disconnection for each of the plurality of communication layers based on the command and data, the single disconnection request containing the command and the data which are required for disconnection from the transmitter for each of at least three of the contiguously adjacent layers except for communication layers which do not require reception of the command and the data required for disconnection from the transmitter.

17. A receiver which carries out communication with a transmitter by establishing connection of their plurality of communication layers, the receiver comprising:

connection request receiving means for receiving a single connection request containing a command and data which are required for connection with the transmitter for each of at least three of contiguously adjacent layers except for communication layers which do not require transmission of the command and the data required for connection with the transmitter, and a connection request containing a command and data required for establishing a connection of one of the plurality of communication layers; and connection establishing means for extracting the command and data from the connection request, and establishing connection for each of the plurality of communication layers based on the command and data.

18. The transmitter as set forth in claim 13, wherein:

the communication is performed by infrared communication.

19. The receiver as set forth in claim 13, wherein:

the receiver is a broadcast receiving device which receives broadcast from the transmitter.

20. The receiver as set forth in claim 13, wherein:

the receiver is a broadcast recording device which records broadcast received from the transmitter.

21. A non-transitory computer readable medium storing a communication program for operating the receiver as set forth in claim 13, the communication program when executed by a processor causing a computer to function as the respective means of the receiver.

22. A communication method for a receiver which carries out communication with a transmitter by establishing connection of their plurality of communication layers, the communication method comprising the steps of:

receiving, by connection request receiving means, a single connection request containing a command and data required for connecting a number of contiguously adjacent layers among the plurality of communication layers; and extracting, by connection establishing means, the command and data from the single connection request, and establishing connection for each of the plurality of communication layers based on the command and data, the single connection request containing the command and the data which are required for connection with the transmitter for each of at least three of the contiguously adjacent layers except for communication layers which do not require reception of the command and the data required for connection with the transmitter.

23. A communication system includes a transmitter and a receiver which carry out communication by establishing connection of their plurality of communication layers, the transmitter comprising:

connection request generating means for generating a single connection request containing a command and data required for connecting a number of contiguously adjacent layers among the plurality of communication layers; and connection request transmitting means for transmitting the single connection request to the receiver so as to establish connection of the plurality of communication layers, the receiver comprising:

connection request receiving means for receiving a single connection request containing a command and data required for connecting a number of contiguously adjacent layers among the plurality of communication layers; and connection establishing means for extracting the command and data from the single connection request, and establishing connection for each of the plurality of communication layers based on the command and data, the single connection request containing the command and the data which are required for connection between the transmitter and the receiver for each of at least three of the contiguously adjacent layers except for communication layers which do not require transmission and reception of the command and the data required for connection between the transmitter and the receiver.

24. The transmitter as set forth in claim 1, wherein the plurality of communication layers include at least one upper-level protocol layer in addition to a data link layer.

25. The transmitter as set forth in claim 24, wherein the at least one upper-level protocol layer includes one or more of a network layer, transport layer, and a session layer.

26. The transmitter as set forth in claim 1, wherein the connection request generated by the connection request generating means comprises, in addition to a connection parameter for a data link layer, one or more connection parameters for establishing a connection between one or more upper-level protocol layers.

27. A transmitter which carries out communication with a receiver by establishing connection of their plurality of communication layers, the transmission comprising:

connection request generating means for generating a single connection request containing data indicating that a destination of transmission is not specified and, a command and data required for connecting a number of contiguously adjacent layers among the plurality of communication layers; and connection request transmitting means for transmitting the single connection request to the receiver so as to establish connection of the plurality of communication layers, the single connection request containing the command and the data which are required for connection with the receiver for each of at least three of the contiguously adjacent layers except for communication layers which do not require transmission of the command and the data required for connection with the receiver.

\* \* \* \* \*